United States Patent [19]

Zur et al.

[11] Patent Number: 6,043,830
[45] Date of Patent: Mar. 28, 2000

[54] APPARATUS FOR PATTERN GENERATION ON A DIELECTRIC SUBSTRATE

[75] Inventors: Albert Zur, Givat Savion; Meir Weksler, Maskeret Batya; Itzchak Pomerantz, Kefar Sava, all of Israel

[73] Assignee: Cubital, Ltd., R'Anana, Israel

[21] Appl. No.: 08/461,357

[22] Filed: Jun. 5, 1995

Related U.S. Application Data

[63] Continuation of application No. 07/944,157, Sep. 11, 1992, abandoned, which is a continuation-in-part of application No. 07/766,691, Sep. 27, 1991, Pat. No. 5,289,214, which is a continuation-in-part of application No. 07/697,166, May 8, 1991, Pat. No. 5,157,423.

[51] Int. Cl.$^7$ ........................................... B41J 2/415
[52] U.S. Cl. ........................................... 347/120
[58] Field of Search .................... 347/123, 120, 347/140, 141, 55, 91, 129, 159; 430/48; 399/66

[56] References Cited

U.S. PATENT DOCUMENTS

| | | | |
|---|---|---|---|
| 3,979,759 | 9/1976 | Simm | 347/126 |
| 4,087,826 | 5/1978 | Haeberle | 347/55 |
| 4,155,093 | 5/1979 | Fotland et al. | 347/127 |
| 4,174,170 | 11/1979 | Yamamoto | 399/311 |
| 4,207,100 | 6/1980 | Kadokura | 430/48 |
| 4,409,604 | 10/1983 | Fotland | 347/127 |
| 4,498,090 | 2/1985 | Honda | 347/128 |
| 4,568,955 | 2/1986 | Hosoya | 347/158 |
| 4,641,955 | 2/1987 | Yyasa | 347/55 |
| 4,644,373 | 2/1987 | Sheridan | 347/125 |
| 4,692,779 | 9/1987 | Ando | 347/123 |
| 4,748,464 | 5/1988 | Pannekoek | 347/141 |
| 4,757,343 | 7/1988 | Nakatani | 347/142 |
| 4,837,591 | 6/1989 | Snelling | 347/117 |
| 4,855,768 | 8/1989 | Iino | 347/124 |
| 4,903,048 | 2/1990 | Harrington | 347/115 |
| 4,931,876 | 6/1990 | Hashizume | 358/300 |
| 4,973,994 | 11/1990 | Schneider | 347/125 |
| 5,046,828 | 9/1991 | Takanashi et al. | 349/25 |
| 5,087,944 | 2/1992 | Yamauchi | 399/170 |
| 5,105,280 | 4/1992 | Ogino | 358/298 |
| 5,111,302 | 5/1992 | Chan | 358/298 |
| 5,150,226 | 9/1992 | Takanashi | 358/471 |
| 5,157,423 | 10/1992 | Zur | 347/120 |
| 5,181,072 | 1/1993 | Furuya | 399/171 |
| 5,204,697 | 4/1993 | Schmidlin | 347/115 |
| 5,206,784 | 4/1993 | Kimiwada | 399/171 |
| 5,245,438 | 9/1993 | Yamamoto | 358/296 |
| 5,250,992 | 10/1993 | Tsuneeda | 399/172 |
| 5,289,214 | 2/1994 | Zur | 347/120 |

FOREIGN PATENT DOCUMENTS

| | | |
|---|---|---|
| 327236 | 1/1989 | European Pat. Off. . |
| 368316 | 11/1989 | European Pat. Off. . |

*Primary Examiner*—N. Le
*Assistant Examiner*—L. Anderson
*Attorney, Agent, or Firm*—Townsend and Townsend and Crew LLP

[57] ABSTRACT

Apparatus for information transfer and including a dielectric element having generally opposite first and second surfaces, an information bearing voltage signal being associated with the first surface and an information bearing charge pattern being associated with the second surface, device for applying a flow of charges to the second surface, the flow of charges being operative to transfer information between the first and second surfaces.

35 Claims, 37 Drawing Sheets

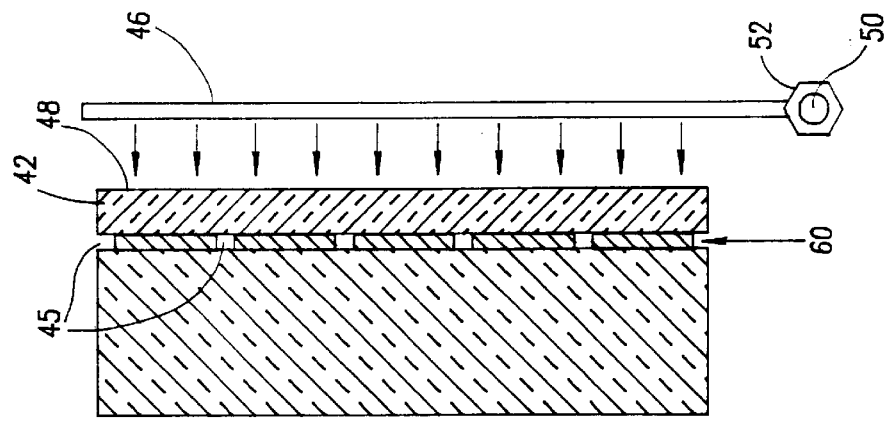
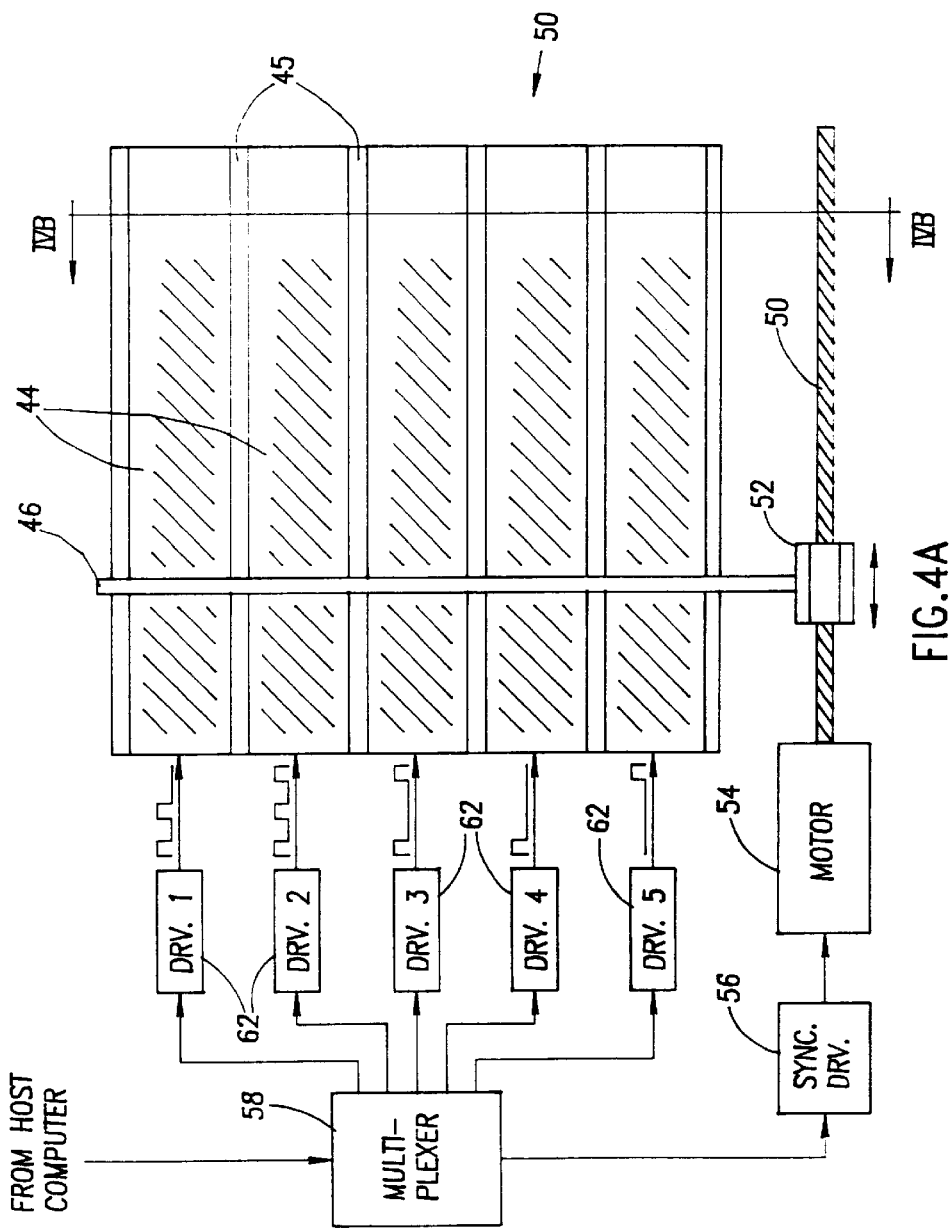
FIG. 4B
FIG. 4A

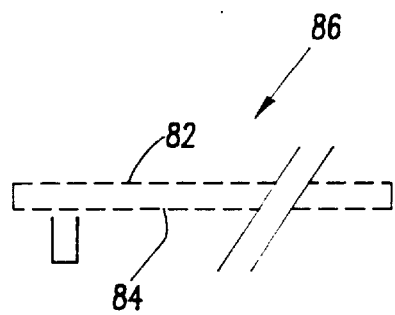
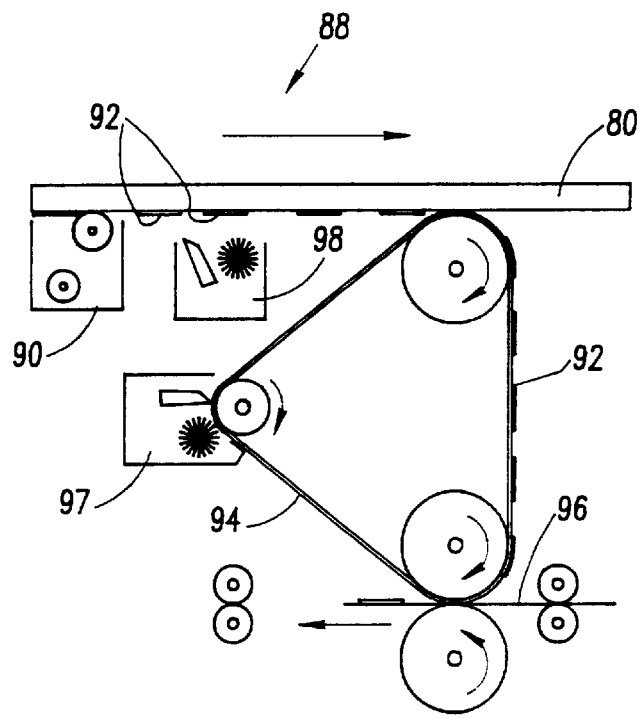
FIG.6A
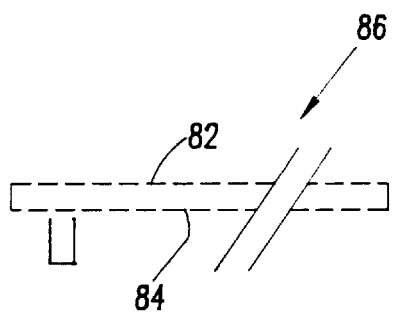
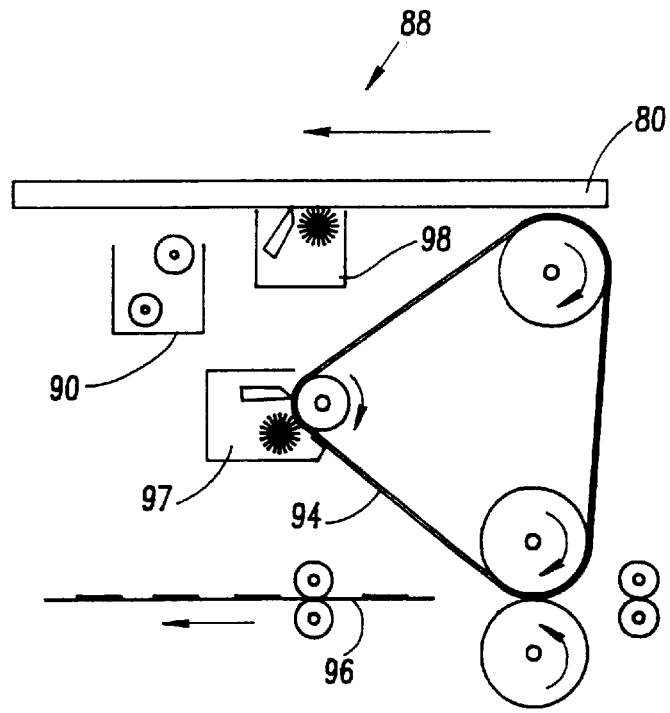
FIG.6B

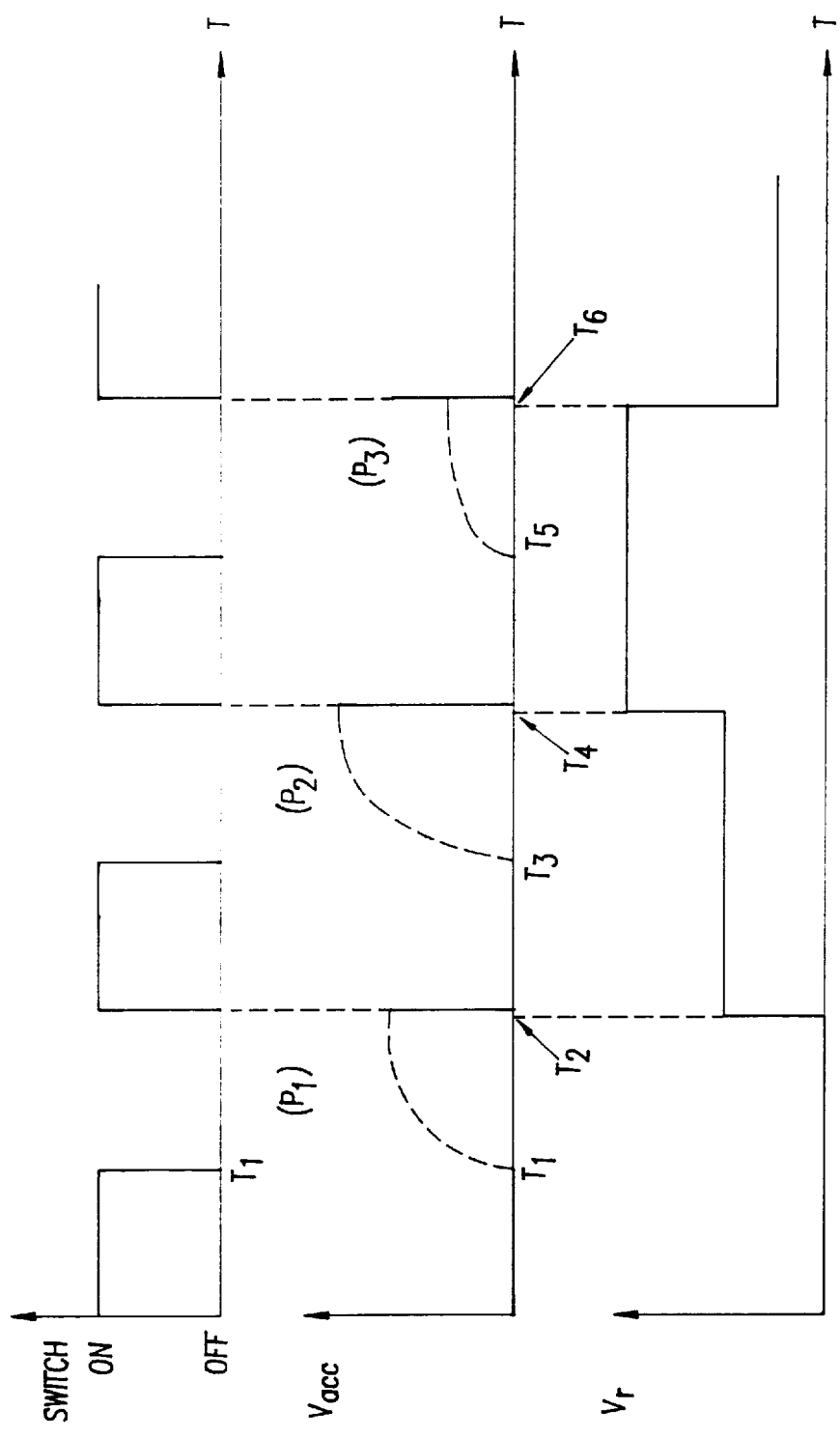

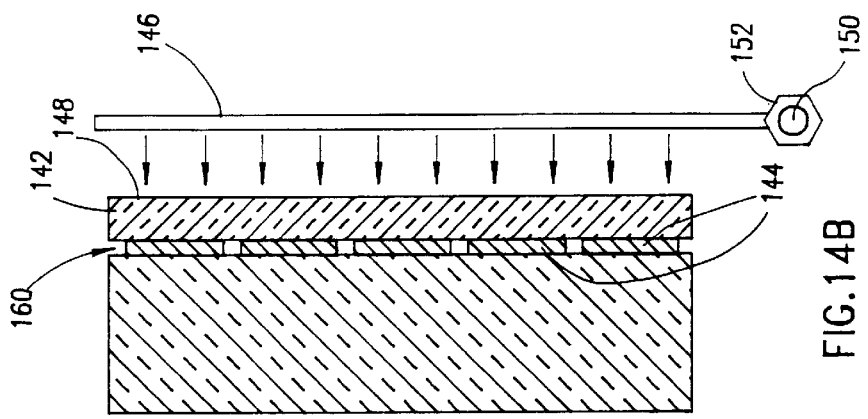
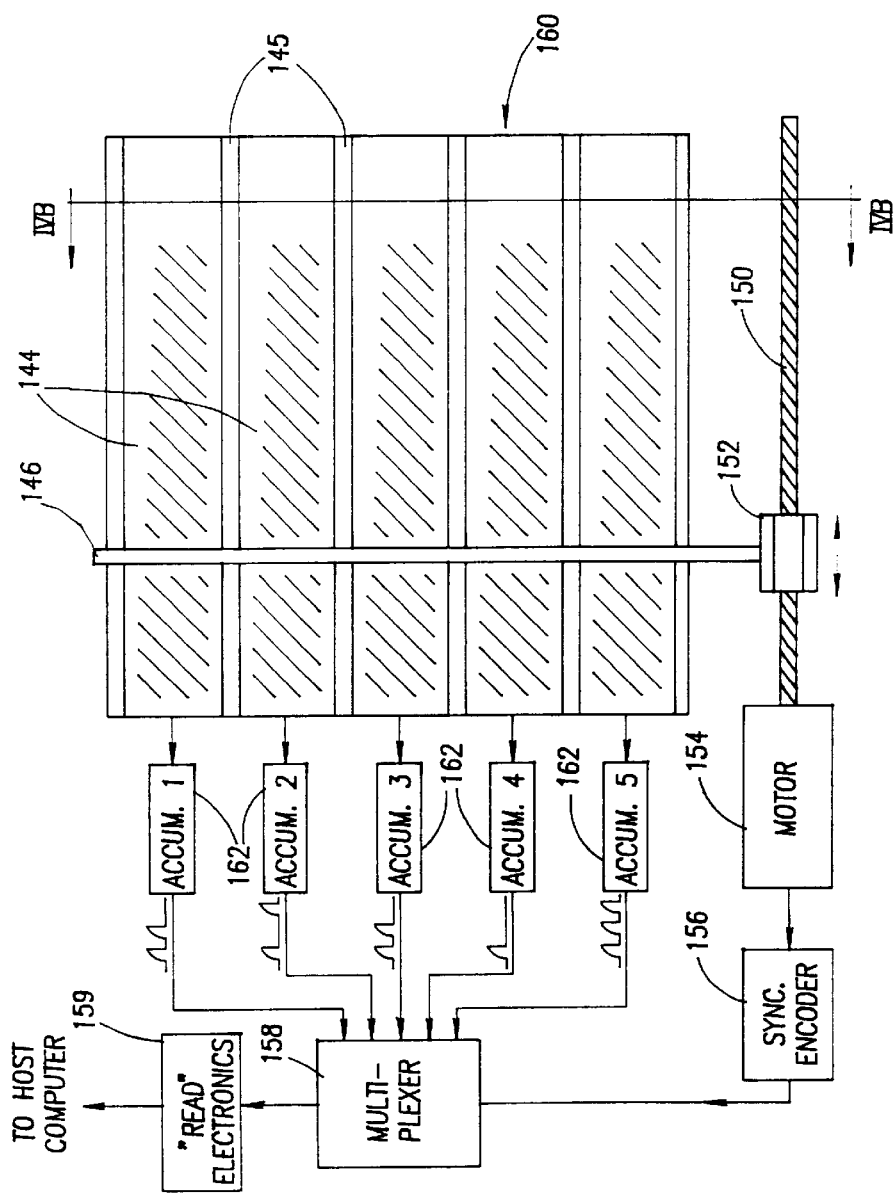

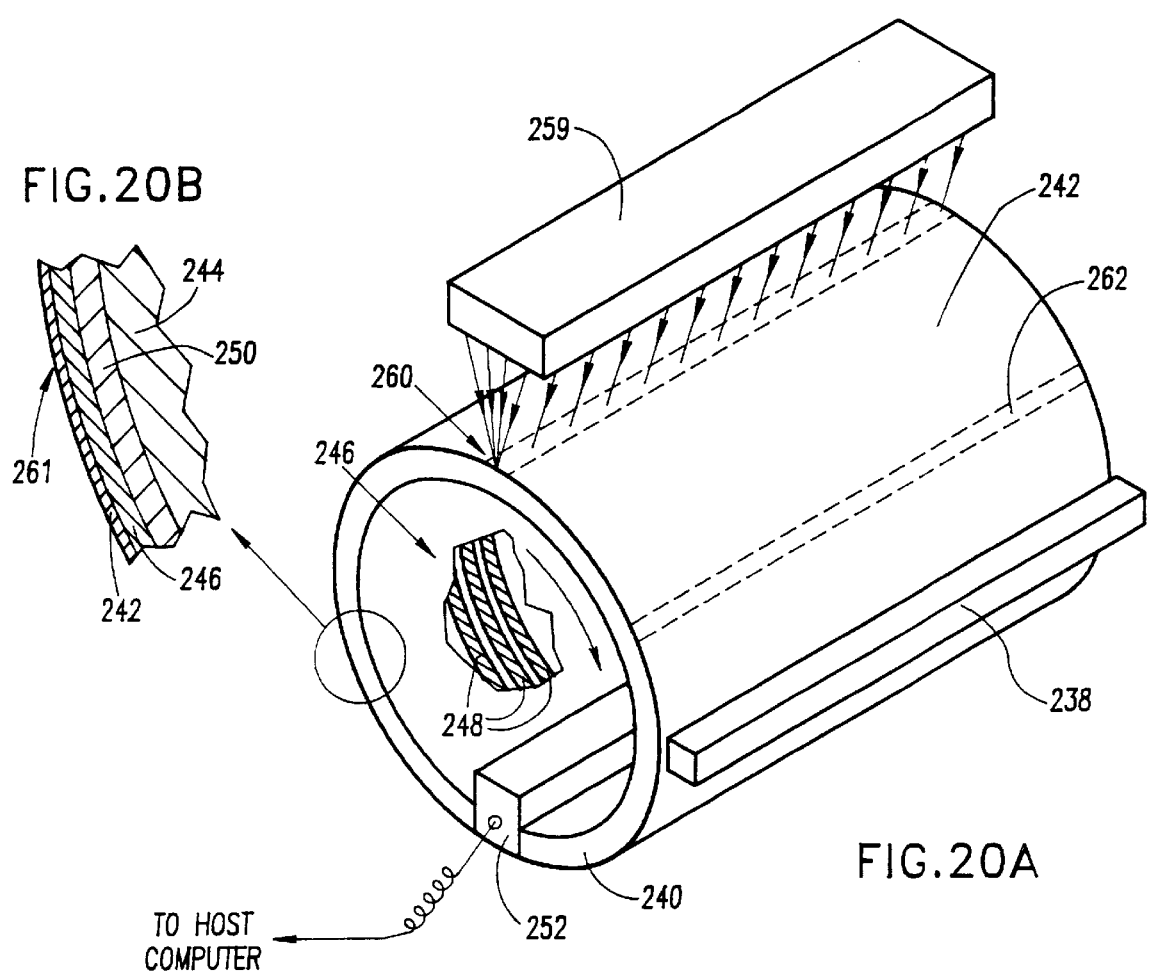
FIG.20B
FIG.20A
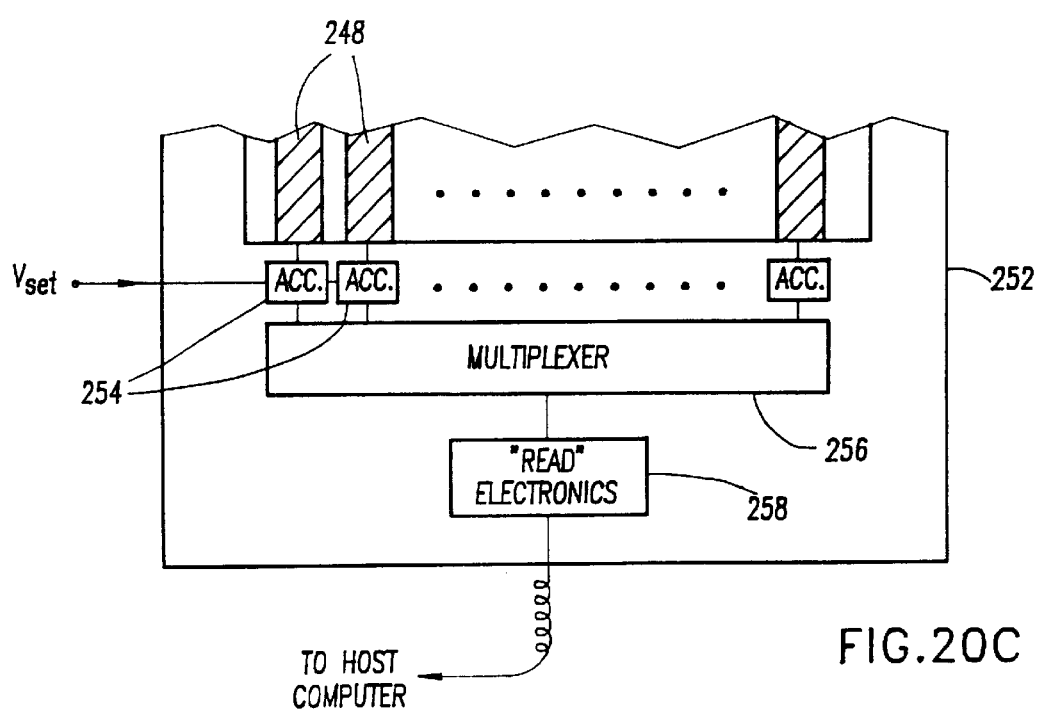
FIG.20C

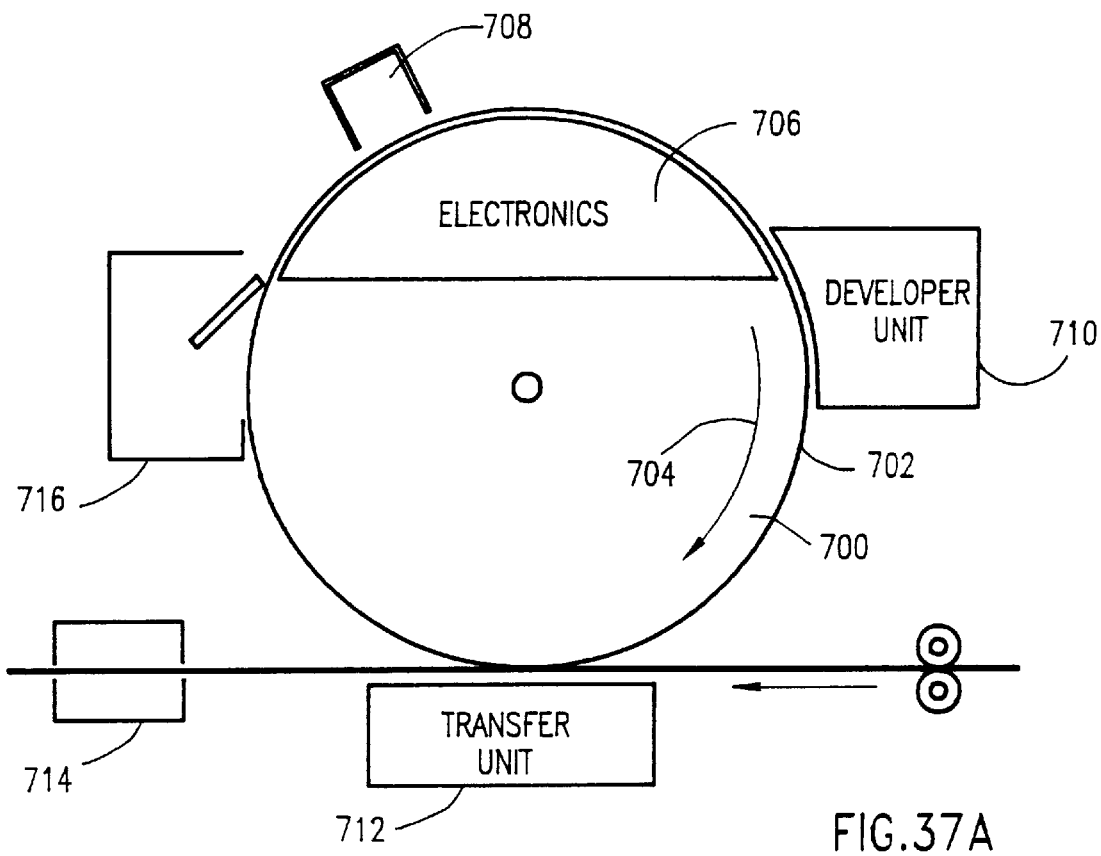
FIG.37A
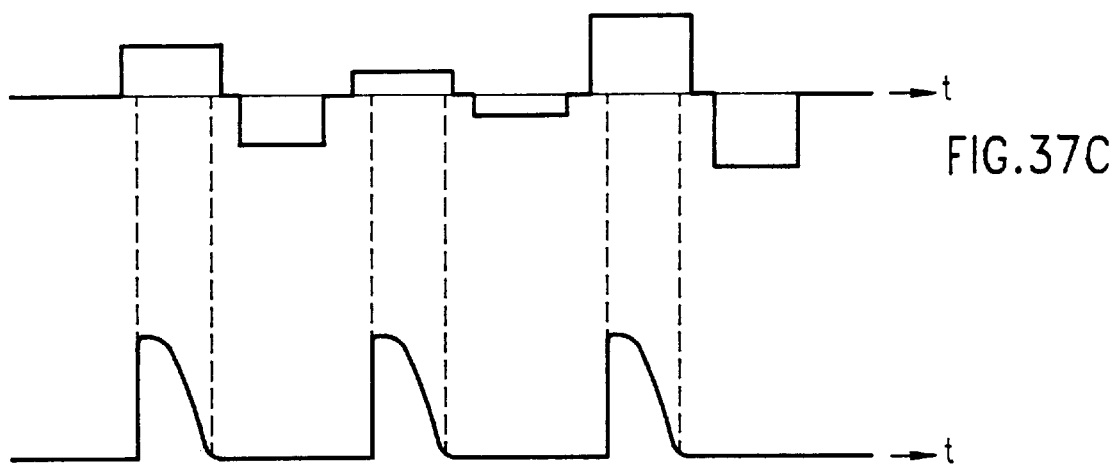
FIG.37C
FIG.37B

APPARATUS FOR PATTERN GENERATION ON A DIELECTRIC SUBSTRATE

REFERENCE TO CO-PENDING APPLICATIONS

This application is a continuation of U.S. patent application Ser. No. 07/944,157, abandoned, filed Sep. 11, 1992, which is a continuation-in-part of U.S. patent application Ser. No. 07/766,691, filed Sep. 27, 1991, now U.S. Pat. No. 5,289,214, which is a continuation-in-part of U.S. patent application Ser. No. 07/697,166, filed May 8, 1991, now U.S. Pat. No. 5,157,423.

FIELD OF THE INVENTION

The present invention relates to apparatus and methods for non-contact printing, reading and imaging.

BACKGROUND OF THE INVENTION

There exist in the patent literature disclosures of a great number of techniques for non-contact printing and imaging. The most widely used of these techniques is electrophotography wherein an electrostatic image is optically formed on a photoconductor, which is then developed with a toner. The toner image is transferred to a substrate and fused thereon.

An additional technique in general use is ionography, wherein an electrostatic image is formed on a dielectric substrate by firing charges directly on the substrate using an imagewise ion source.

A technique for the transfer of electrostatic images from a photoconductor dielectric onto a dielectric substrate has also been proposed in *Electrophotography* by R. M. Schaffert, 2nd Edition, Focal Press, London, 1975 at pages 166–176 and in U.S. Pat. No. 3,055,006. This technique, known as TESI (Transfer of Electrostatic Images) employs an imagewise optical signal to create a charge image on a photoconductor. The charge image is subsequently replicated onto a dielectric substrate by applying single polarity charges to a surface of the dielectric substrate opposite from that surface which faces the photoconductor.

SUMMARY OF THE INVENTION

There is thus provided in accordance with a preferred embodiment of the present invention apparatus for pattern generation on a dielectric substrate having first and second surfaces and including:

apparatus for applying voltage signals to a first surface of the dielectric substrate whereby the voltage signals vary with time and represent a desired pattern;

apparatus for applying a flow of charges to a second surface of the dielectric substrate wherein the charges flow from a generally non-imagewise source and whereby as a result of application of such charges, the second surface retains a non-visible charge pattern corresponding to the desired pattern represented by the voltage signals; and apparatus for thereafter employing the non-visible charge pattern to provide a visible image.

Additionally in accordance with a preferred embodiment of the present invention there is also provided apparatus for charge patterning of a dielectric substrate having first and second surfaces and comprising:

apparatus for imagewise application of voltage to a first surface of the dielectric substrate;

apparatus for applying a flow of charges to the second surface of the dielectric substrate, wherein the charges flow from a generally non-imagewise source and whereby as a result of application of such charges the second surface retains a non-visible charge distribution corresponding to the voltage applied imagewise to the first surface; and apparatus for thereafter employing the charge distribution to provide a visible image.

Additionally in accordance with a preferred embodiment of the present invention there is provided a method for pattern generation on a dielectric substrate having first and second surfaces and including the steps of:

applying voltage signals to a first surface of the dielectric substrate whereby the voltage signals vary with time and represent a desired pattern;

applying a flow of charges to a second surface of the dielectric substrate, wherein the charges flow from a generally non-imagewise source and whereby as a result of application of such charges, the second surface retains a non-visible charge pattern corresponding to the desired pattern represented by the voltage signals; and employing the non-visible charge pattern to provide a visible image.

Additionally in accordance with a preferred embodiment of the present invention there is provided a method for patterning of a dielectric substrate having first and second surfaces and comprising the steps of:

imagewise application of voltage to a first surface of the dielectric substrate;

applying a flow of charges to the second surface of the dielectric substrate, wherein the charges flow from a generally non-imagewise source and whereby as a result of application of such charges the second surface retains a non-visible charge distribution corresponding to the voltage applied imagewise to the first surface; and employing the non-visible charge distribution to provide a visible image.

Further in accordance with a preferred embodiment of the invention there is provided apparatus for marking a dielectric substrate having first and second surfaces and including:

apparatus for applying voltage signals to a first surface of the dielectric substrate whereby the voltage signals vary with time and represent a desired pattern;

apparatus for applying a flow of charges to a second surface of the dielectric substrate wherein the charges flow from a generally non-imagewise source and whereby as a result of application of such charges, the second surface retains a non-visible charge pattern corresponding to the desired pattern represented by the voltage signals; and apparatus for applying toner to the charge pattern on the second surface, thereby to define a marking on the dielectric substrate in accordance with the charge pattern.

Additionally in accordance with a preferred embodiment of the present invention there is provided apparatus for pattern generation on a dielectric substrate having first and second surfaces and including:

apparatus for applying a charge pattern to a first surface of the dielectric substrate; and apparatus for applying an alternating polarity flow of charges to the second surface of the dielectric substrate, wherein the charges flow from a generally non-imagewise source and whereby as a result of application of such charges the second surface retains a non-visible charge distribution corresponding to the charge pattern applied to the first surface; and apparatus for thereafter employing the charge distribution to provide a visible image. In accordance with a preferred embodiment of the invention, and as distinguished from the prior art, the flow of charges is solely responsible for the information transfer and no preconditioning or other treatment is required.

Further in accordance with a preferred embodiment of the present invention there is provided apparatus for pattern generation on a dielectric substrate having first and second surfaces and including:

apparatus, including a plurality of conductive strips disposed adjacent the first surface, for applying voltage signals to a first surface of the dielectric substrate whereby the voltage signals vary with time and represent a desired pattern;

corona apparatus for applying a flow of charges to a second surface of the dielectric substrate wherein the charges flow from a generally non-imagewise source and whereby as a result of application of such charges, the second surface retains a non-visible charge pattern corresponding to the desired pattern represented by the voltage signals; and apparatus for thereafter employing the non-visible charge pattern to provide a visible image.

In accordance with a further embodiment of the present invention there is provided apparatus for reading an electrostatic charge pattern including a dielectric substrate having first and second opposite surfaces, a conductive backing operatively associated with the first surface, an information bearing charge distribution defining a pattern associated with the second surface, apparatus for applying a flow of charges to the second surface thereby converting the information bearing charge pattern to a corresponding electrical signal in the conductive backing and apparatus coupled to the conductive backing for sensing the electrical signal.

The apparatus coupled to the conductive backing preferably includes capacitive apparatus for receiving the electrical signal, and apparatus coupled to the capacitive apparatus for providing spatial pattern information corresponding to the electrical signal.

The apparatus for providing spatial pattern information preferably comprises apparatus for sensing the voltage on the capacitor in a time domain which corresponds to a spatial domain in which the pattern is defined. The apparatus for sensing the voltage preferably comprises sample and hold apparatus.

In accordance with an embodiment of the present invention the flow of charges which is applied to the second surface of the dielectric substrate contains charges of both positive and negative polarities.

Further in accordance with an embodiment of the present invention there is provided a method for reading an electrostatic charge pattern including the steps of providing a dielectric substrate having first and second opposite surfaces, associating a conductive backing operatively with the first surface, associating an information bearing charge distribution defining a pattern with the second surface, applying a flow of charges to the second surface thereby converting the information bearing charge pattern to a corresponding electrical signal in the conductive backing and coupling sensing apparatus to the conductive backing, and sensing the electrical signal.

The step of sensing preferably includes the steps of providing accumulative apparatus for receiving the electrical signal, providing spatial pattern information corresponding to the electrical signal.

The method provided in accordance with an embodiment of the present invention preferably includes the step of sensing the voltage on the accumulative apparatus in a time domain which corresponds to a spatial domain in which the pattern is defined. The voltage preferably is sensed using sample and hold apparatus.

In accordance with an embodiment of the present invention, in the apparatus for reading an electrostatic charge pattern the flow of charges which is applied to the second surface of the dielectric substrate contains charges of both positive and negative polarities and alternates in time between positive and negative charges.

Application of the charges to the second surface is operative to generate at the first surface a voltage signal in accordance with the charge pattern on the second surface.

There is also provided in accordance with an embodiment of the present invention apparatus for information transfer including a dielectric element having generally opposite first and second surfaces, apparatus for associating an information bearing voltage signal with the first surface or an information bearing charge pattern with the second surface and apparatus for applying a flow of charges to the second surface, the flow of charges being operative to transfer information between the first and second surfaces.

Still further in accordance with an embodiment of the present invention the apparatus for applying a flow of charges is operative to convert a voltage signal at the first surface to a corresponding electrostatic charge pattern on the second surface, thereby providing an image writing function.

The apparatus for applying a flow of charges is also operative to convert a charge pattern on the second surface to a corresponding voltage signal at the first surface, thereby providing an image reading function.

Moreover, in accordance with an embodiment of the present invention the apparatus for information transfer includes apparatus for developing the electrostatic charge pattern and transferring the developed pattern to a permanent medium, thereby providing a printing function and apparatus for displaying an electronic image corresponding to the voltage signal, thereby providing a read information output function.

In accordance with an embodiment of the present invention the dielectric element may be operative for storing the charge pattern.

Alternatively, the dielectric element may be a photoconductor which is maintained in conditions of darkness. In such a case, the photoconductor is operative to provide the charge pattern on the second surface in response to an optical input thereto. A scanning operation may be carried out in operative association with the dielectric element, thereby converting an optical image to an electrical signal representation of the optical image.

Additionally in accordance with an embodiment of the present invention the apparatus for information transfer also includes apparatus for imagewise application of voltage to a first surface of the dielectric substrate.

There is also provided in accordance with an embodiment of the present invention a method for information transfer and including the steps of providing a dielectric element having generally opposite first and second surfaces, associating an information bearing voltage signal with the first surface or associating an information bearing charge pattern with the second surface, and applying a flow of charges to the second surface for transfer of information between the first and second surfaces.

The step of applying a flow of charges is operative to convert a voltage signal at the first surface to a corresponding electrostatic charge pattern on the second surface, thereby providing an image writing function, and to convert a charge pattern on the second surface to a corresponding voltage signal at the first surface, thereby providing an image reading function.

In accordance with an embodiment of the present invention, the method also includes the steps of developing the electrostatic charge pattern and the step of transferring the developed pattern to a permanent medium, thereby providing a printing function.

Furthermore, the method preferably includes the steps of imagewise application of voltage to the first surface and displaying the voltage signal, thereby providing a read information output function.

There is further provided in accordance with an embodiment of the present invention apparatus for information transfer and including apparatus for receiving from a computer information representing a voltage signal, apparatus for associated the voltage signal with a first surface of a first dielectric element having first and second surfaces, apparatus for applying a flow of charges to the second surface of the first dielectric element thereby to transfer the voltage signal to a charge pattern on the second surface; apparatus for placing a second dielectric element with a first surface thereof in proximity to the second surface of the first dielectric element, and apparatus for applying a flow of charges to a second surface of the second dielectric element, thereby to cause information transfer from the first dielectric element to the second dielectric element.

In accordance with an embodiment of the present invention, the apparatus for applying a flow of charges to the second surface of the second dielectric element is operative to provide information transfer thereto while leaving the charge pattern on the first dielectric element intact, thereby to enable subsequent replication of information thereon.

Accordingly it is appreciated that successive transfers of information from the first dielectric element to a receiving substrate may take place without requiring re-establishment of the voltage signal on the first surface of the first dielectric element.

Further in accordance with an embodiment of the present invention, information may be transferred to a plurality of receiving substrates in succession.

Moreover, an alternate embodiment of the present invention includes a dielectric element having generally opposite first and second surfaces and at least one information bearing voltage signal, including a continuum of voltage levels, associated with the first surface, and apparatus for applying a flow of charges to the second surface, the flow of charges being operative to transfer information between the first and second surfaces creating a charge pattern containing a continuum of charge density levels on the second surface.

Further in accordance with an embodiment of the invention, the continuum of charge density levels correspond to optical density levels of toning materials.

Additionally in accordance with an embodiment of the invention, at least one information bearing voltage signal comprises a sequence of voltage signals each corresponding to a different basic color. In this embodiment, the apparatus for applying a flow of charges comprises apparatus for sequentially applying a flow of charges for sequential transfer of each of the sequence of voltage signals to the second surface. Preferably, each of the voltage signals has a characteristic voltage to optical density relationship corresponding to the color associated therewith.

Additionally, in accordance with an embodiment of the present invention, the dielectric element is transparent and also comprises apparatus for projecting light through the dielectric element.

Also in accordance with an embodiment of the present invention, the apparatus comprises a multicolor filter and the apparatus for projecting is operative to project light which has passed through a developed image on the dielectric element also through the multicolor filter.

In accordance with yet another embodiment of the invention, there is provided apparatus for information transfer which includes a dielectric element having generally opposite first and second surfaces and having a first information bearing voltage signal associated with the first surface, apparatus for applying a first flow of charges to the second surface, the first flow of charges being operative to transfer information at a first resolution between the first and second surfaces, apparatus for subsequently applying a second information bearing voltage signal to the first surface and apparatus for subsequently applying a second flow of charges to the second surface, the second flow of charges being operative to transfer information at a second resolution between the first and second surfaces.

In further accordance with an embodiment of the invention, the second flow of charges is employed to provide correction of the first information transferred to the second surface.

In accordance with yet another embodiment of the invention, there is provided apparatus for information transfer which includes a dielectric element having generally opposite first and second surfaces, an information bearing voltage signal being associated with the first surface wherein the voltage signal has a predetermined two-dimensional spatial characteristic and apparatus for applying a flow of charges to the second surface, the flow of charges being operative to transfer information represented by the two-dimensional configuration.

There is provided in accordance with another embodiment of the present invention apparatus for generating images and including an element having generally opposite first and second surfaces wherein the element is characterized by having optical transmission dependent on internal electrostatic fields, an information bearing voltage signal being associated with the first surface, and apparatus for applying a flow of charges to the second surface, the flow being operative to generate a spatial image in the element corresponding to the temporal voltage signal.

There is also provided in accordance with an embodiment of the present invention apparatus for information transfer and including a dielectric element having generally opposite first and second surfaces, an information bearing voltage signal being associated with the first surface wherein the voltage signal comprises half tone information, and apparatus for applying a flow of charges to the second surface, the flow of charges being operative to transfer half tone information between the first and second surfaces.

In further accordance with an embodiment of the present invention, the half tone information comprises a continuum of partially filled pixel areas.

Moreover, in accordance with an embodiment of the present invention, the continuum of partially filled pixel area comprise areas that are spatially shifted with respect to adjacent areas.

In accordance with yet a further embodiment of the present invention, there is provided apparatus for information transfer and including a dielectric element having generally opposite first and second surfaces, an information bearing voltage signal associated with the first surface wherein the voltage signal comprises voltages of both polarities, and apparatus for applying a flow of charges to the second surface, the flow of charges being operative to transfer the information between the first and second surfaces creating a dual polarity charge pattern on the second surface.

Further in accordance with an embodiment of the present invention apparatus is provided for toning the dual polarity charge pattern.

Additionally in accordance of an embodiment of the present invention, the toning apparatus comprises apparatus for two-color toning of the dual polarity charge pattern in a single pass.

In accordance with yet another embodiment of the invention there is provided an ion source assembly providing edge definition and comprising an elongate ion source and an elongate electrostatic shield disposed about the elongate ion source and defining an elongate opening parallel to the elongate ion source, the opening including an elongate edge, which limits the spatial extent of ion pathways extending through the opening.

Further in accordance with an embodiment of the present invention there is provided an ion source assembly wherein the electrostatic shield is a grounded conductive shield.

Additionally in accordance with an embodiment of the present invention, there is provided an ion source assembly wherein the elongate ion source comprises at least one elongate conductor and at least one source of AC voltage and a grounded conductive electrode in electrically insulative relationship with at least one elongate conductor whereby the grounded electrode is disposed opposite the elongate conductor.

Alternately, there is provided an ion source assembly according where the grounded conductive electrode is in a gridlike shape.

According to a further alternate embodiment, there is provided an ion source assembly where the grounded conductive electrode comprises an elongate slot.

In accordance with yet another embodiment there is provided apparatus for information transfer and including an ion source assembly providing edge definition which comprises an elongate ion source and further comprises an elongate electrostatic shield disposed about the elongate ion source and defining an elongate opening parallel to the elongate ion source, the opening including an elongate edge, which defines the spatial extent of ion pathways extending through the opening.

Additionally in accordance with a preferred embodiment of the present invention there is provided apparatus for information transfer comprising:

a dielectric element having generally opposite first and second surfaces, an information bearing voltage signal initially being associated with the first surface;

apparatus for applying a flow of charges to the second surface, the flow of charges being operative to transfer information between the first and second surfaces and to provide latent apparent surface voltages on the second surface; and apparatus for amplifying the latent apparent surface voltages on the second surface.

Further in accordance with a preferred embodiment of the present invention there is provided apparatus for information transfer comprising:

a dielectric element having generally opposite first and second surface;

apparatus for associating an information bearing voltage signal with the first surface;

apparatus for applying a flow of charges to the second surface, the flow of charges being operative to transfer information between the first and second surfaces and to provide latent apparent surface voltages on the second surface; and apparatus for developing the apparent surface voltages, characterized in that the apparatus for associating and apparatus for developing operate generally simultaneously.

Preferably the apparatus for associating operates in a pulsed mode.

Additionally in accordance with a preferred embodiment of the present invention there is provided a method for information transfer comprising:

providing a dielectric element having generally opposite first and second surfaces, an information bearing voltage signal initially being associated with the first surface;

applying a flow of charges to the second surface, the flow of charges being operative to transfer information between the first and second surfaces and to provide latent apparent surface voltages on the second surface; and amplifying the latent apparent surface voltages on the second surface.

Further in accordance with a preferred embodiment of the present invention there is provided a method for information transfer comprising:

associating an information bearing voltage signal with a first surface of a dielectric element having generally opposite first and second surfaces;

applying a flow of charges to the second surface, the flow of charges being operative to transfer information between the first and second surfaces and to provide latent apparent surface voltages on the second surface; and developing the apparent surface voltages, characterized in that the steps of associating and developing operate generally simultaneously.

Preferably the step of associating operates in a pulsed mode.

BRIEF DESCRIPTION OF THE DRAWINGS

The present invention will be understood and appreciated more fully from the following detailed description, taken in conjunction with the drawings in which:

FIGS. 4A and 4B are respective generalized and side view illustrations of apparatus for applying voltage and charges to opposite surfaces of a dielectric substrate in accordance with another embodiment of the present invention;

FIGS. 6A and 6B are simplified illustrations of apparatus for printing constructed and operative in accordance with a preferred embodiment of the present invention;

FIGS. 9A, 9B and 9C are diagrams illustrating the behavior of voltages at different points on the electronic circuit of FIGS. 8A and 8B;

FIGS. 14A and 14B are respective generalized and side view illustrations of apparatus for reading a charge pattern on the surface of a dielectric substrate in accordance with another embodiment of the present invention;

FIGS. 20A–20C are illustrations of the operation of an image scanning system constructed and operative in accordance with a preferred embodiment of the present invention;

FIG. 37A is a simplified illustration of printing apparatus constructed and operative in accordance with another preferred embodiment of the present invention;

FIGS. 37B and 37C are signal diagrams illustrating electrical signals produced by the apparatus of FIG. 37A;

DETAILED DESCRIPTION OF A PREFERRED EMBODIMENT

Figure 1A:
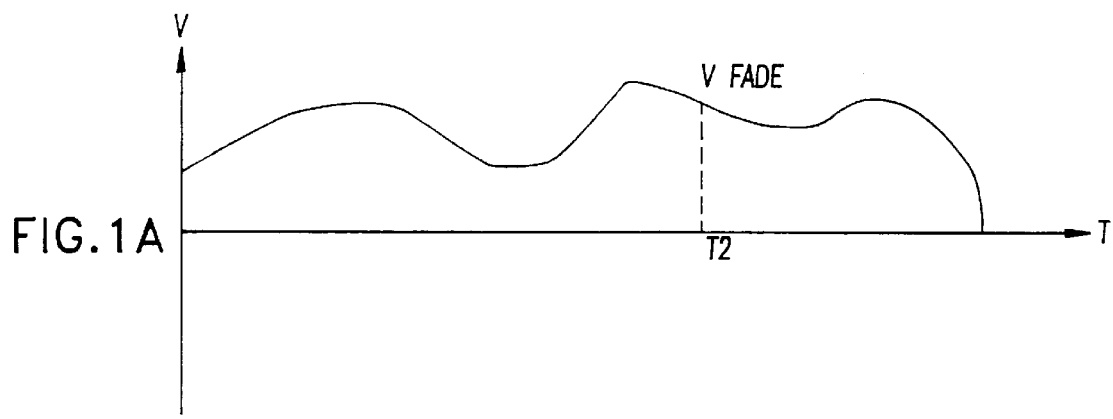
FIGS. 1A, 1B, 1C and 1D are illustrations of the application of voltage or charge on various surfaces over time in accordance with a preferred embodiment of the present invention.

Reference is now made to FIGS. 1A–1D, which illustrate the operation of the present invention. FIG. 1A illustrates an arbitrary voltage at a typical point location on a first surface of a dielectric substrate as it varies over time. The voltage may be applied to the typical point location by means of a conductive backing associated with the first surface of the dielectric substrate in touching or capacitive relationship therewith. The conductive backing may be a separate conductor in close proximity to, or alternatively a permanent coating or layer formed on, the first surface of the dielectric substrate.

Figure 1B:
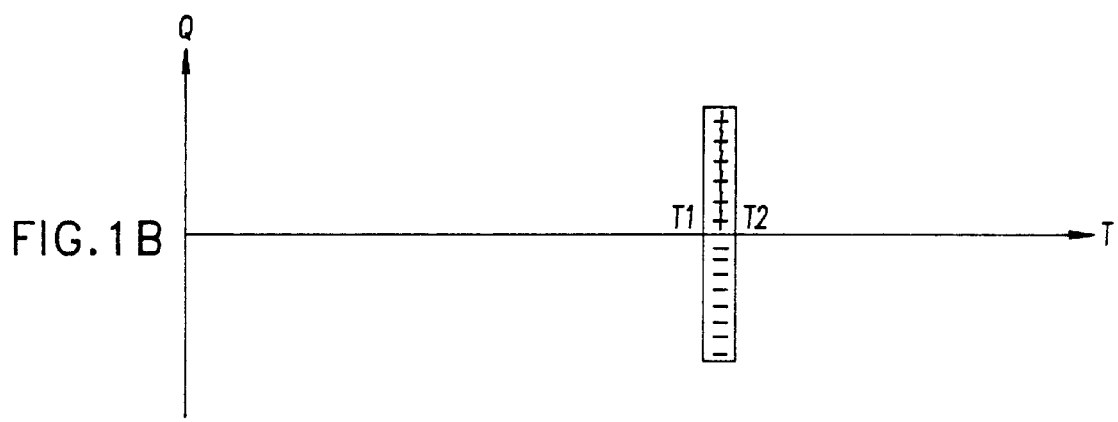

FIG. 1B illustrates, on the same time scale as in FIG. 1A, the application of a flow of charges to a second surface of the dielectric substrate, which is opposite to and generally uniformly spaced from the first surface, to temporarily neutralize the effect on the second surface of the voltage applied to the first surface. Following application of such charges the second surface retains a charge corresponding to the voltage which was applied to the first surface, at the time T2 that the application of such charges ceased, but of an opposite polarity thereto.

According to a preferred embodiment of the invention, the flow of charges comprises an alternating polarity charge flow to a second surface of the dielectric substrate which is opposite to and generally uniformly spaced from the first surface. It is preferred that the time variation of the voltage applied to any given location on the first surface be sufficiently small such that at least during an end portion of the duration of the alternating polarity charge flow at such location, the voltage variation is essentially zero.

The alternating polarity charge flow at each location is represented in FIG. 1B by a stack of positive and negative charges. The beginning and end of the duration of the application of the alternating polarity charge flow at each location are indicated in FIG. 1B respectively as T1 and T2.

Figure 1C:
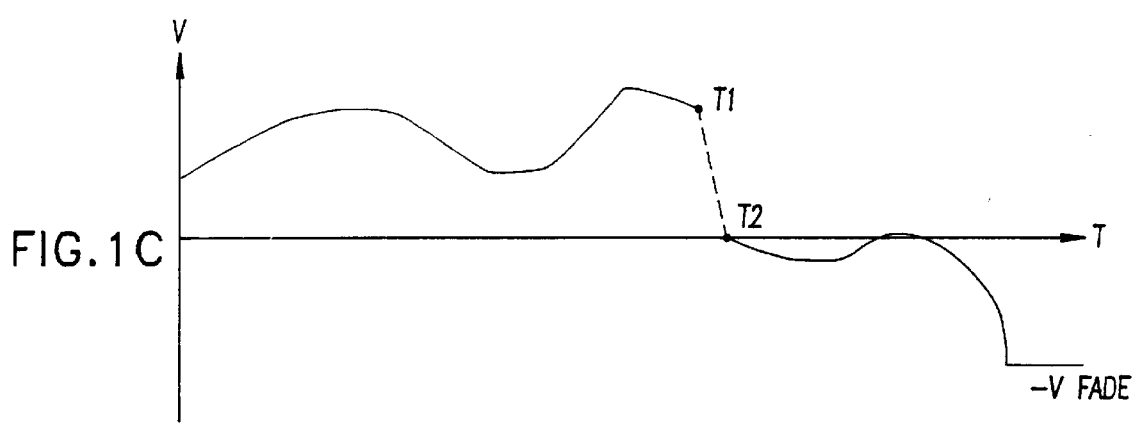

FIG. 1C illustrates the voltage on the second surface of the dielectric substrate. It is noted that this voltage tracks the voltage on the first surface until the charge flow begins at time T1. Upon termination of the charge flow at time T2, the voltage of the second surface is very nearly zero. Thereafter if the voltage on the first surface is brought to zero, the voltage on the second surface becomes approximately the negative of the voltage on the first surface at time T2, due to charge accumulation on the second surface.

Figure 1D:
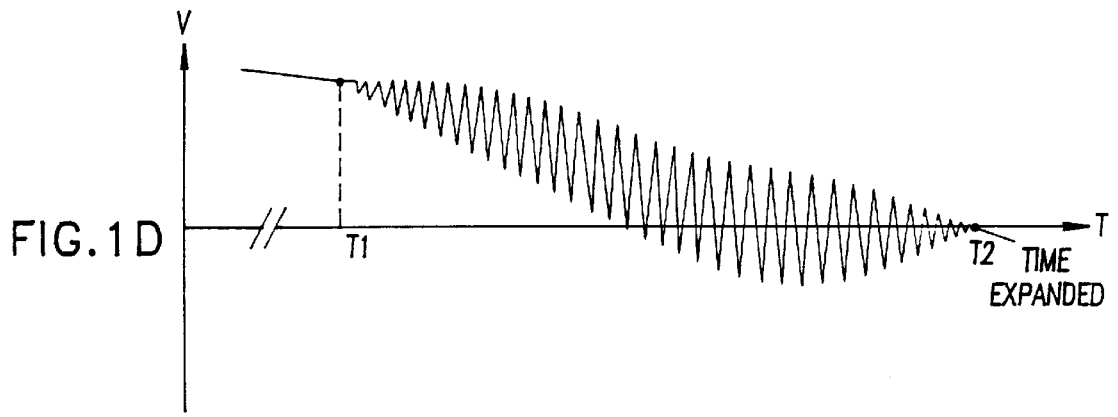

FIG. 1D is an expanded time scale illustration corresponding to FIG. 1C and illustrating with greater particularity one possible application of an alternating charge flow to the second surface, which results in a reduction in the voltage on the second surface from the voltage at Ti to very nearly zero at T2.

Figure 2:
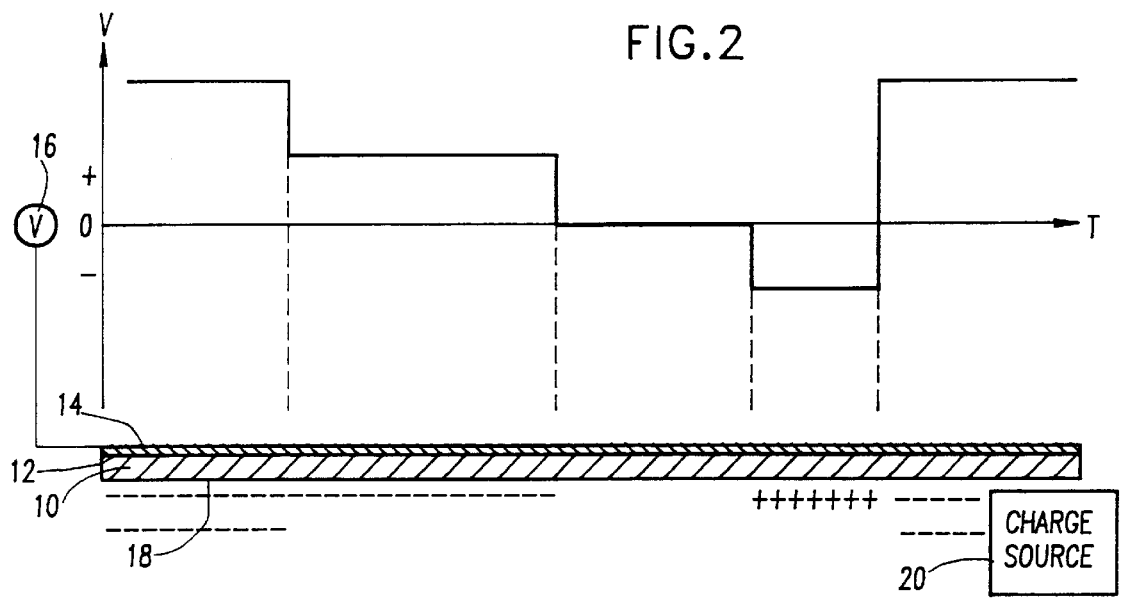
FIG. 2 is an illustration of a time varying voltage signal on a first surface of a dielectric substrate resulting in a corresponding charge pattern on an opposite surface of the dielectric substrate in accordance with a preferred embodiment of the present invention.

Referring now to FIG. 2, there is shown schematically an arbitrary voltage signal provided on a dielectric substrate 10 at a first surface 12 thereof, which is preferably backed with a conductive backing 14 to which is coupled a time-variable voltage source 16. FIG. 2 also illustrates in one dimension, the corresponding spatial charge pattern, of opposite polarity to the corresponding voltage signal, which is produced on a second surface 18 of the dielectric substrate in accordance with the present invention, by application of a flow of charges to the second surface which is operative to temporarily neutralize the effect on the second surface of the voltage applied to the first surface 12. The application of the flow of charges is preferably provided by an alternating polarity charge source (APCS) 20, such as an AC corona, capable of achieving a spatial edge accuracy consistent with the desired resolution. Such an AC corona may be realized by employing one or more corona wires or needles enclosed within a shield having a defined charge outlet opening and by amplitude modulation of the AC voltage supplied to the corona wire or wires.

The charge source 20 is preferably moved at a velocity v along the second surface 18 of the dielectric substrate 10, indicated by an arrow 22.

Figure 3:
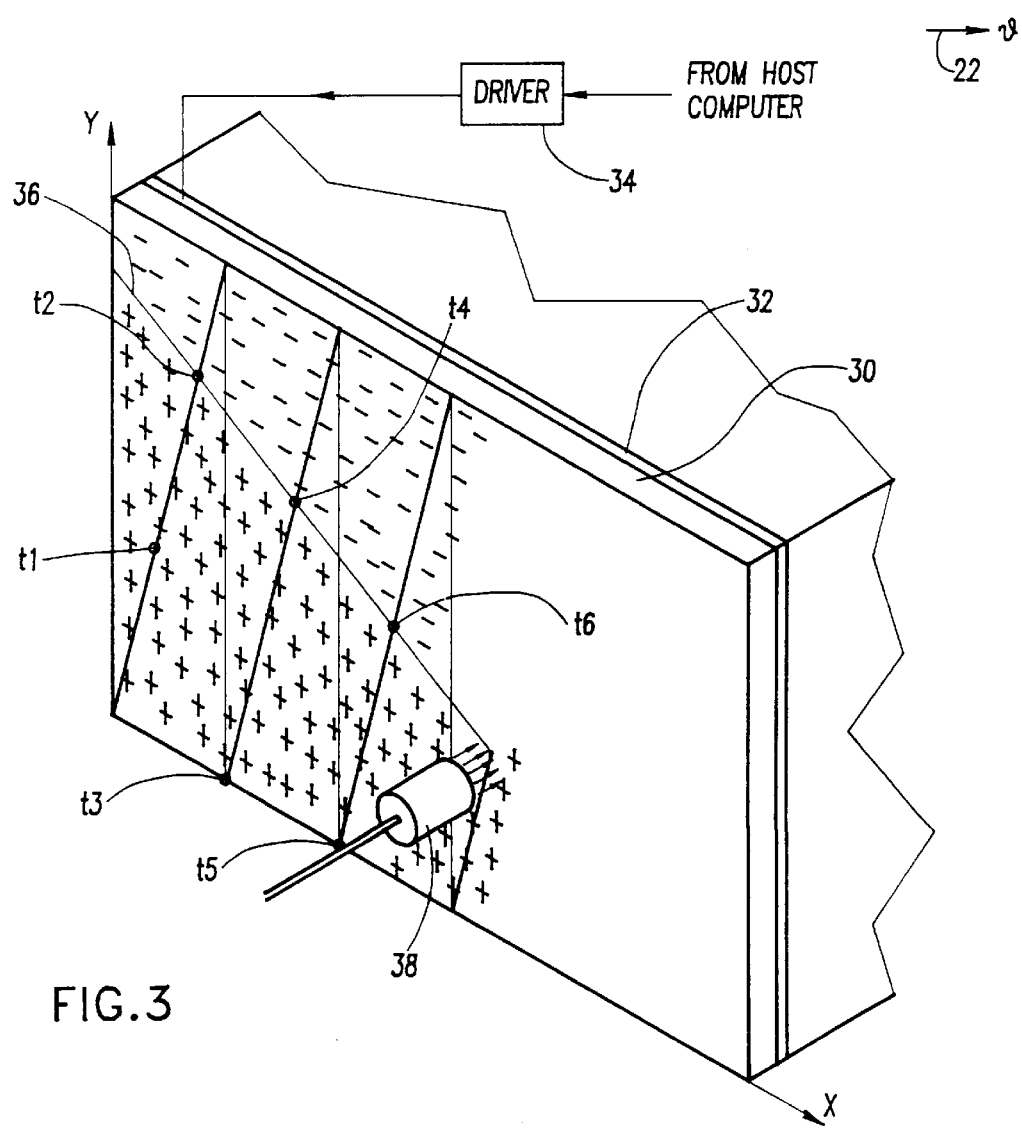
FIG. 3 is a pictorial illustration of apparatus for applying voltage and charges to opposite surfaces of a dielectric substrate in accordance with one embodiment of the present invention.

Reference is now made to FIG. 3 which is a pictorial illustration of apparatus for applying voltage and charges to opposite surfaces of a dielectric substrate 30 in accordance with one embodiment of the present invention. In this embodiment, a conductive plate 32 may be disposed adjacent a first surface of the dielectric substrate 30 and may receive a time-varying voltage from a voltage driver 34, which may be controlled by a host computer.

In the illustrated embodiment, it is desired to produce or write on a second surface a charge pattern which is uniformly negative above a diagonal line 36 and is uniformly positive below the diagonal line. It is appreciated that any suitable charge pattern may be produced using the apparatus and technique illustrated in FIG. 3 and described herein.

A charge source 38, such as that described above, which produces charges which vary in polarity as a function of time, scans the second surface of the dielectric substrate 30 along an arbitrary pattern, such as the up/down and sideways pattern illustrated in FIG. 3.

As described above, in accordance with a preferred embodiment of the invention, as the charge source 38 moves out of charge supply engagement with a given location on the second surface of the substrate 30, at a given time, the residual charge at such location corresponds to the negative of the voltage on the first surface at such time. Thus, it may be appreciated, the modulation of the voltage on conductive plate 32, coordinated with the two dimensional position of the charge source 38 on the second surface enables charge writing on the second surface by modulation of the voltage applied to the first surface, whereby the modulated voltage has information content.

Figure 7A:
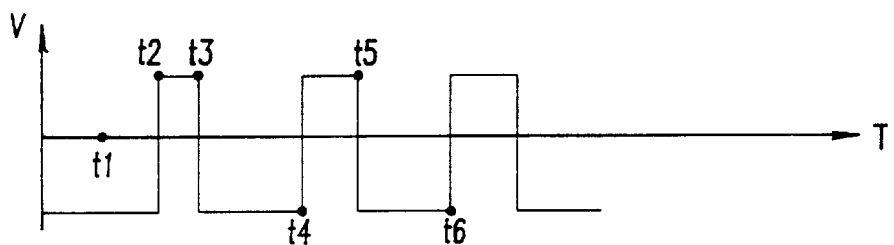
FIGS. 7A, 7B and 7C are diagrams of various operational parameters of the apparatus of FIG. 3.
Figure 7B:
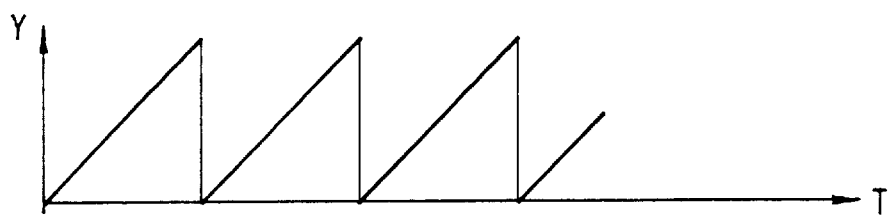
Figure 7C:
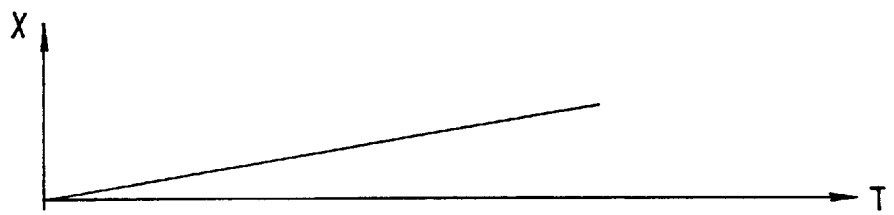

The operation of the apparatus of FIG. 3 may be appreciated and understood better by means of reference to FIGS. 7A–7C. FIGS. 7A–7C, which all lie along the same time scale, illustrate operational parameters of the operation of the apparatus of FIG. 3. FIG. 7A, illustrates the voltage applied to the conductive backing layer 32 and thus to the first surface of the dielectric substrate as a function of time. The indications t1–t6 illustrate the position of the charge source 38 at various times.

FIGS. 7B and 7C illustrate the Y and X positions of the charge source 38 as a function of time.

Reference is now made to FIGS. 4A and 4B which illustrate apparatus for applying voltage and charges to opposite surfaces of a dielectric substrate 42 in accordance with another embodiment of the present invention. In this embodiment, an elongate alternating polarity charge source (EAPCS) 46, such as that described above and being capable of achieving a spatial edge accuracy consistent with the desired resolution, but employing elongate wires instead of needles, is scanned in one dimension, perpendicular to its longitudinal axis, along the second surface 48 of substrate 42, by means of a linear drive mechanism including a worm screw 50 cooperating with a screw rider 52, fixed to source 46. An electric motor 54 drives the worm screw 50 in response to the outputs of a commercially available synchronized driver 56. A host computer (not shown) provides positioning instructions via a multiplexer 58 to driver 56.

In this embodiment, a multisectional conductive backing layer 60, typically comprising a plurality of elongate strips 44, is associated with the first surface of the dielectric substrate 42. Each strip 44 is provided with an information content modulated time varying voltage via a corresponding driver 62, in response to control signals received from the host computer via multiplexer 58.

It may be appreciated that in the embodiment of FIGS. 4A and 4B a charge pattern is written on the second surface by information content modulation of voltages applied simultaneously to the different regions of the first surface of the dielectric substrate 42 via strips 44 in synchronism with the one dimensional scanning motion of source 46.

It will be appreciated that in principle due to the parallel voltage "writing", the apparatus of FIGS. 4A and 4B has an intrinsically greater writing speed than the apparatus of FIG. 3.

It is appreciated that a desired two-dimensional spatial resolution may be achieved by adjusting appropriate parameters. In a first dimension, the parameters to be adjusted include the width of the elongate strips 44, the width of a gap 45 between adjacent strips 44 and the thickness of the dielectric layer 42. In a second dimension, the parameters include the edge definition of the EAPCS 46. The gaps 45 should be filled with electrically insulative dielectric material having high dielectric strength. Alternatively, gaps 45 may be filled with highly resistive material.

It is further appreciated that the write techniques described hereinabove allow an uninterrupted line of uniform width as small as one pixel to be achieved. The advantages of these techniques include the replacement of dot pixels thus eliminating holes between pixels. Accordingly, intentional overlap of pixels is not necessary.

According to an alternate embodiment of the present invention, a film may serve as dielectric substrate 42. When a charge pattern is written on the film surface, electrostatic field patterns may be induced in the film. Typically the induced electrostatic field pattern corresponds to the charge pattern.

Films whose level of optical transmission are dependent on internal electrostatic fields may be capable of serving as dielectric substrate 42. Examples of such film are thermoplastics and liquid crystal films. Typically in this embodiment conductive strips 44 are transparent.

It is appreciated that when such a film serves as the dielectric substrate, the film may operate as a spatial light modulator.

Multi-sectional conductive backing layer 60 may comprise a uniform conductive film from which a plurality of strips are created using an etching technique such as laser etching, chemical etching, or ion etching. Alternately the multi-sectional conductive backing layer may comprise a grid comprising a weave of straight conductive wires in one dimension and insulating curved wires in a second dimension. This type of grid is available from Carbotex of Grutlistrasse 68, Zurich, Switzerland. Alternatively, the multi-sectional conductive backing layer 60 may be produced by electroforming techniques.

Drivers 56 may be implemented by using standard microelectronics and hybrids which may be connected to the conductive strips by standard microscopic bonding techniques.

Figure 5A:
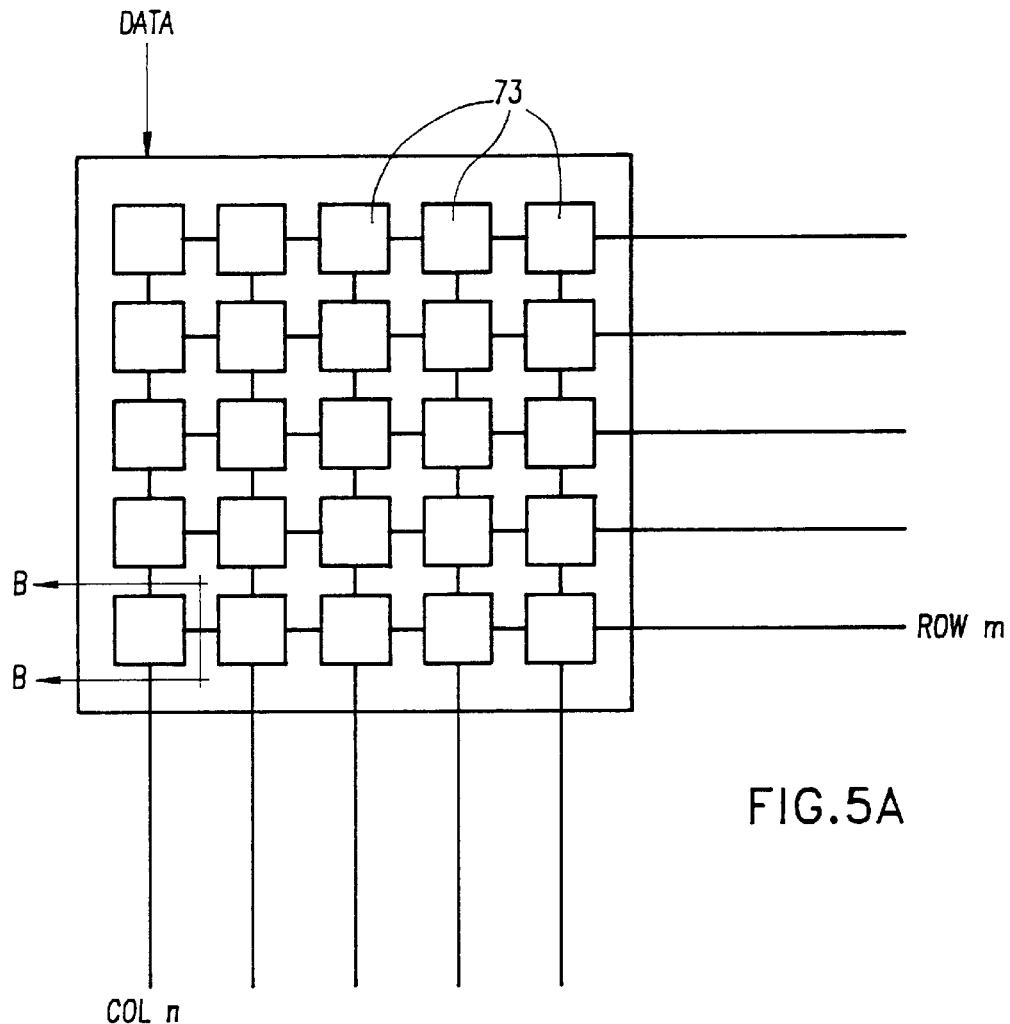
FIGS. 5A and 5B are respective generalized and detail illustrations of apparatus for applying voltage and charges to opposite surfaces of a dielectric substrate in accordance with yet another embodiment of the present invention.
Figure 5B:
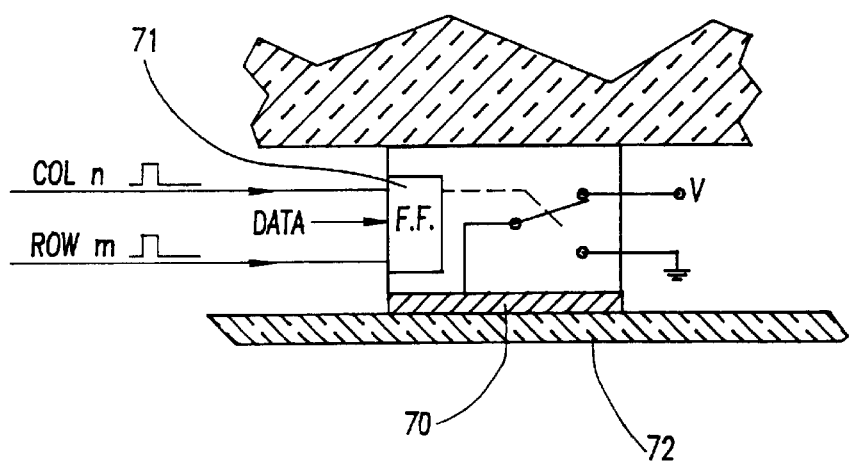

Reference is now made to FIGS. 5A and 5B which are respective generalized and detail illustrations of apparatus for applying voltage and charges to opposite surfaces of a dielectric substrate in accordance with yet another embodiment of the present invention. Here strips 44 in the embodiment of FIGS. 4A and 4B are replaced by a two dimensional array of pixel sized conductive pads 70 which define a two-dimensionally addressable array 73 disposed adjacent the first surface of a dielectric substrate 72. In this case, the alternating polarity charge source need not scan the second surface but instead may uniformly deposit charges thereover.

It may be appreciated that in the embodiment of FIGS. 5A and 5B a charge pattern is written on the second surface by information content modulation of voltages applied simultaneously to the different regions of the first surface of the dielectric substrate 72 via individual pads 70. In this case, a scanning alternating polarity charge source having precisely defined edge resolution need not be provided and may be replaced by static apparatus for supplying a uniform flow of alternating polarity charges over the entire array 73.

FIG. 5B illustrates a schematic arrangement for addressing a given pad 70, corresponding to a given area element or pixel on the dielectric surface, with either a given voltage or ground.

When a pixel (m,n) is addressed using matrix addressing techniques, the common input data is stored by a data flip-flop 71 associated with pixel (m,n), determining when voltage V is provided to the conductive backing on the dielectric substrate 72 at the corresponding location.

Reference is now made to FIGS. 6A and 6B which illustrate an imaging system constructed and operative in accordance with a preferred embodiment of the present invention and comprising a dielectric substrate 80 having a first surface 82 and a second surface 84. The dielectric substrate 80 may be self-supporting or alternatively supported on a suitable support, such as a plate of glass.

The imaging system includes a charge patterning station 86 and a toner application and printing station 88. In this embodiment, the dielectric substrate 80 is reused and moves repeatedly between the stations 86 and 88. The charge patterning station 86 preferably comprises apparatus of the general type described in connection with the embodiment of FIGS. 4A and 4B, while the toner application and printing station 88 may be any conventional toner application and printing device.

It is appreciated that a printing and imaging system may equally be operative using a charge patterning station according to any embodiment of the invention, including, without limitation, those illustrated in FIGS. 3–5B.

For example, station 88 may comprise conventional toner application apparatus 90 for applying toner to a charged surface of a dielectric, thereby providing a toner image on the second surface, as indicated by reference number 92 and an intermediate transfer member 94 for transferring the toner image 92 onto a final substrate 96, such as paper, onto which the toner image is fused by conventional techniques. A cleaning unit 97 cleans the intermediate transfer member 94 following transfer.

FIG. 6A illustrates the stage of toner application and transfer to the final substrate, while FIG. 6B illustrates cleaning of the dielectric substrate 80 by a conventional cleaning unit 98.

The unique feature of the apparatus of FIGS. 6A and 6B lies in the fact that unit 86 comprises apparatus in which a charge source along the second surface of the dielectric substrate 80 temporarily neutralizes the effect on the second surface of the voltage applied to the first surface, whereby following application of such charges, the second surface retains a charge corresponding to the voltage applied to the first surface at the time that the application of charge at each given location was discontinued.

It is appreciated that imaging and printing systems may be provided wherein the intermediate transfer member may be eliminated and thus the dielectric substrate 80 on which the charge image is initially formed is the final substrate to which the toner image is eventually fused. As a further alternative, transfer of the toner image on the dielectric substrate 80 directly to a final substrate may be provided.

The foregoing apparatus and techniques may be employed inter alia for mask generation in three-dimensional modeling systems such as those described in assignee's U.S. Pat. No. 4,961,154 and U.S. patent application Ser. No. 07/240,318.

Figure 8A:
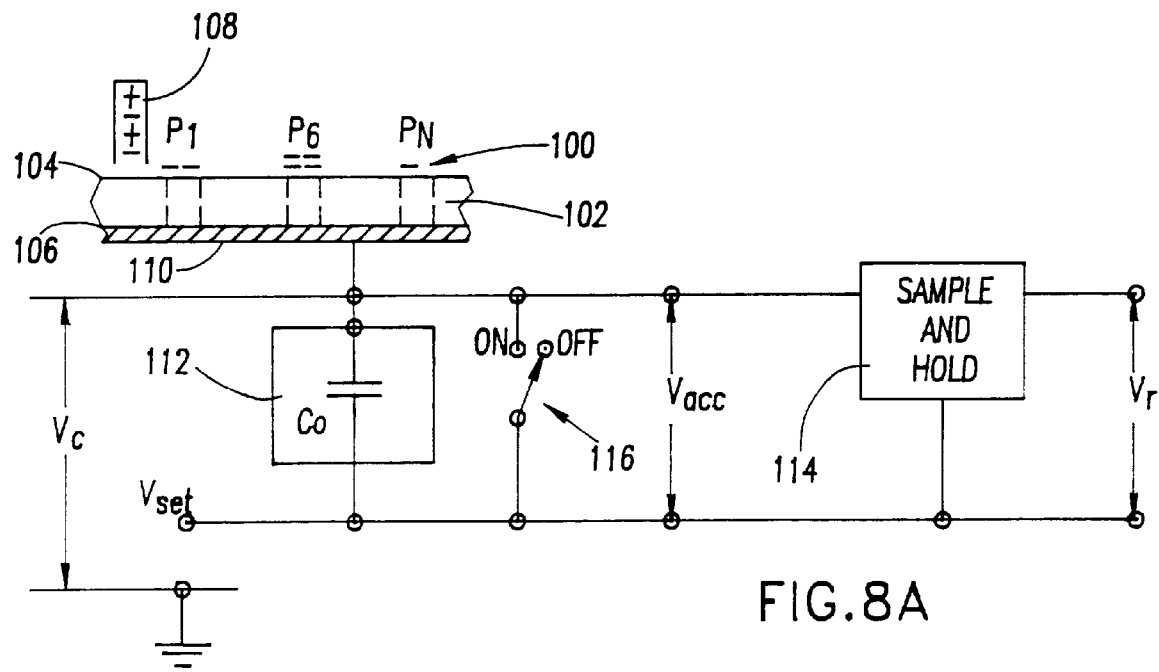
FIGS. 8A and 8B are illustrations of apparatus for reading an electrostatic charge pattern on a surface of a dielectric substrate.
Figure 8B:
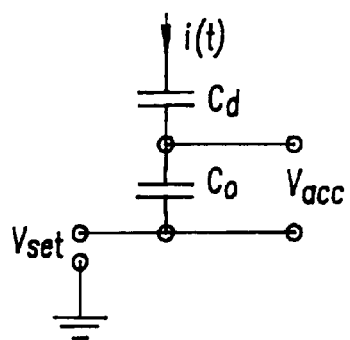

Reference is now made to FIGS. 8A and 8B which illustrate apparatus for reading an electrostatic charge pattern 100 on a surface of a dielectric substrate 102. The dielectric substrate can be any suitable dielectric substrate and may include a photoconductor or any substrate which exhibits dielectric qualities at a given time.

The charge pattern 100 to be read is created by any suitable technique on a surface 104 of a dielectric substrate having first and second opposite surfaces 104 and 106, such as any dielectric substrate described hereinabove. The charge pattern 100 is distributed over discrete regions (P1 . . . PN) of the substrate.

In accordance with an embodiment of the invention, each region of the pattern is read individually using the technique described below. Each such region typically defines a pixel. Normally a two dimensional pixel distribution is envisioned. For convenience of illustration, only one dimension is illustrated in many of the drawings herein.

As illustrated in FIG. 8A, an alternating polarity charge source (APCS) 108, which may be as mentioned hereinabove, is employed to supply a flow of charges to the region P1 of surface 104. As the flow of charges is supplied to the region P1, a current is induced in a conductive backing 110 lying adjacent surface 106 and a charge, corresponding to the charge originally at region P1, is accumulated, preferably by capacitive means 112. The capacitive means is electrically coupled to the conductive backing 110 and comprises a capacitor having a capacitance of $C_o$.

Electronic means for sensing and measuring the accumulated charge, typically including a sample and hold device 114, are coupled to the capacitive means. Preferably the electronic means further comprises an electronic switch 116 which, when open, causes charge to accumulate in the capacitive means 112. When the electronic switch 116 is closed, the capacitive means 112 is discharged and reset. An output of the electronic means, an analog voltage $V_r$, is indicative of the charge at region P1 prior to the supply of charges thereto by APCS 108. The voltage $V_r$ may be serially stored in an external digital memory device (not shown) by using an analog to digital converter.

The steps of supplying a flow of charges and then sensing the generated voltage signal may be repeated across the entire substrate resulting in serial data outputs from pixel regions P1 to Pn where n is the number of pixels on the substrate. The serial data of the different regions represents the entire pattern.

FIG. 8B illustrates an equivalent circuit corresponding to the electrical relationship of the APCS 108, the substrate 102, the conductive backing 110 and the capacitive means 112. The electronic means comprising switch 116 and sample and hold circuit 114 may be collectively referred to as "read electronics".

Reference is now made to FIGS. 9A–9C which illustrate the behavior of voltages at different points on the electronic circuit described in FIGS. 8A and 8B.

FIG. 9A illustrates the status of the electronic switch 116. When closed, switch 116 causes the capacitor 112 to discharge and reset. When switch 116 is open, the capacitor 112 may accumulate charge.

FIG. 9B illustrates the effective voltage across the capacitor 112 as a function of time. At time T1, the APCS 108 begins to sweep over region P1 and supplies a net flow of charges to that region, inducing a current flow from the conductive backing 110 to capacitor 112, producing accumulation of charge thereat.

This current flow continues until the net effect of the charge flow from the APCS 108 on pixel P1 is zero. At time T2, the voltage across the capacitor 112, $V_{acc}$, is sampled and processed by the sampling and hold circuit 114. FIG. 9C graphically illustrates output voltage $V_r$ as a function of time.

The equivalent circuit of FIG. 8B can be further employed to describe the behavior of the apparatus of FIG. 8A. The dielectric substrate 102 is represented by capacitor $C_d$ in FIG. 8B. The surface charge at an arbitrary pixel P1, associated with the charge pattern previously present on the surface 104 of the substrate 102 is denoted, for the purposes of the discussion which follows, as $Q_d$ and the voltage $V_d$ across the dielectric, associated with this charge is:

$$V_d = Q_d/C_d \qquad (1)$$

The APCS 108 provides a flow of charges to the dielectric surface 102 causing charging of the accumulator 112. This may be envisioned as the result of an equivalent current flow i across both the dielectric $C_d$ and the capacitor $C_o$, which represents accumulator 112.

Consequently, the potential across the dielectric changes from $V_d$ to $V_{d^*}$ where $$V_{d^*} = V_d + 1/C_d \int_{T1}^{T2} i\,dt \qquad (2)$$

where T1 and T2 are the T1 and T2 defined in association with FIG. 9B and i is the current flowing.

Simultaneously a voltage $V_{acc}$ develops across capacitor $C_o$ where:

$$V_{acc} = 1/C_o \int_{T1}^{T2} i\,dt \qquad (3)$$

According to the above description of the operation of the APCS, the effective flow of net charge to the pixel P1 at the dielectric surface continues until the potential resulting from both the residual charge on surface 104 and the voltage of the conductive backing 110 at pixel P1 is effectively zero. Therefore at T2 the potential $V_{d^*}$ is given by $$V_{d^*} = -(V_{set} + V_{acc}) \qquad (4)$$

The value of $V_{acc}$ is obtained by combining equations 1–4 where $$V_{acc} = -(V_{set} + V_d)C_d/(C_d + C_o) \qquad (5)$$

For a particular case where $V_{set}$ is ground $$*V_{acc} = -aV_d \qquad (6)$$

where a is defined as:

$$a = C_d/(C_d + C_o) \qquad (7)$$

The value for $C_o$ may be determined by examining the ratio between the voltage $V_d$, prior to APCS charge supply, and $V_{acc}$. Since the potentials of electrostatic images are typically on the order of hundreds of volts and $V_{acc}$ is desirably no more than a few volts, a typical value for $C_o$ is 100 times greater than the pixel capacitance $C_d$.

It is further appreciated that since $V_{acc}$ is considerably smaller than $V_{set}$, the ultimate potential across the dielectric surface is practically equal to $V_{set}$, irrespective of the previous charge $Q_d$.

Figure 10A:
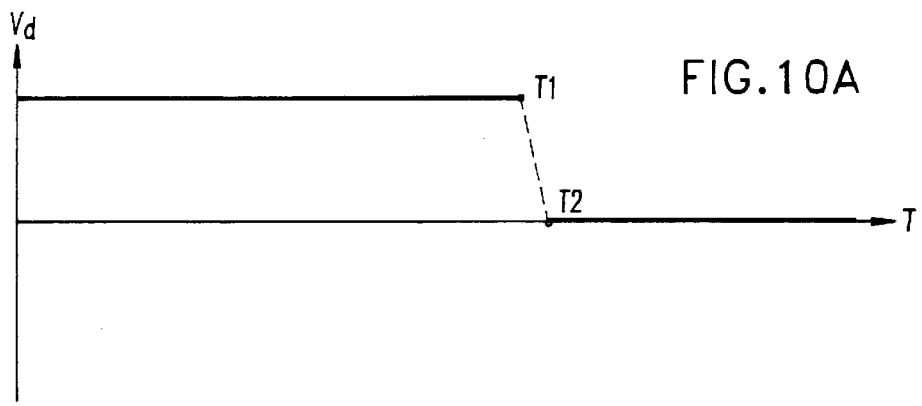
FIGS. 10A, 10B, 10C and 10D are diagrams illustrating the operation of the apparatus of FIGS. 8A and 8B at a single pixel location on the surface of the dielectric substrate.

Reference is now made to FIGS. 10A–10D, which illustrate the operation of the apparatus of FIGS. 8A and 8B at a single pixel location on the surface of the dielectric substrate 102. FIG. 10A illustrates the voltage $V_d$, at that same pixel location as it varies with time for a case where $V_{set}$ is ground. Therefore following the sweep of the APCS of the pixel location, the voltage remaining thereat is effectively zero.

Figure 10B:
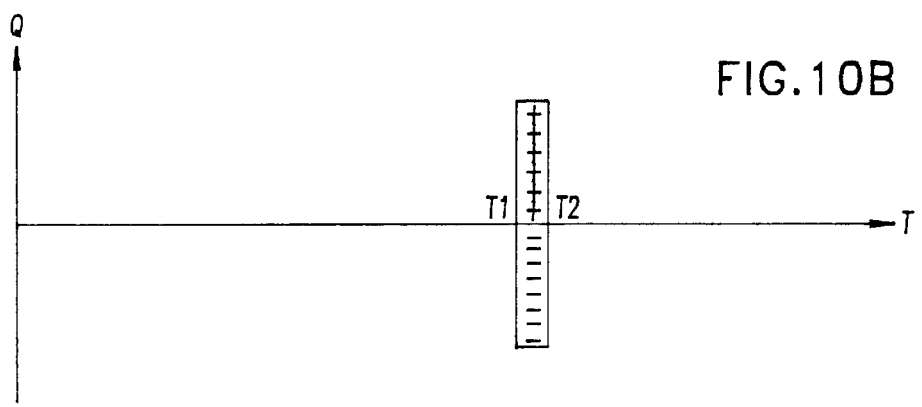

FIG. 10B illustrates, on the same time scale as that of FIG. 10A, the application of a flow of charges by the APCS to the same pixel location whereby, following application of such flow of charges, the voltage at that pixel location is zero.

In accordance with the illustrated preferred embodiment of the invention, the flow of charges comprises a single polarity or alternating polarity charge flow to the surface of the dielectric substrate. This charge flow occurs over a time span which is short relative to the time necessary to sweep the pixel dimension along a given direction of motion of the APCS. Therefore, during this time span the location of the APCS relative to the pixel location does not change considerably, and the charge flow may be represented by a stack of positive and negative charges as shown in FIG. 10B. The beginning and end of the duration of the alternating polarity charge flow are indicated in FIG. 10B respectively as T1 and T2.

Figure 10C:
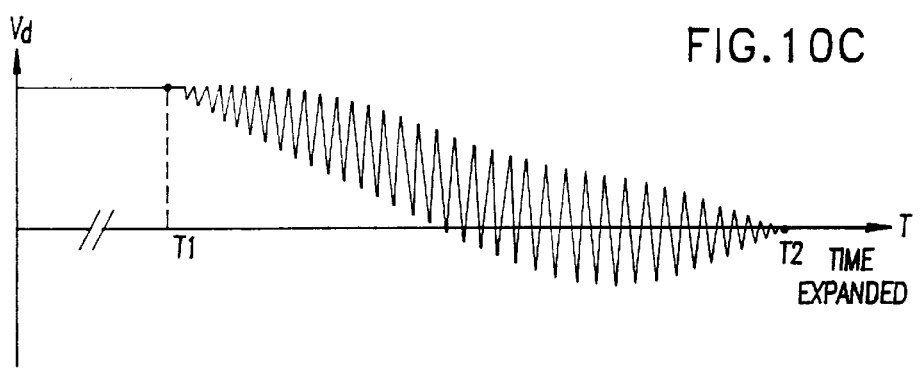

FIG. 10C is an expanded time scale illustration corresponding to FIG. 10A and illustrates with greater particularity one possible application of typical alternating charge flow to the surface 104 of the dielectric substrate 102, which produces a change in the voltage at the pixel location on surface 104 from the voltage at time T1 to effectively a zero voltage at time T2. The flow of charges illustrated induces a corresponding current in the conductive backing 110. The current induced in the conductive backing 110 causes a charge to be accumulated by the capacitor 112, which is electronically coupled to the conductive backing 110.

Figure 10D:
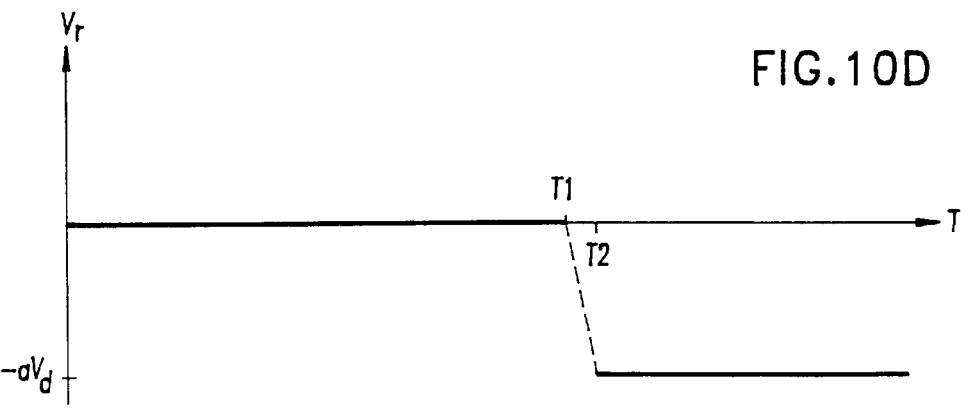

FIG. 10D illustrates the voltage $V_r$, output by the read electronics, which sense and measure the charge accumulated in capacitor 112. The voltage output by the read electronics is in direct negative proportion to the original charge at the pixel location at which the flow of charges was applied.

Figure 11A:
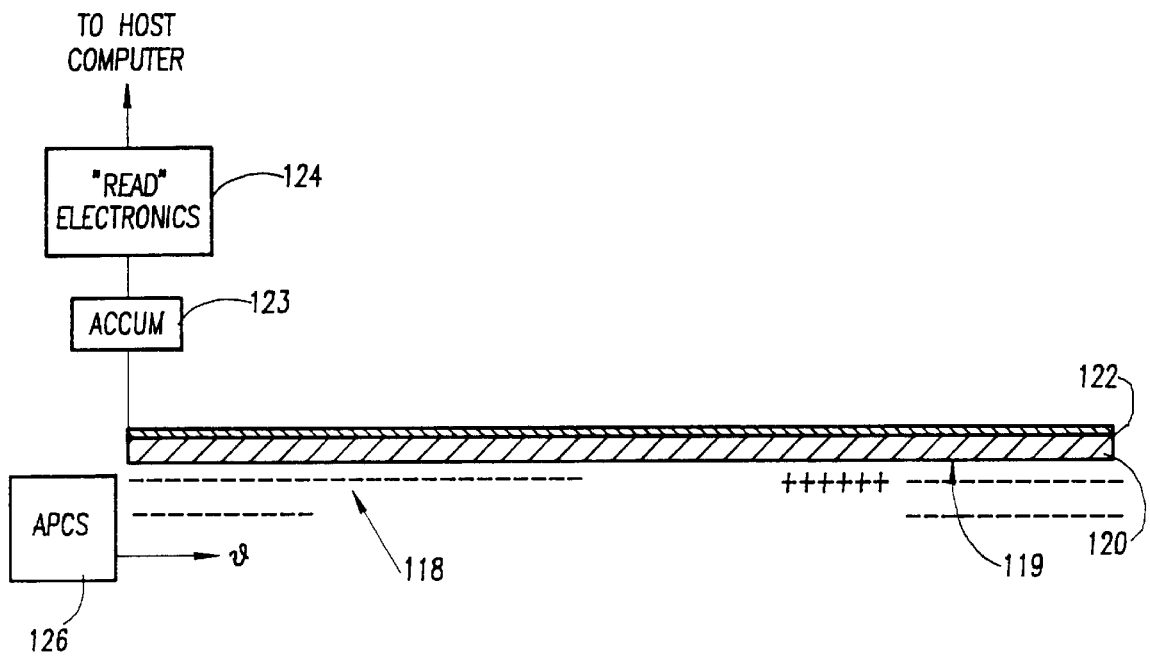
FIG. 11A is a schematic illustration of an arbitrary "original" charge pattern on a surface of a dielectric substrate.
Figure 11B:
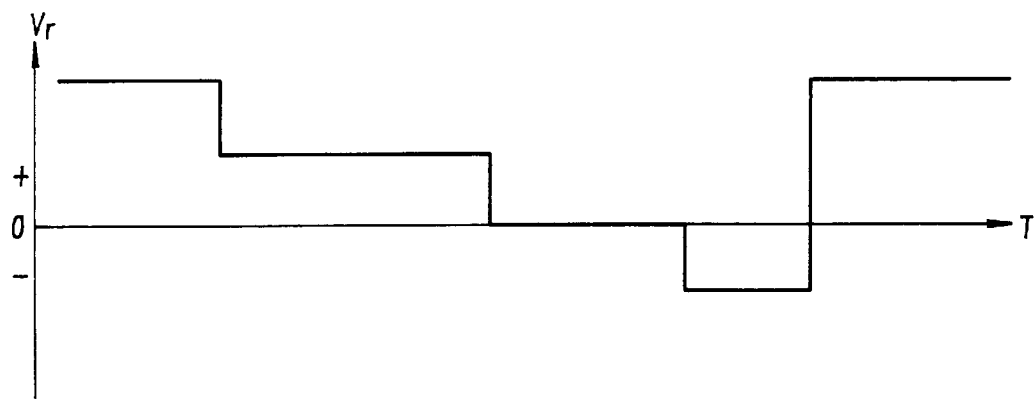
FIG. 11B is a diagram illustrating a voltage signal which results from reading the charge pattern.

Referring now to FIG. 11A, there is shown schematically an arbitrary "original" charge pattern 118 on a surface 119 of a dielectric substrate 120, which substrate 120 is preferably backed with a conductive backing 122. Accumulative means 123 and read electronics 124, as described in FIGS. 8A and 8B, are electronically coupled to the conductive backing 122. Also illustrated is an alternating polarity charge source (APCS) 126, of the type illustrated in FIGS. 8A and 8B, which is typically capable of achieving a spatial edge accuracy consistent with a desired resolution. The APCS 126 is preferably moved at a constant velocity v along the surface of the dielectric substrate. FIG. 11B illustrates the voltage signal which results from reading the charge pattern 118 in accordance with the techniques described hereinabove.

Figure 12:
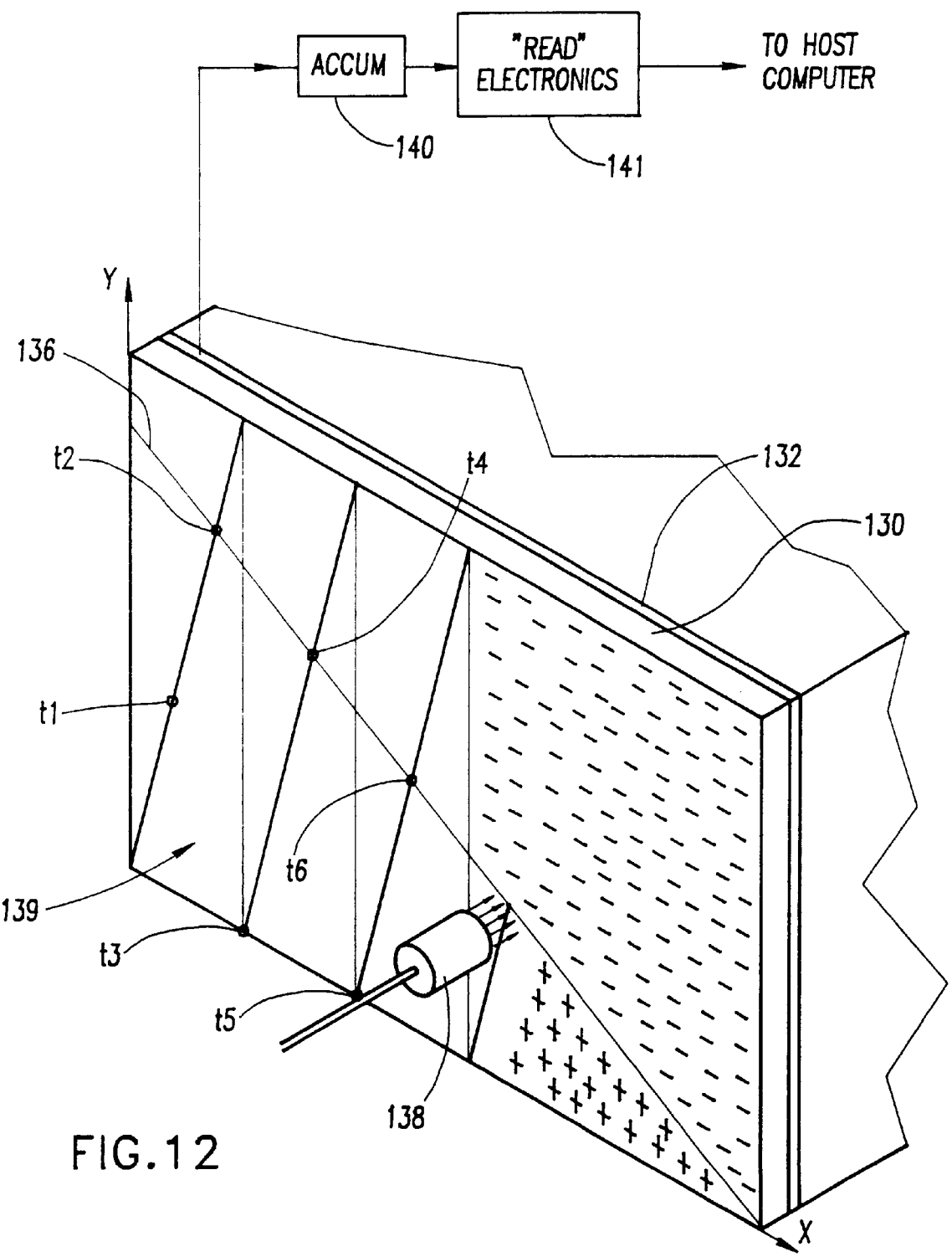
FIG. 12 is a pictorial illustration of apparatus for reading a charge pattern on a dielectric substrate.

FIG. 12 is a pictorial illustration of apparatus for reading a charge pattern on a dielectric substrate according to the steps described hereinabove in conjunction with FIGS. 8A and 8B.

A charge source 138, such as an APCS such as that described hereinabove in connection with FIG. 3, which produces charges which vary in polarity as a function of time, sweeps a surface 139 of a dielectric substrate 130 along an arbitrary pattern such as the up/down and sideways pattern of FIG. 12. Associated with the dielectric substrate 130 is a conductive backing 132.

In the illustrated embodiment, there is initially located on surface 139 a charge pattern which is uniformly negative above a diagonal line 136 and is uniformly positive below the diagonal line. It is appreciated that this charge pattern may be generated by any suitable technique.

As the charge source 138 sweeps and zeros a pixel location on the substrate surface 139, accumulative means 140 and read electronics 141, in accordance with the technique described hereinabove, produce an output $V_r$ which corresponds to the voltage previously present at that pixel location.

Figure 13A:
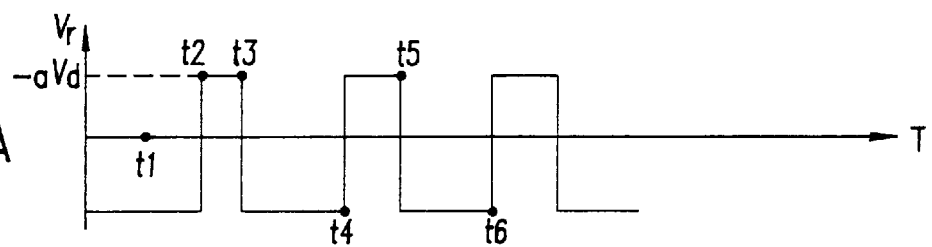
FIGS. 13A, 13B and 13C are diagrams of various operational parameters of the apparatus of FIG. 12.
Figure 13B:
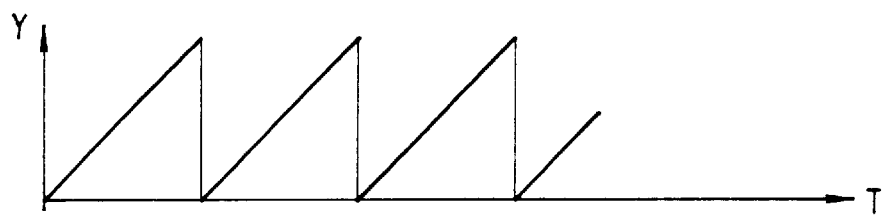
Figure 13C:
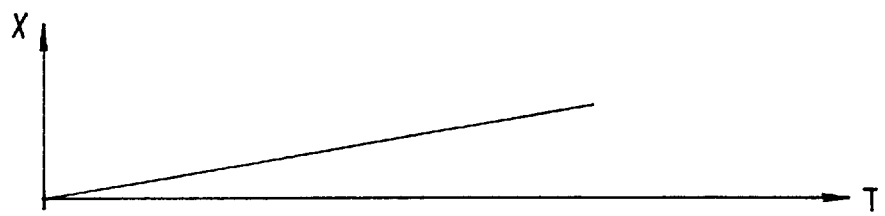

The operation of the apparatus of FIG. 12 may be appreciated and better understood by means of reference to FIGS. 13A–13C. FIGS. 13A–13C, all of which represent events taking place along the same time scale, illustrate operational parameters of the apparatus of FIG. 12.

FIG. 13A illustrates the voltage $V_r$ output by the read electronics 141 as a function of time. The time indications t1–t6 illustrate the position of the APCS 138 at various times. FIGS. 13B and 13C illustrate the Y and X positions of the APCS 138 as a function of time.

Reference is now made to FIGS. 14A and 14B which illustrate apparatus for reading a charge pattern on the surface of a dielectric substrate in accordance with another embodiment of the present invention. In this embodiment, an elongate alternating polarity charge source (EAPCS) 146, such as that described hereinabove in conjunction with FIG. 4, scans in one dimension, perpendicular to its longitudinal axis, along a surface 148 of a dielectric substrate 142, by means of a linear drive mechanism including a worm screw 150 cooperating with a screw rider 152, fixed to source 146. An electric motor 154 drives the worm screw 150. A commercially available synchronized encoder 156 provides position information about the EAPCS 146 to a host computer (not shown) at any given time.

In this embodiment, a multisectional conductive backing layer 160, typically comprising a plurality of elongate strips 144, is associated with a surface of the dielectric substrate 142. Each strip 144 is associated with individual means 162 for accumulating the charge which flows from that strip. Typically the accumulating means 162 includes a capacitor.

A multiplexer 158 is associated with the individual accumulators 162 and functions to select the accumulator 162 whose output is sampled by read electronics 159 at any given time. The read electronics 159 measures the voltage stored in the selected accumulator 162 in accordance with the technique described hereinabove in conjunction with FIGS. 8A and 8B. Information from the read electronics 159 may be serially fed to a host computer (not shown).

For read/write applications both accumulators 162 and drivers 62 (FIG. 4A) can be electronically coupled to the same conductive strips. The read electronics 159 may be activated in a time shared manner with the write electronics.

It is appreciated that a desired two-dimensional spatial resolution may be achieved by adjusting appropriate parameters. In a first dimension, the parameters to be adjusted include the width of the elongate strips 144, the width of the gap 145 between adjacent strips 144 and the thickness of the dielectric layer 142. In a second dimension, the parameters include the edge definition of the EAPCS 146 and time intervals between two subsequent sampling cycles of the read electronics 159 from the same accumulator.

Figure 15A:
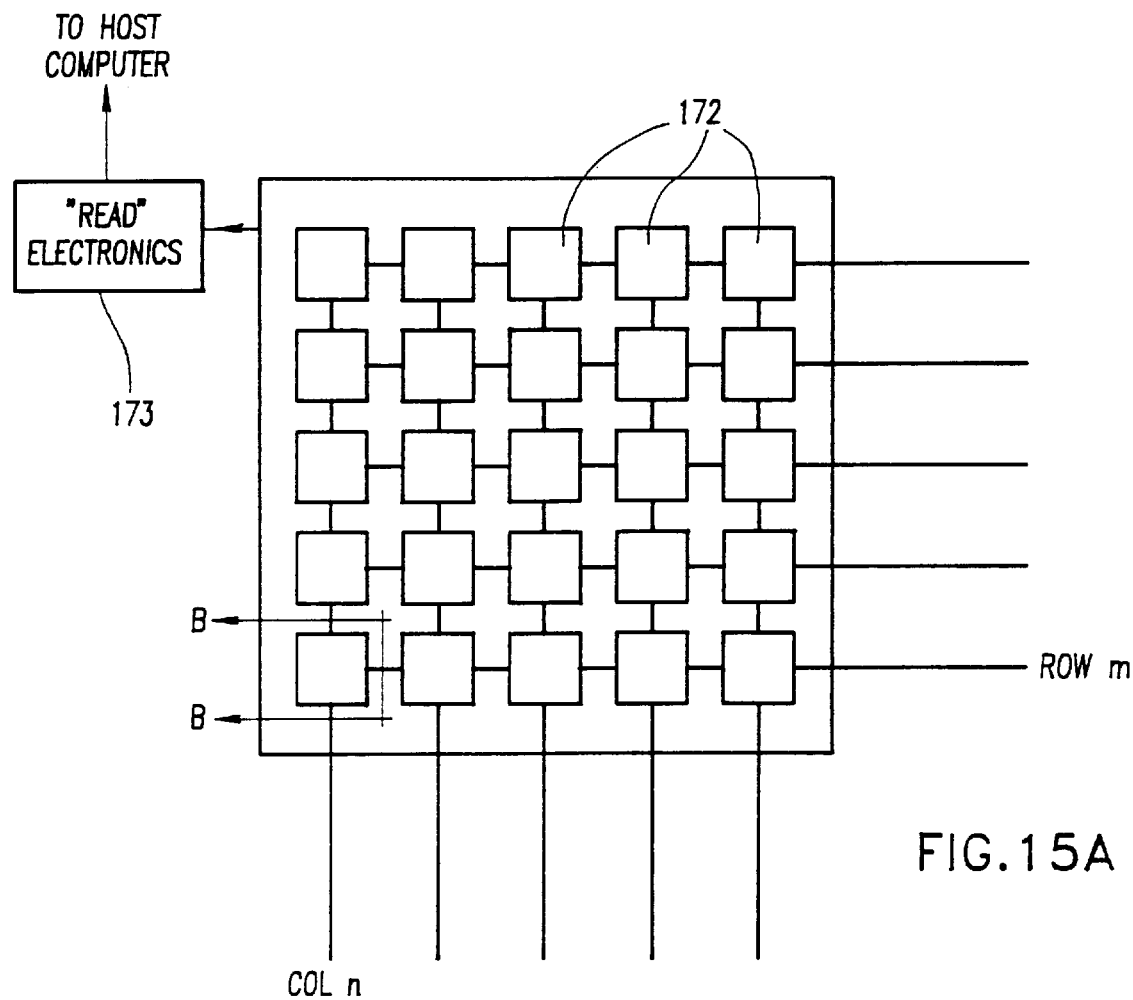
FIGS. 15A and 15B are respective generalized and detail illustrations of apparatus for reading a charge pattern on a dielectric substrate in accordance with yet another embodiment of the present invention.
Figure 15B:
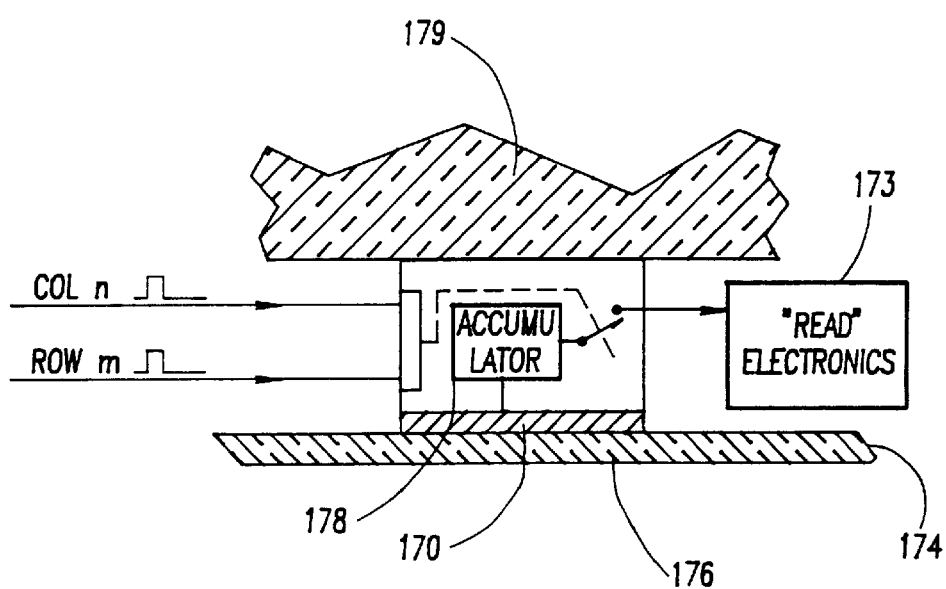

Reference is now made to FIGS. 15A and 15B which are respectively generalized and detail illustrations of apparatus for reading a charge pattern on a dielectric substrate in accordance with yet another embodiment of the present invention. Here, strips 144 in the embodiment of FIGS. 14A and 14B are replaced by a plurality of pixel sized conductive pads 170 which define a two-dimensionally addressable array 172 disposed adjacent a surface 174 of a dielectric substrate 176. Preferably, an accumulator 178 is associated with each pad 170 in the array 172. In this case, a scanning alternating polarity charge source having precisely defined edge resolution need not be provided and may be replaced by static apparatus for supplying a uniform flow of alternating polarity charges over the entire array 172. Read electronics 173 measures the voltage stored in a selected accumulator 178 in accordance with the technique described hereinabove in conjunction with FIGS. 8A and 8B. Information from the read electronics 173 may be serially fed to a host computer (not shown). Accumulators are selected for reading by common matrix addressing techniques.

FIG. 15B illustrates a schematic arrangement for addressing a given pad 170, corresponding to a given area element or pixel on the dielectric surface 176. Mechanical support for the array of pads 172 is provided by a plate 179 which is typically glass.

For read/write applications both accumulators 178 and drivers associated with data flip-flops 71 (FIG. 5B) can be electronically coupled to the same conductive pads. The read electronics 173 may be activated in a time shared manner with the write electronics.

Figure 16B:
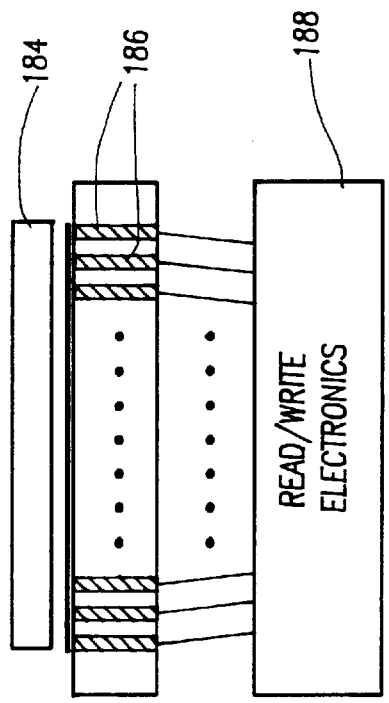
FIGS. 16A and 16B are simplified illustrations of respective side and facing views of a system for reading and writing electrostatic images in accordance with an embodiment of the present invention.
Figure 16A:
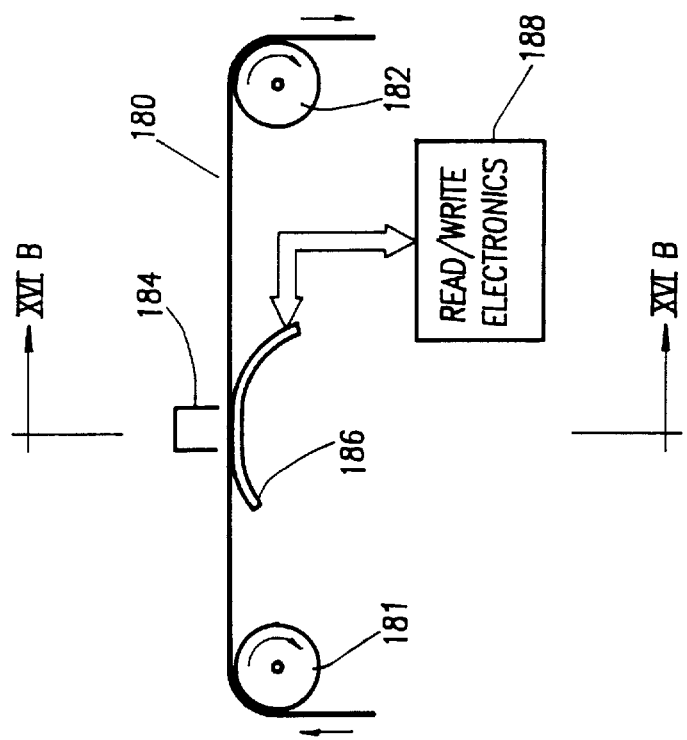

Reference is now made to FIGS. 16A and 16B which illustrate respective side and facing views of a system for reading and writing electrostatic images in accordance with an embodiment of the present invention. The system comprises a dielectric substrate 180 which is displaced by rotating drums 181 and 182, and an EAPCS 184 associated with a plurality of parallel conductive strips 186 which function as a conductive backing for the portion of the dielectric substrate disposed intermediate EAPCS 184 and strips 186 at any given time.

Preferably the strips 186 have a slightly curved configuration as shown. Alternately, the strips may be of any suitable configuration.

A charge or voltage signal present on dielectric substrate 180 may be read using the techniques described hereinabove, particularly those described in conjunction with FIGS. 14A and 14B, by read/write electronics 188 from that portion of the dielectric substrate that is disposed intermediate the strips 186 and the EAPCS 184.

A charge pattern may also be written onto the dielectric substrate 180 using the apparatus of FIGS. 16A and 16B in accordance with the techniques described hereinabove, particularly those described in conjunction with FIGS. 4A and 4B. According to a further embodiment of the present invention, the configuration of the read/write operations may be according to the apparatus of FIGS. 3 and 12.

It is appreciated that the apparatus of FIGS. 16A and 16B can be used as a write-only system. Alternately, the apparatus of FIGS. 16A and 16B may be used as a read-only system.

Figure 17:
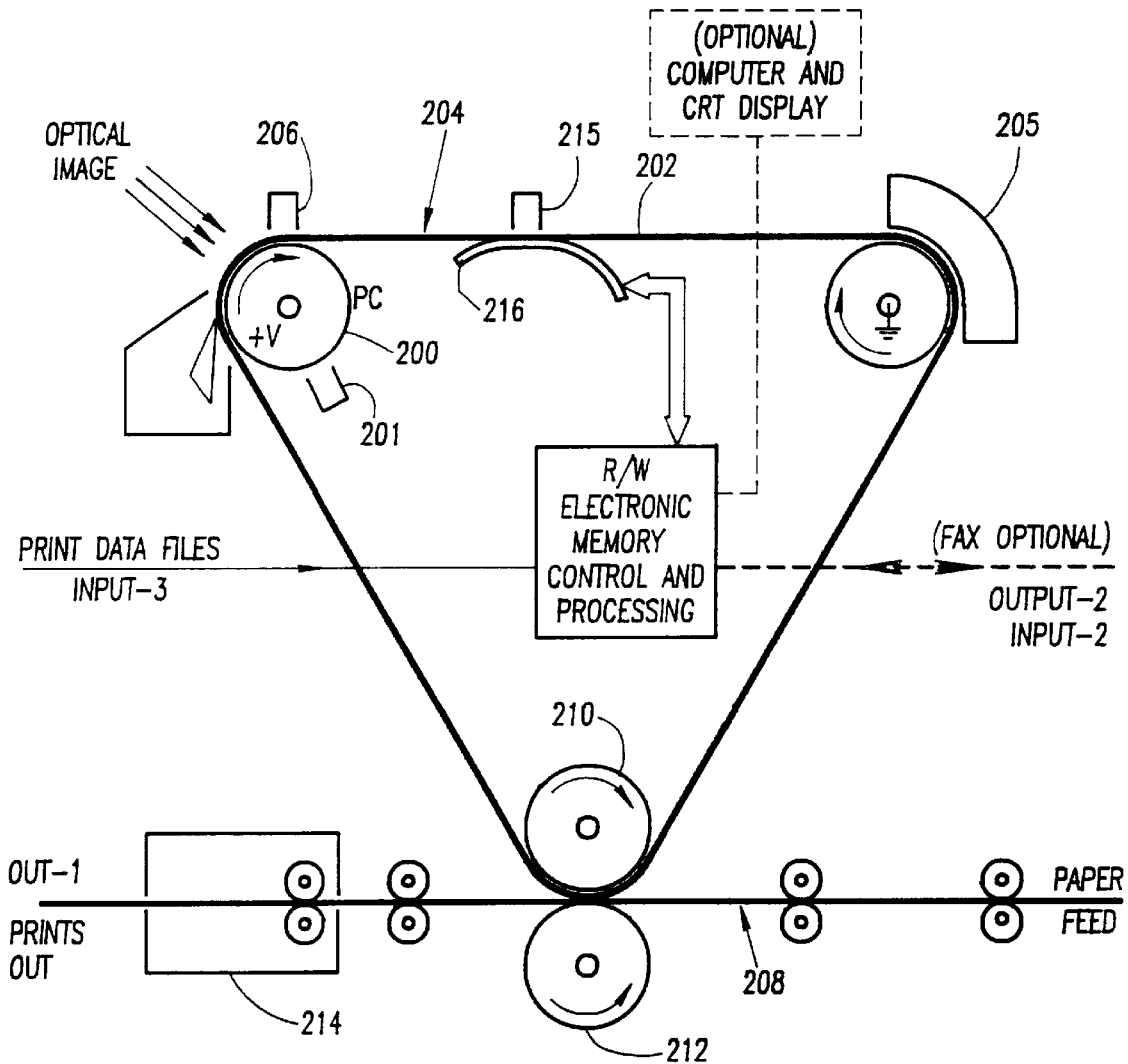
FIGS. 17–18 and 19A–19C are illustrations of the operation and structure of apparatus constructed and operative in accordance with a preferred embodiment of the present invention.
Figure 18:
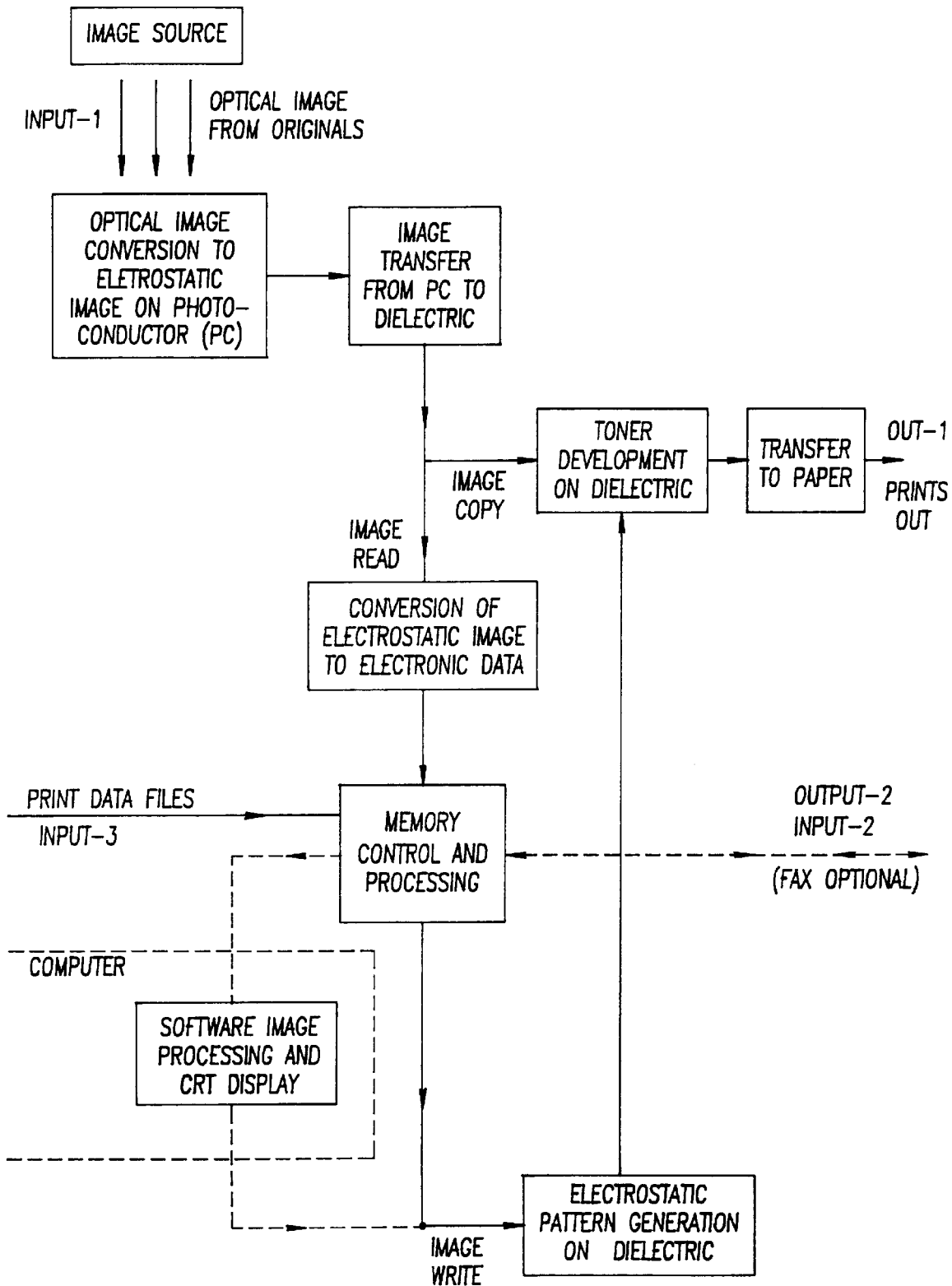

Reference is now made to FIGS. 17, 18 and 19 which illustrate the operation and structure of a universal read/write system constructed and operative in accordance with a preferred embodiment of the present invention.

The illustrated embodiment employs a web of dielectric material, it being appreciated that any other suitable configuration of the dielectric material, such as, for example, a drum configuration, may be employed alternatively. The dielectric material may also have the properties of a photoconductor in certain operative configurations and under certain operative conditions.

An optical image is exposed onto a photoconductor 200 which is precharged, preferably by an AC corona 201. As a result of the exposure, exposed areas of the photoconductor 200 are selectively discharged thus creating on the photoconductor 200 an electrostatic image corresponding to the optical image. Preferably the exposure takes place across a transparent dielectric web 202. Alternately, the exposure may be performed directly onto the photoconductor 200.

Using the techniques described hereinbelow in conjunction with FIGS. 19A–19C, the electrostatic image on the photoconductor 200 is replicated on an outer surface 204 of the dielectric substrate 202, using an AC corona 206 in accordance with a preferred embodiment of the present invention.

The replicated electrostatic image on surface 204 can be developed using standard development equipment 205 to create a toner image on surface 204. This arrangement offers the advantage of development directly on a dielectric substrate. Subsequently, the toner image can be transferred from surface 204 of dielectric substrate 202 and fused onto paper 208 or onto any other suitable substrate using standard toner transfer techniques, transfer rollers 210 and 212 and fusing unit 214.

Alternately or additionally, the replicated electrostatic image can be read from the dielectric substrate 202 and converted to a digital image using an APCS 215 and a conductive backing 216 in accordance with the techniques described hereinabove in connection with FIGS. 16A and 16B. The digital image can be readily stored, processed, scaled or subjected to any manipulations that are typically carried out on digital images.

Furthermore the digital image may be processed or displayed by any external device, typically including a CRT. Following processing, the digital image can be written as an electrostatic image on the dielectric substrate 202 using APCS 215 and conductive backing 216 in conjunction with the write techniques described in FIGS. 16A–16B and may then be developed and output in the same fashion as described above.

It is appreciated that where the dielectric substrate 202 is a photoconductor, replication of the image thereon from another photoconductor, such as photoconductor 200, may be obviated.

Additionally in accordance with an embodiment of the invention, digital data, such as image data, may be input to the system directly, typically from a facsimile machine, printer or plotter or from any suitable data files and can be output or processed according to the techniques described herein. Furthermore, outputs from the system can be sent directly to a facsimile machine, obviating the step of printing the toner image on paper.

It is appreciated that when a replicated image is read using APCS 215 and conductive backing 216, that image is effectively erased from the surface 204 of dielectric substrate 202. FIG. 18 summarizes the operation of the apparatus of FIG. 17.

Figure 19A:
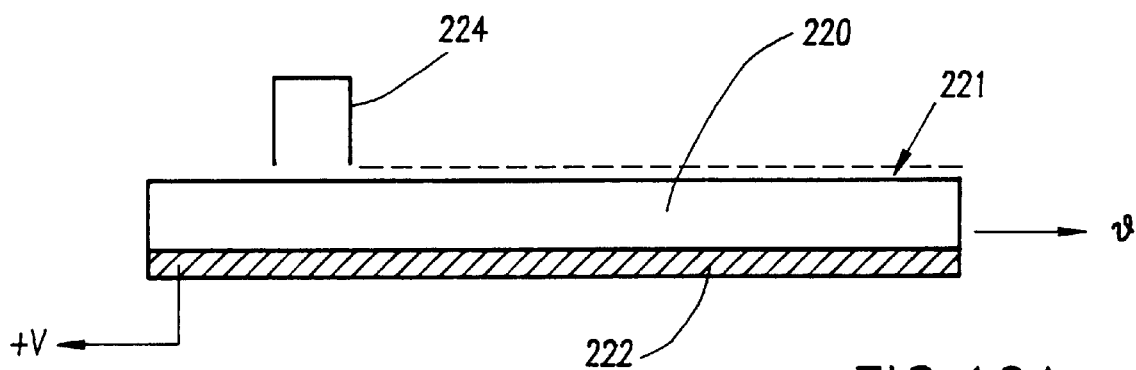
Figure 19B:
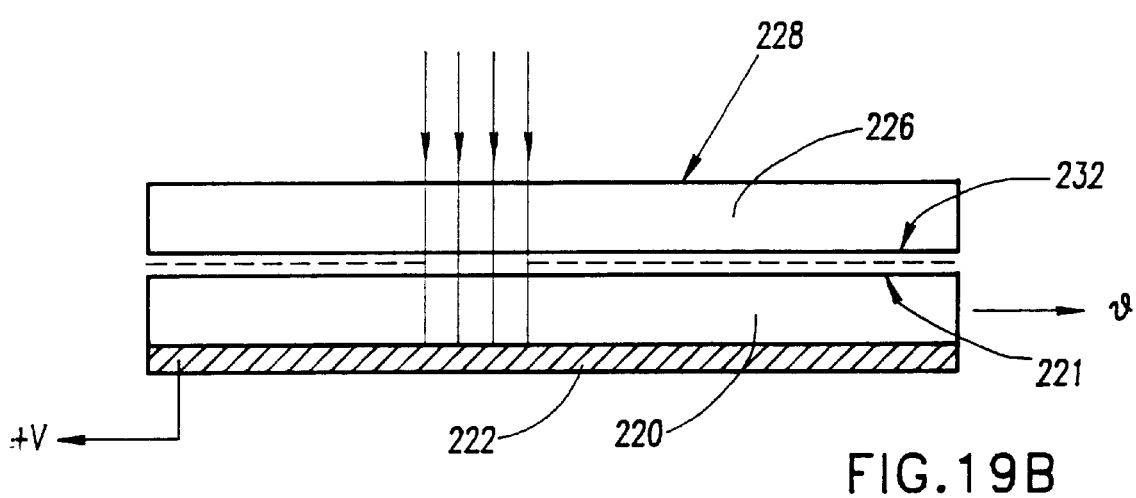
Figure 19C:
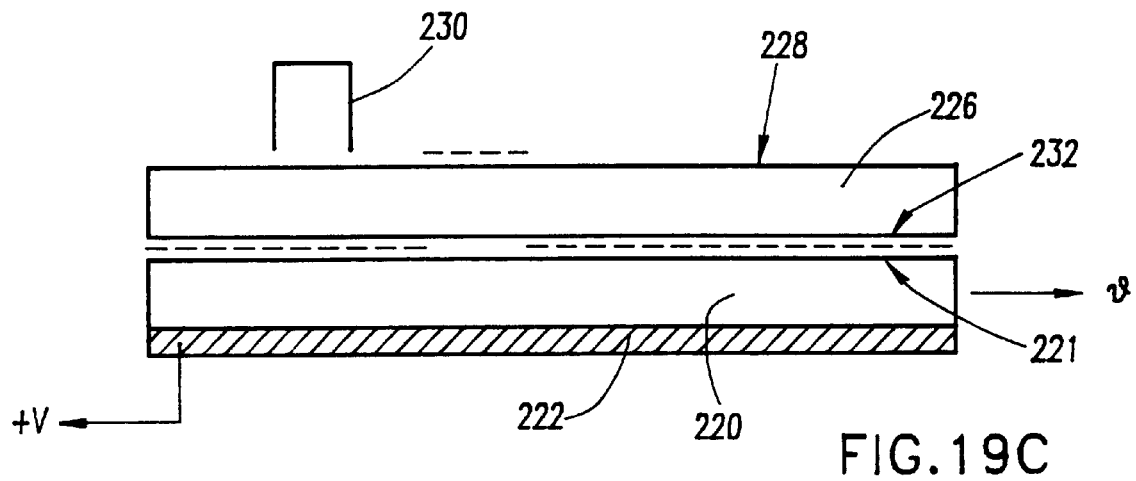

Particular reference is now made to FIGS. 19A–19C which further illustrate the operation of the embodiment illustrated in FIGS. 17 and 18.

FIG. 19A illustrates a photoconductor 220, which may serve as photoconductor 200 in the embodiment of FIG. 17, and an associated conductive backing 222 which is biased to an appropriate voltage +V.

An AC corona 224, which may serve as corona 201 in the embodiment of FIG. 17, creates a uniform charge distribution on surface 221 of the photoconductor 220 using writing techniques described hereinabove in association with FIG. 3. The charge distribution negatively corresponds to the uniform bias voltage present at the conductive backing 222.

FIG. 19B illustrates the optical exposure of an image onto the charged surface 221 of photoconductor 220 across a transparent dielectric substrate 226 which may serve as substrate 202 in the embodiment of FIG. 17. Exposed areas of the uniform charge distribution present on surface 221 are selectively discharged, thereby creating a charge pattern corresponding to the image.

FIG. 19C illustrates the negative replication onto surface 228 of the dielectric substrate 226 of the charge pattern on surface 221 using an AC corona 230, which may serve as AC corona 206 of FIG. 17. The replication is carried out using a variation of the writing technique described hereinabove in conjunction with FIG. 2, wherein the imagewise charged photoconductor 220 and its associated backing 222 replace the conductive backing 14 in the embodiment of FIG. 2.

According to this technique, the voltage at the conductive backing 14 of the embodiment of FIG. 2 is replaced by the combined effective potential of the charge pattern on surface 221 and of the conductive backing 222 having a bias voltage of +V. In those regions that were not discharged by the optical exposure no charges are deposited on the surface 228 since the net potential on surface 232 of the dielectric substrate 226 is effectively zero in those regions.

Accordingly, in those regions that were discharged by the optical exposure, charges are deposited on surface 228, since the net potential on surface 232 of the dielectric substrate 226 equals the bias voltage +V of the conductive backing 222, with allowance being made for residual charges remaining on the photoconductor following the exposure.

Reference is now made to FIGS. 20A–20C which illustrate the operation and structure of an imaging system constructed and operated in accordance with a preferred embodiment of the present invention. The imaging system of FIGS. 20A–20C may constitute any suitable imaging system such as a camera or scanner.

The illustrated embodiment preferably comprises an EAPCS 238 of the type above described in conjunction with FIG. 14A and further preferably comprises a multi-layered drum 240 having an external photoconductive layer 242, which operates as a dielectric, and an innermost supporting substrate 244. Disposed intermediate the photoconductive layer 242 and the support substrate 244 is a layer 246 incorporating a plurality of conductive bands 248.

Preferably the supporting substrate 244 is a dielectric substrate. In an alternative embodiment where the supporting substrate 244 is a metal, a dielectric layer 250 is required between layer 246 and substrate 244 to electrically insulate the conductive bands 248 from metal substrate 244.

The conductive bands 248 are preferably continuously biased to a voltage +V which corresponds to voltage $V_{set}$ of FIGS. 8A–8B. Preferably associated with conductive bands 248 is an electronic reader circuit 252 schematically represented in FIG. 20C. The reader circuit 252 preferably comprises a plurality of accumulators 254 which correspond to accumulators 162 of FIG. 14A, a multiplexer 256 which corresponds to multiplexer 158 of FIG. 14A and read electronics 258 which correspond to read electronics 159 of FIG. 14A.

A standard optical imaging system 259 is employed to project an image on a region 260 of the photoconductor 242, which has preferably been precharged. As a result of the image projection an electrostatic pattern corresponding to the image is created on the corresponding portion 260 of an outer surface 261 of photoconductor 242.

In accordance with the present invention, the electrostatic pattern is read by applying a flow of charges to the pattern bearing region of surface 261 of the dielectric photoconductor 242, using EAPCS 238, thereby inducing a current flow representing the pattern in accordance with the read techniques above described in conjunction with FIGS. 14A and 14B. The current flow is sensed by electronic read circuit 252.

Following reading of the pattern, the surface 261 of the photoconductive layer 242 is effectively erased and simultaneously uniformly charged, thus providing precharging of the photoconductor prior to imaging by imaging system 259.

It is appreciated that electrostatic image generation on a portion of the surface 261 of the photoconductor 242 and reading of an electrostatic pattern from a different portion of the surface 261 of the photoconductor 242 in accordance with the present invention can occur simultaneously.

It is noted that the apparatus of FIGS. 20A–20C is illustrated schematically and that the invention may be embodied in any suitable type of configuration, not limited to the use of drums, conductive bands and EAPCSs.

In accordance with an alternate embodiment of the apparatus of FIGS. 20A–20C, external photoconductive layer 242 is replaced by an external dielectric layer. Furthermore, read electronics circuit 252 is replaced by write electronics as described hereinabove. It is appreciated that this alternate embodiment may comprises a cylindrical write apparatus and that the need for image source 259 is obviated.

Figure 21:
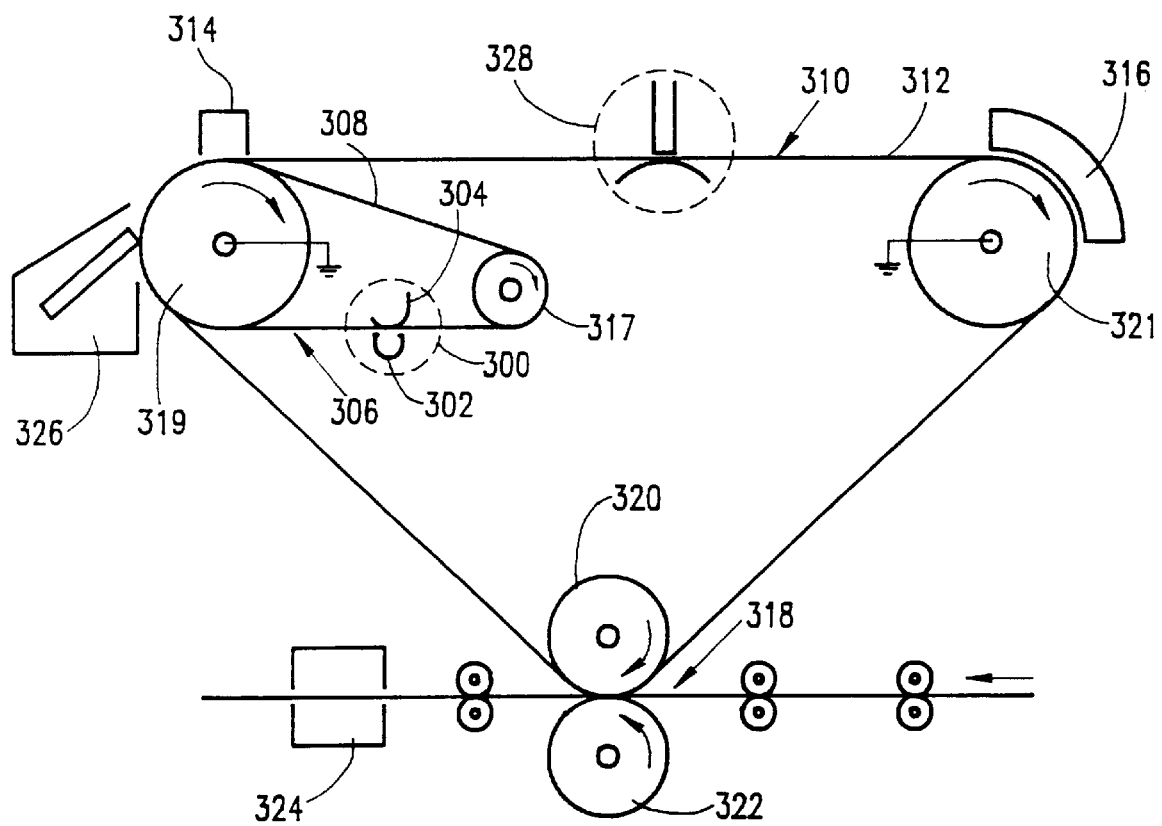
FIG. 21 is a simplified illustration of apparatus for replicating a charge pattern in accordance with an embodiment of the present invention.

Reference is now made to FIG. 21 which illustrates apparatus for replicating a charge pattern in accordance with a preferred embodiment of the present invention.

Information defining a computerized image is input from computer (not shown) to a writing system 300 which comprises an elongate alternating polarity charge source 302 and conductive strips 304. Writing system 300 typically corresponds to apparatus 184 and 186 of FIGS. 16A and 16B.

A charge pattern representing the computerized image is written onto an outer surface 306 of a substrate 308 using the techniques described hereinabove particularly those described in conjunction with FIGS. 16A and 16B. Typically, substrate 308 is a dielectric substrate.

Alternately, any other suitable technique may be used to generate a charged pattern on surface 306 of substrate 308.

Using the techniques described hereinbelow in conjunction with FIGS. 22A and 22B, the charge image on substrate 308 is replicated on an outer surface 310 of substrate 312 using a single pass of an AC corona 314 in accordance with a preferred embodiment of the present invention. Typically, substrate 312 is a dielectric substrate. It is appreciated that a copying function is provided by these steps.

It is further appreciated that in accordance with the present invention, electrostatic pre-conditioning of substrate 312 is not necessary prior to carrying out the replication.

Replicated electrostatic image on surface 310 may be developed using standard development equipment 316 backed by a drum 321 creating a toner image on surface 310.

Preferably, charge pattern on surface 306 remains intact subsequent to the replication process allowing it to serve as a master for numerous hard copies. Typically, numerous replications can be made from one charge image on surface 306.

It is appreciated that while drums 319 and 317 allow substrate 308 to rotate with the motion of substrate 312, writing system 300 need only be operative during the generation of the master.

Subsequent to copying, the toner image can be transferred from surface 310 of substrate 312 and fused onto paper 318 or any other suitable media using standard toner transfer techniques, transfer rollers 320 and 322 and a fixing unit 324. Cleaning unit 326 is operational to remove residual toner from surface 310 of substrate 312.

In accordance with a further embodiment of the present invention, there is provided a retouch system 328 which functions in accordance with the techniques described herein. Retouch system 328 may be operational to enable alterations from copy to copy. For example, numbering each copy with a different number could be carried out using such a retouch system.

Figure 22A:
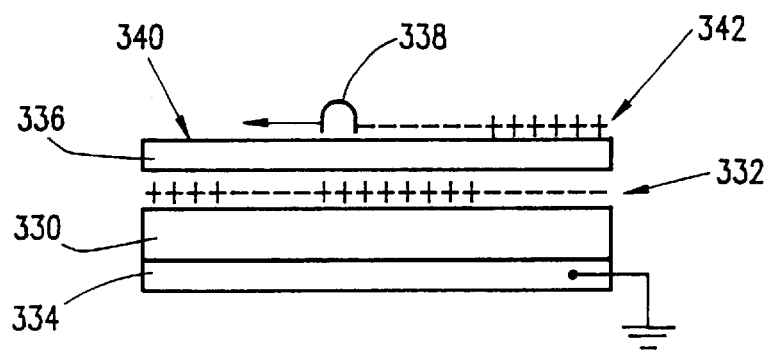
FIGS. 22A and 22B are illustrations of the operation of the apparatus of FIG. 21.
Figure 22B:
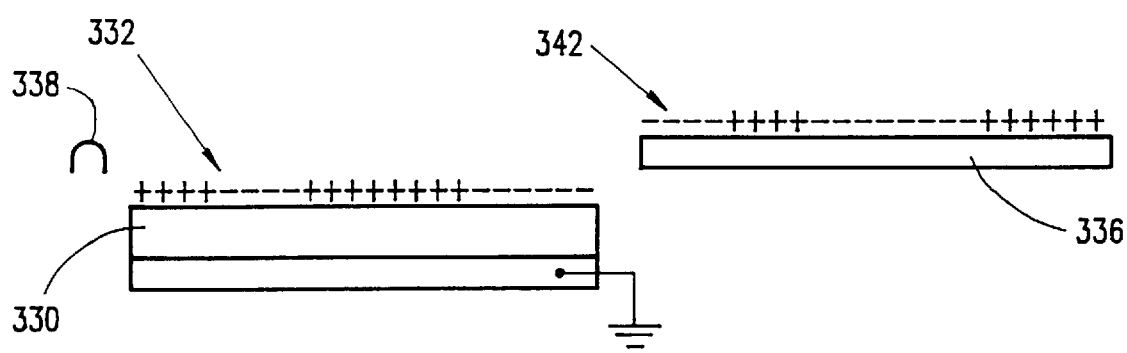

Particular reference is now made to FIGS. 22A and 22B which further illustrate the replication operation of the embodiment illustrated in FIG. 21.

The replication is carried out using a variation of the writing technique described hereinabove, wherein an image-wise charged substrate 330 and its associated backing 334 replace the conductive backing 14 in the embodiment of FIG. 2.

According to this technique, the voltage at the conductive backing 14 of the embodiment of FIG. 2 is replaced by the combined effective potential of the charge pattern at substrate 330 and grounded layer 334.

FIG. 22A illustrates a substrate 330 bearing a charge pattern 332. Typically, substrate 330 is a dielectric substrate of the type described hereinabove and may serve as substrate 308 in the embodiment of FIG. 21. Associated with dielectric substrate 330 is a conductive backing 334 which is grounded. A second substrate 336, typically a dielectric substrate of the type described hereinabove, is placed in close proximity to dielectric substrate 330. Associated with substrate 336 is an AC corona 338 which is typically of the type described hereinabove, particularly in conjunction with FIGS. 19A and 19C.

As AC corona 338 sweeps over an upper surface 340 of second substrate 336, a charge pattern 342 is generated on upper surface 340 in accordance with a variation of the writing techniques of the present invention particularly those techniques described in association with FIGS. 2–5. Resulting charge pattern 342 is the inverse of charge pattern 332 present on dielectric substrate 330.

It is appreciated that in the configuration of FIG. 21, the apparent surface voltage backing for the second substrate is provided by the charge pattern on the first dielectric substrate and grounded drum 319.

FIG. 22B illustrates substrate 330 and second substrate 336 after the sweep by AC corona 338. Subsequent to the sweep, second substrate 336, bearing a charge pattern 342 which comprises the inverse of charge pattern 332 on substrate 330, is moved out of proximity of substrate 330. Inverse charge pattern 342 may then be toned and the toned image may then be transferred to another media. During toning, the substrate bearing the image to be toned is backed by a ground potential.

It is appreciated that in the configuration of FIG. 21, drum 321 may provide the ground potential during toning.

It is further appreciated that subsequent to copying, substrate 330 retains the charge pattern 332 that was present before the sweep of corona 338.

Figure 23A:
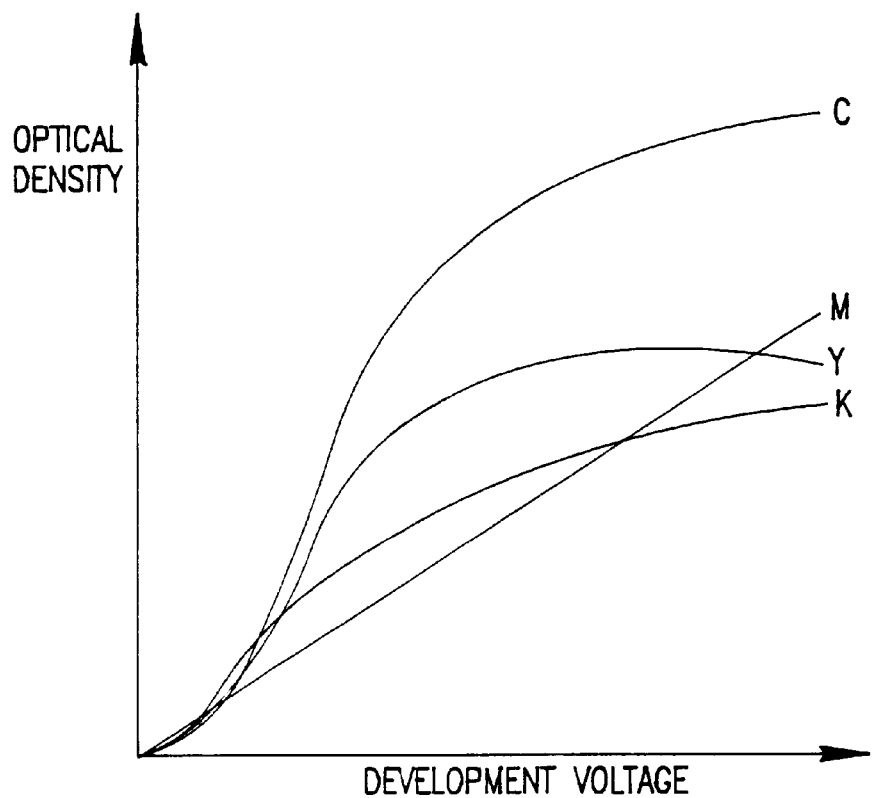
FIGS. 23A and 23B are respectively graphical and pictorial illustrations of the operational parameters of apparatus for continuous toning in accordance with a preferred embodiment of the invention.
Figure 23B:
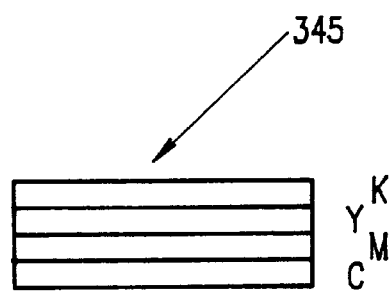

Reference is now made to FIGS. 23A and 23B which illustrate operational parameters for continuous toning apparatus in accordance with a preferred embodiment of the present invention.

It is appreciated that certain toners are characterized by the property that the optical density of a toned area can be controlled by the development voltage. Some liquid toners and certain dry toners are examples of this type of toner.

It is also appreciated that the write techniques described hereinabove are capable of writing continuous voltage levels thus enabling the generation of one-pass monochrome toned images of continuous optical densities, when toners of the type described hereinabove are used.

In accordance with a preferred embodiment of the present invention, continuous color printing using standard subtractive colors can be achieved in accordance with the write techniques described herein and standard multi-pass printing techniques.

FIG. 23A graphically demonstrates hypothetical optical densities of four basic printing colors (CMYK) typically used with subtractive color printing systems as a function of the development voltage of each of the toner colors.

FIG. 23B illustrates a single area of a color print 345 to which four basic printing colors (CMYK) have been sequentially transferred in accordance with standard multi-pass printing techniques.

The specific optical density of each color across any area may be controlled by writing (in accordance with the writing techniques described hereinabove in association with FIGS. 3–FIG. 5) at the corresponding area a voltage level which corresponds to the desired optical density for that color.

It is appreciated that the sub tractive combination of the optical densities of each of the four basic printing colors over an area results in a color having any of a continuum of color shades.

It is also appreciated that a color shade may be uniformly distributed within the borders of an entire area. Therefore, the specific color shade desired is achieved at the level of one pixel and not as a result of the combination of several pixels.

It is further appreciated that this embodiment offers continuous control over color levels providing high quality color prints.

Figure 24:
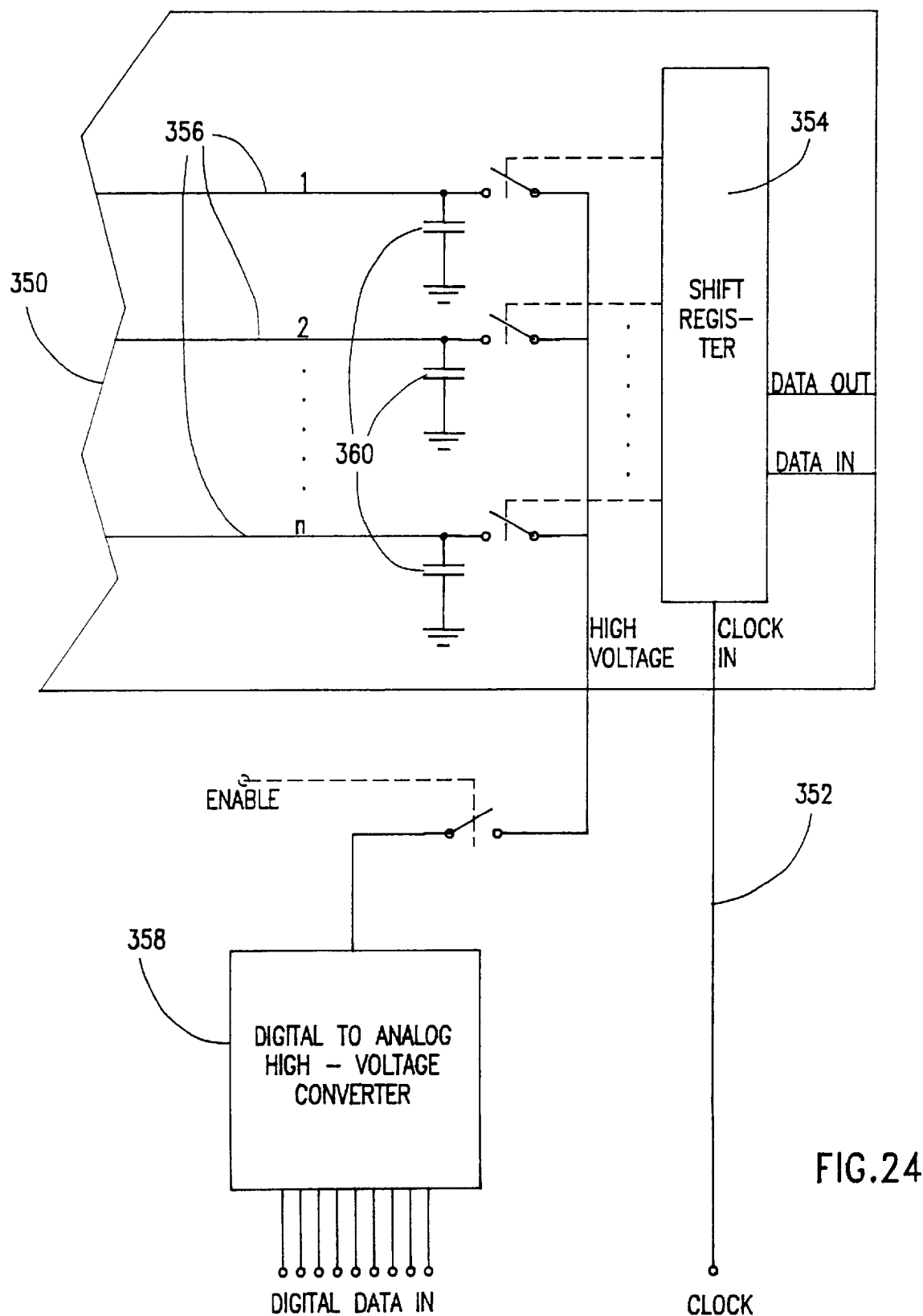
FIG. 24 is a schematic illustration of an alternate embodiment of the apparatus of FIGS. 4A and 4B.

Reference is now made to FIG. 24 which illustrates a schematic representation of an alternate embodiment of the apparatus of FIGS. 4A and 4B.

System 350 is an alternate embodiment of an apparatus for writing continuous as well as half-tone levels.

A clock 352 is pulsed in coordination with input data causing a shift register 354 to sequentially address each of a plurality of conductive strips 356. The conductive strips 356 may correspond to conductive strips 44 in FIG. 4A. The strip addressed at any given time receives a voltage level from a source of outside electronics 358 and is charged to that voltage level. Typically, outside electronics 358 comprises a digital to analog high voltage converter.

Associated with each strip 356 is a capacitor 360 which retains the given voltage level until the strip is subsequently addressed whereby the strip 356 receives a new voltage level.

It is appreciated that the write techniques of the present invention allow charges of either polarity to be written to the substrate. It is further appreciated that one individual charge pattern can contain charges of both polarities.

It is appreciated that the number of voltage levels achievable in accordance with this embodiment is not dependent on the print head. Instead, the number of voltage levels is determined by outside electronics.

Figure 25:
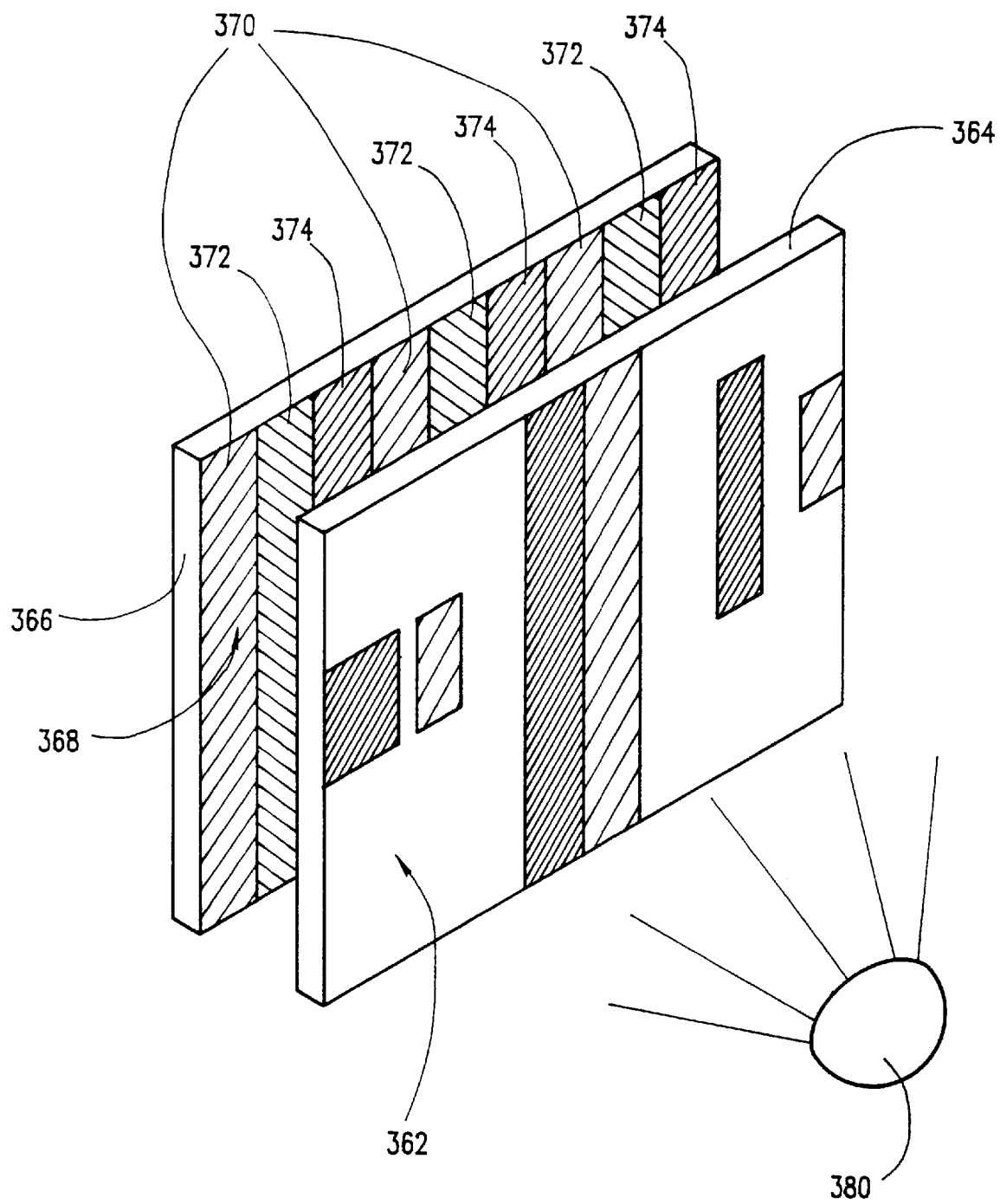
FIG. 25 is an illustration of apparatus for a programmable color projector in accordance with an alternate embodiment of the present invention.

Reference is now made to FIG. 25 which illustrates apparatus for a programmable color projector which produces color transparencies from continuous monochrome images, created in one pass.

A continuous monochrome toned image 362 is created on a substrate 364 in accordance with writing techniques described hereinabove and in accordance with standard toning techniques. Typically, substrate 364 is transparent. Associated with substrate 364 is a color filter 366 typically configured with a plurality of adjacent parallel color strips 368. Typically, toned image 362 is registered with respect to color filter 366.

Color strips 368 are typically sequentially arranged in groups comprising a red strip 370, a green strip 372 and a blue strip 374. Typically, the color strips are aligned normally to the transparent conductive strips (not shown) which comprise the backing for substrate 364.

In accordance with a preferred embodiment of the present invention, the toned image 362 comprises areas that have been continuously toned to a desired gray level. The toned image 362 serves as a neutral density filter for areas of color filter 366.

It is appreciated that color filter 366 may be attached to a surface of substrate 364. Alternately, color filter 366 may be separate.

Color projections are created when a white light source 380 projects light through the toned image 362 and the color filter 366.

Figure 26A:
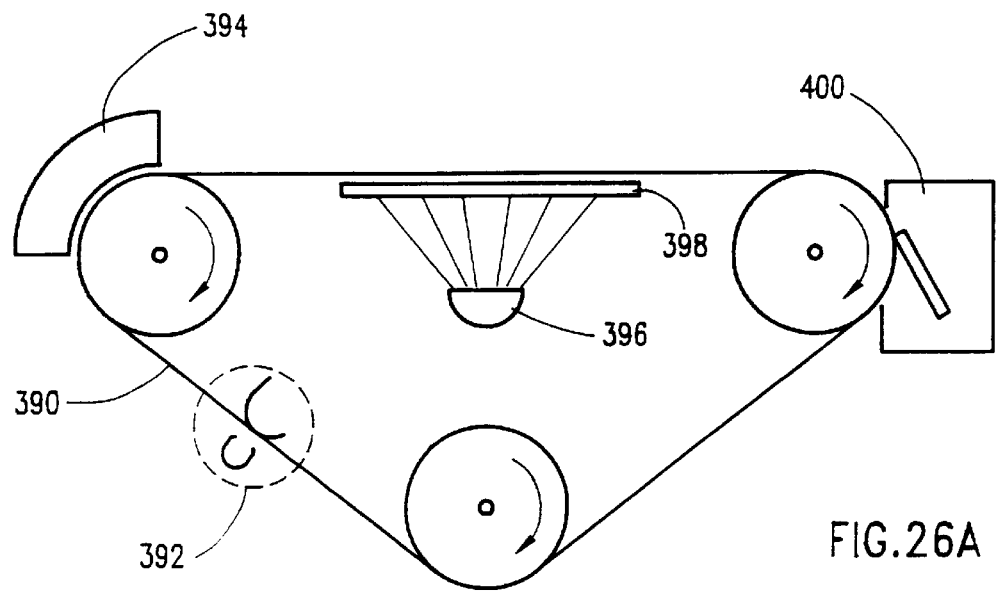
FIGS. 26A and 26B are illustrations of alternate embodiments of the apparatus for a programmable projector of FIG. 25 in accordance with the present invention.
Figure 26B:
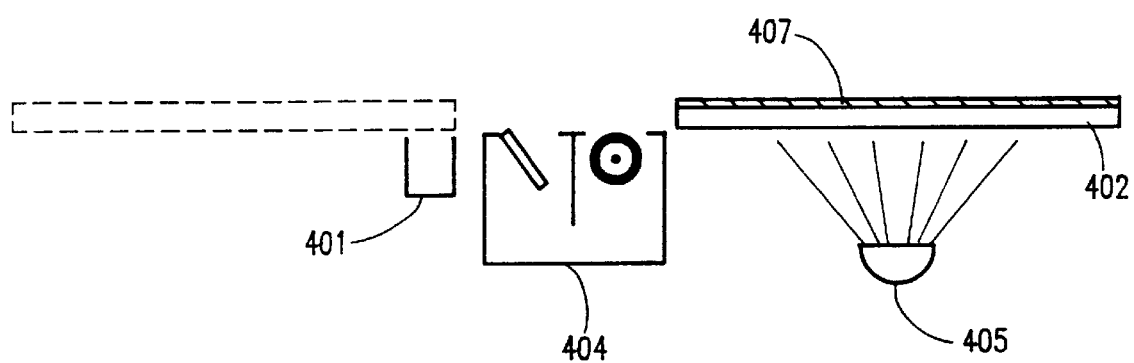

Reference is now made to FIGS. 26A and 26B which illustrate alternate embodiments of the apparatus for a programmable projector of FIG. 25 in accordance with the present invention.

FIG. 26A represents a belt configuration of the present invention. Charge images are written onto a substrate 390 using a writing system 392 which may correspond to writing system 300 of FIG. 21. The charge images are toned by a standard toning unit 394. Light source 396 projects light through color filter 398 where color filter 398 comprises a color filter of the type described hereinabove, particularly in association with FIG. 25. A standard cleaning unit 400 is operative to clean toner from substrate 390 subsequent to projection.

FIG. 26B presents a plate configuration of the same apparatus. A charge pattern is written on a substrate 402 by writing system 401 in accordance with the write techniques described hereinabove, particularly in association with FIG. 4. Substrate 402 is operative to move into association with writing system 401 and into association with a toning and cleaning unit 404. Toning and cleaning unit 404 is operative to tone charge patterns on substrate 402 and to clean toner from substrate 402. Subsequent to toning of substrate 402, a light source 405 projects light through a color filter 407 (which may be of the type described hereinabove in conjunction with FIG. 25) and through substrate 402 bearing a toned image thus generating a color projection (not shown).

Figure 27A:
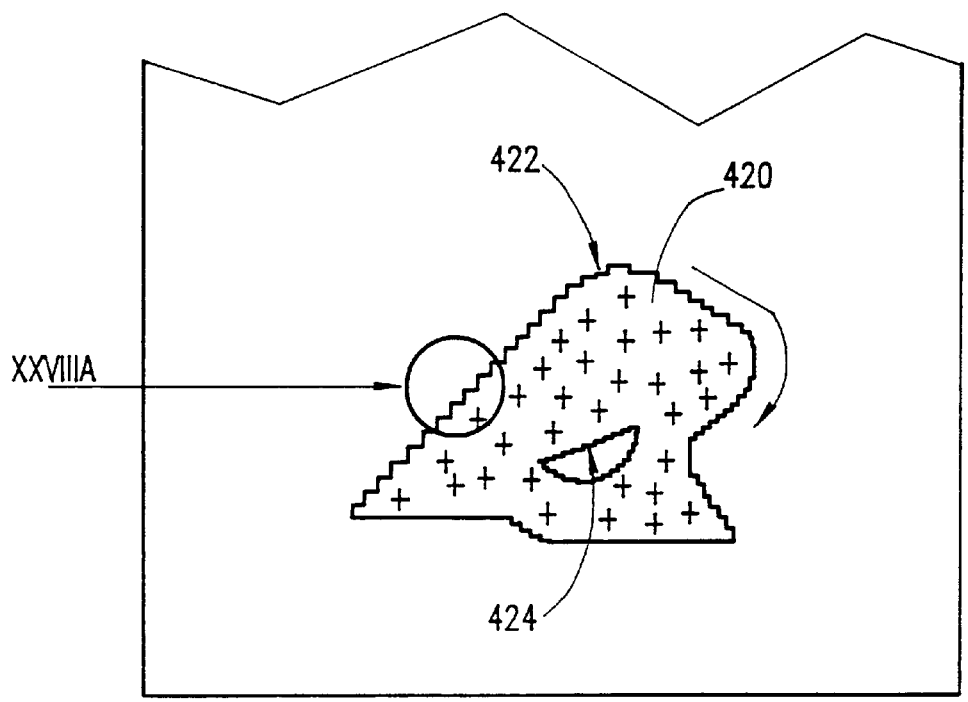
FIG. 27A and 27B are illustrations of apparatus for "retouching" charge images by erasing or adding charges in accordance with a further embodiment of the present invention.
Figure 27B:
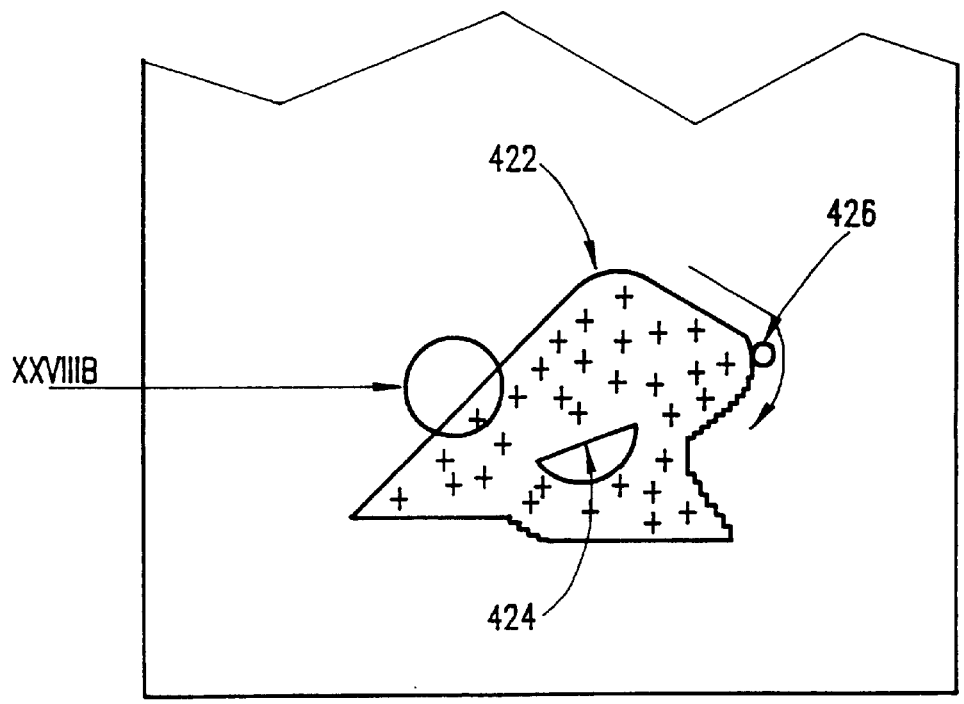

Reference is now made to FIGS. 27A–27B which illustrate apparatus for "retouching" charge images by erasing or adding charges in accordance with the present invention.

FIG. 27A illustrates a charge pattern 420 that was created in accordance with the write techniques of the present invention particularly in association with FIGS. 4A and 4B. In accordance with an embodiment of the present invention, the writing resolution is intentionally set low.

It is appreciated that due to the benefits of the writing technique described hereinabove, the fairly low writing resolution does not adversely affect the charge coverage over the inner portions of the image. Instead, the effects of the low resolution are primarily evident along the edges, resulting in a "ragged" effect on an outer edge 422 and an inner edge 424. Images may thus be written at a deliberately determined lower resolution and then "retouched" to simulate the actual higher resolution that is desired.

FIG. 27B illustrates charge pattern 420 after partial "retouching". Edge 422 has been smoothed by erasing charges using a charge source 426, which may be of the type described hereinabove in conjunction with FIG. 3. Inner edge 424 has been smoothed by adding charge. Both types of smoothing are carried out in accordance with the techniques described hereinbelow in conjunction with FIGS. 28A and 28B.

Figure 28A:
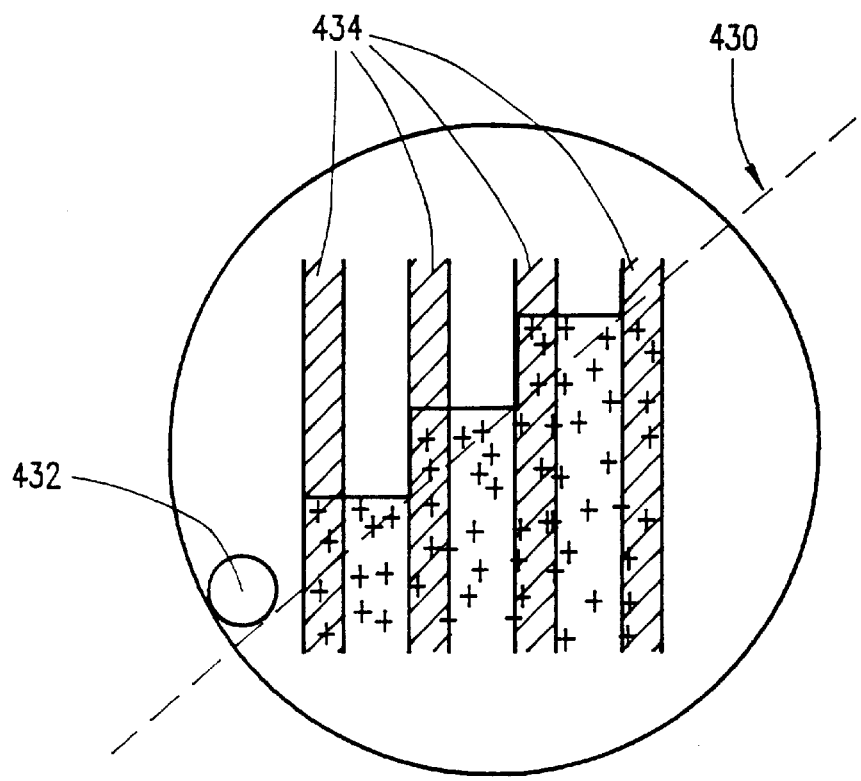
FIGS. 28A and 28B are illustrations of the operation of apparatus of FIGS. 27A and 27B in accordance with the apparatus of FIGS. 27A and 27B.
Figure 28B:
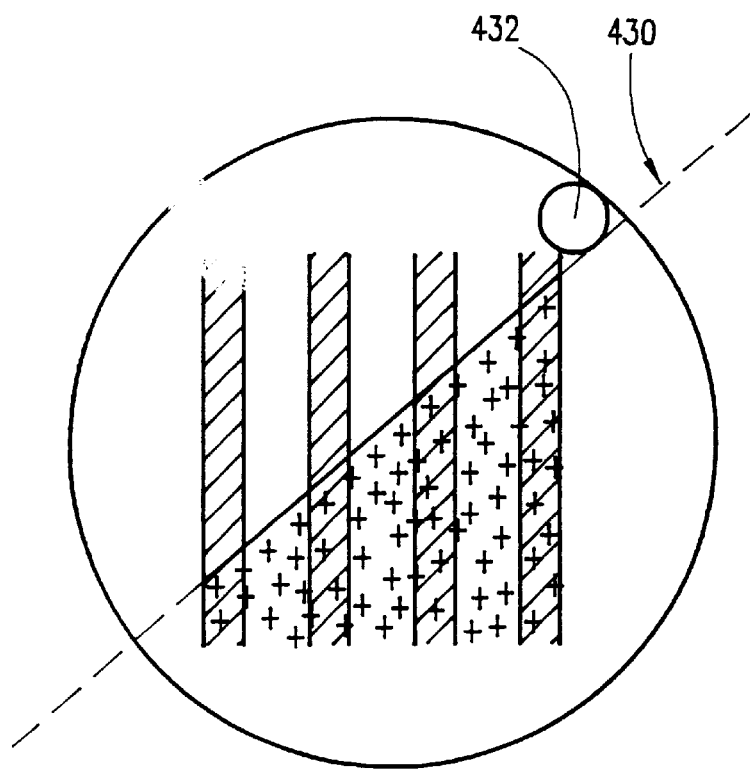

Reference is now made to FIGS. 28A and 28B which illustrate close up views of edge 422 of FIG. 27A.

A line 430 of FIG. 28A is the outer edge that is to be achieved. Charge source 432 has not yet passed along edge 430. A conductive backing 434 is of the type described hereinabove, particularly in conjunction with FIGS. 4A and 4B.

It is appreciated that if the voltage biasing the conductive backing beneath the location of the charge source is not zero, then charge will be added to the pattern at that location.

Alternately, if the voltage biasing the conductive backing beneath the location of the charge source is zero, then charge will be erased from the pattern at that location.

FIG. 28B illustrates line 430 subsequent to the pass of charge source 432. In accordance with the techniques of the present invention, charge was erased from the area outside of the border (above line 430). Areas over which the charge source did not pass (beneath line 430) are not affected.

Figure 29A:
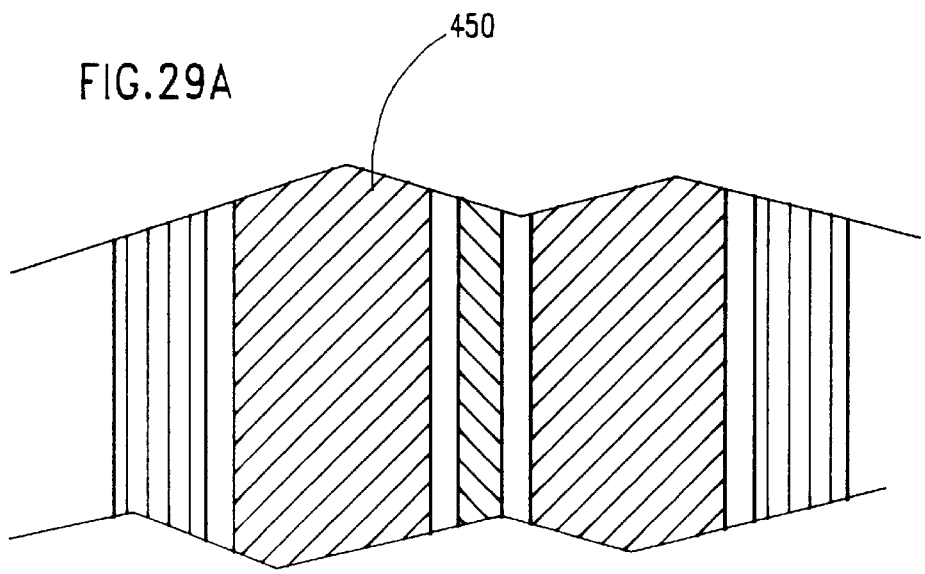
FIGS. 29A, 29B and 29C are illustrations of an alternate arrangement of conductive strips in the writing apparatus of FIGS. 4A and 4B in accordance with the present invention.
Figure 29B:
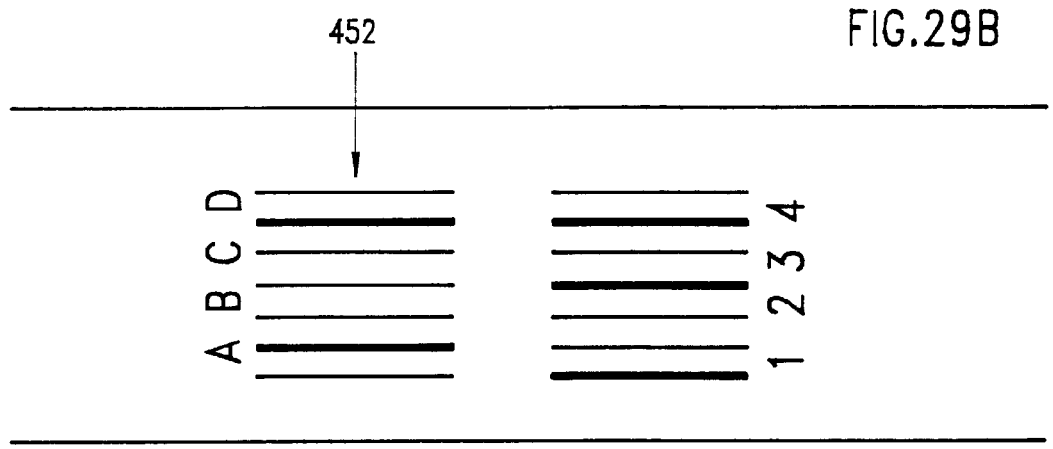
Figure 29C:
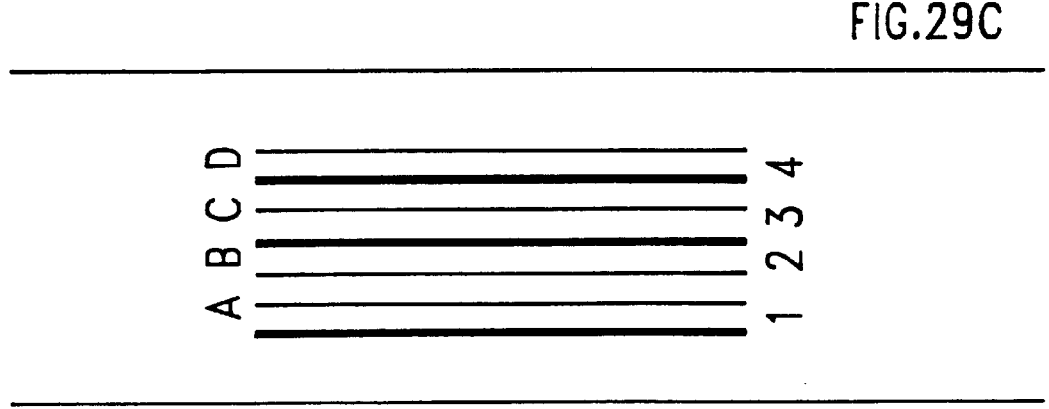

Reference is now made to FIGS. 29A–29C which illustrate an alternate embodiment of the writing apparatus of FIGS. 4A and 4B. According to the embodiment illustrated here, the strips of the conductive backing are not uniformly spaced or sized.

It is appreciated that many different configurations of the strips are permissible and the set-up is not limited to the configuration presented here.

The configuration presented here is designed to be compatible with the printing of uniform bar codes. The width of a strip 450 is chosen to be equal to the width of a section 452 of the bar code to be written.

It is appreciated that a reduction in the number of conductive strips simplifies the electronic driver mechanism.

Figure 30A:
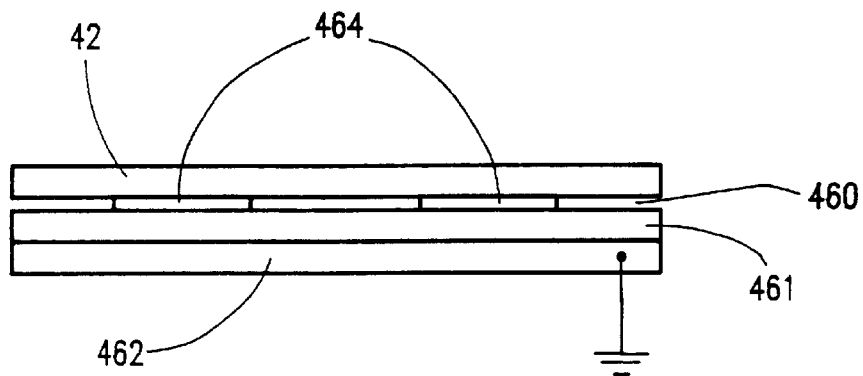
FIGS. 30A and 30B are illustrations of a further embodiment of the writing apparatus of FIGS. 4A and 4B.
Figure 30B:
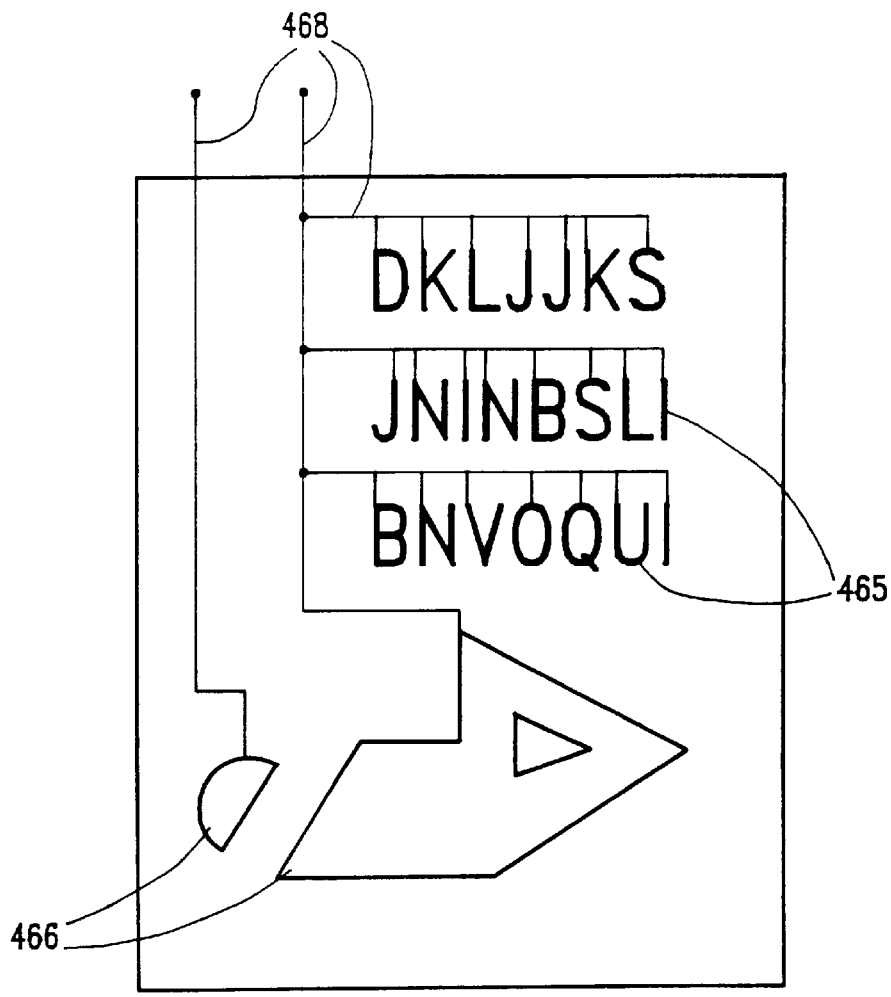

Reference is now made to FIGS. 30A and 30B which illustrate a further embodiment of the writing apparatus of FIGS. 4A and 4B.

In FIG. 30A, the strips (44 in FIG. 4A) are replaced by a substrate comprising a conductive backing 460 of predetermined configuration, an insulating dielectric layer 461, which lies intermediate the conductive backing 460 and a uniform conductive layer 462 which is grounded.

FIG. 30B provides a top view of pre-designed conductive backing 460 which comprises conductive areas containing text 465 and graphics 466. Additional conductive wires 468 connect text 465 and graphics areas 466 to voltage drivers (not shown).

It is appreciated that during writing in accordance with the write techniques described hereinabove, particularly in conjunction with FIG. 3–FIG. 5, a zero voltage is provided to the conductive backing 460 when the charge source is sweeping above the area of the conductive wires 468. When the charge source is sweeping the text 465 or graphic areas 466, the voltage supplied by the drivers to the conductive backing 460 is at a high level.

It is further appreciated that pre-design of the conductive backing may be useful in printing standard forms or in other applications where a fixed master is necessary or where longevity of the master is important.

Figure 31B:
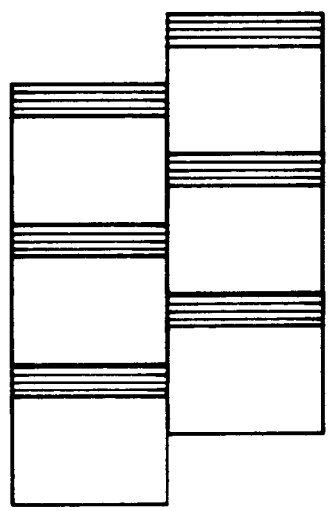
FIGS. 31A, 31B and 31C are illustrations of parameters for obtaining a continuum of gray levels by pseudo-half tones in accordance with an embodiment of the present invention.
Figure 31C:
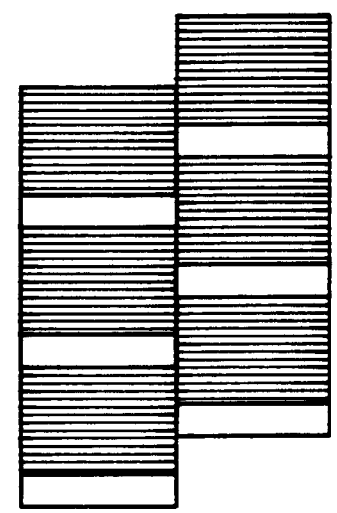
Figure 31A:
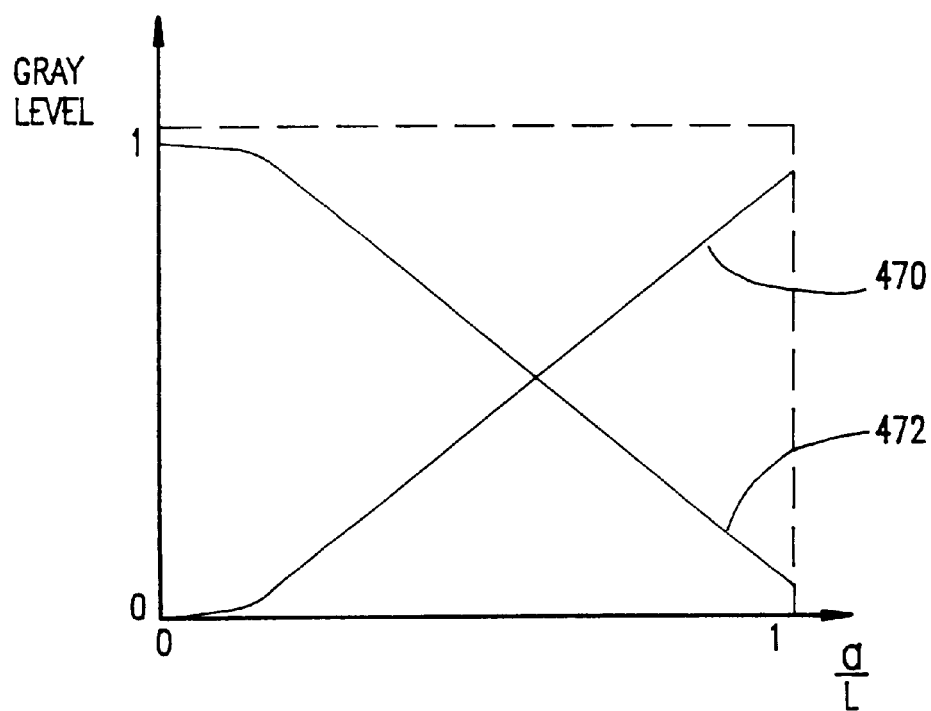

Reference is now made to FIGS. 31A–31C which illustrate a method for obtaining a continuum of monochrome gray levels by pseudo-half tones in accordance with an embodiment of the present invention.

FIG. 31A graphically represents monochromatic gray levels that can be achieved over an area as a function of the fractions of each of the pixels comprising that area that are toned. Pixels are charged and toned in accordance with the writing techniques described hereinabove particularly in conjunction with FIGS. 3–5 and standard toning techniques.

It is appreciated that the dimension of a pixel in the direction of the sweep of the charge source may be represented by L. The dimension of a pixel in the second direction is determined by the width of the conductive strip associated with that pixel. (a/L) is the toning fraction, where a is a function of the velocity of the charge source multiplied by the effective time duration during which the bias voltage on the conductive strip changes during the writing of a single pixel.

Curve 470 illustrates one possible representation of gray levels that can be achieved by controlling the toning fraction of each pixel. In this representation, the voltage biasing the conductive strip is zero at the beginning and end of a sweep of the pixel by a charge source. During the sweep, the voltage biasing the conductive strip is raised to a high level for a time duration in accordance with the desired toning fraction.

Curve 472 illustrates an alternate representation gray levels that can be achieved by controlling the toning fraction of each pixel. In this representation, the voltage biasing the conductive strip is at a high level at the beginning and end of a sweep of the pixel by a charge source. During the sweep, the voltage biasing the conductive strip is reduced to zero for a time duration in accordance with desired toning fraction.

It is appreciated that a continuum of monochrome gray scales may be achieved for an area by selecting the appropriate voltages for the beginning and end of the sweep of each of the pixel locations comprising that area (following curve 470 or curve 472 depending upon the optical density desired).

FIGS. 31B and 31C illustrate close-up views of the fractionally toned image of the pixels of two adjacent conductive strips (not shown) where the pixels of one strip have been phase shifted with respect to the pixels of the second strip.

Two different gray scales are shown (FIG. 31B and FIG. 31C). It is appreciated that the phase shift with respect to adjacent strips enabled by write techniques described hereinabove allows monochrome pseudo half-tone gray scales with high spatial frequency of pixel arrangements to be achieved.

It is further appreciated that continuous color shades can be achieved using color pseudo half-tones. Color pseudo-half tones can be achieved in accordance with the techniques described hereinabove for creating monochromatic pseudo-half tones by varying the toning fraction of a pixel during each of four passes carried out during standard multi-pass subtractive color printing.

It is appreciated that the write techniques described hereinabove, particularly in association with FIGS. 3–5 provide a method for generating a charge pattern that contains charges of both polarities. It is understood that there exist toners which develop positive charge images and similarly there are other toners which develop negative charge images.

Therefore by using two different color toners which develop opposite polarity charge images, a two-color image may be produced in a single pass. The two-color image may contain any of a continuum of shades of the two colors, in accordance with the techniques for continuous toning described hereinabove, or alternately, in accordance with the techniques for pseudo half tones described hereinabove. One possible application for this technique is in the generation of "highlight" images.

Figure 32A:
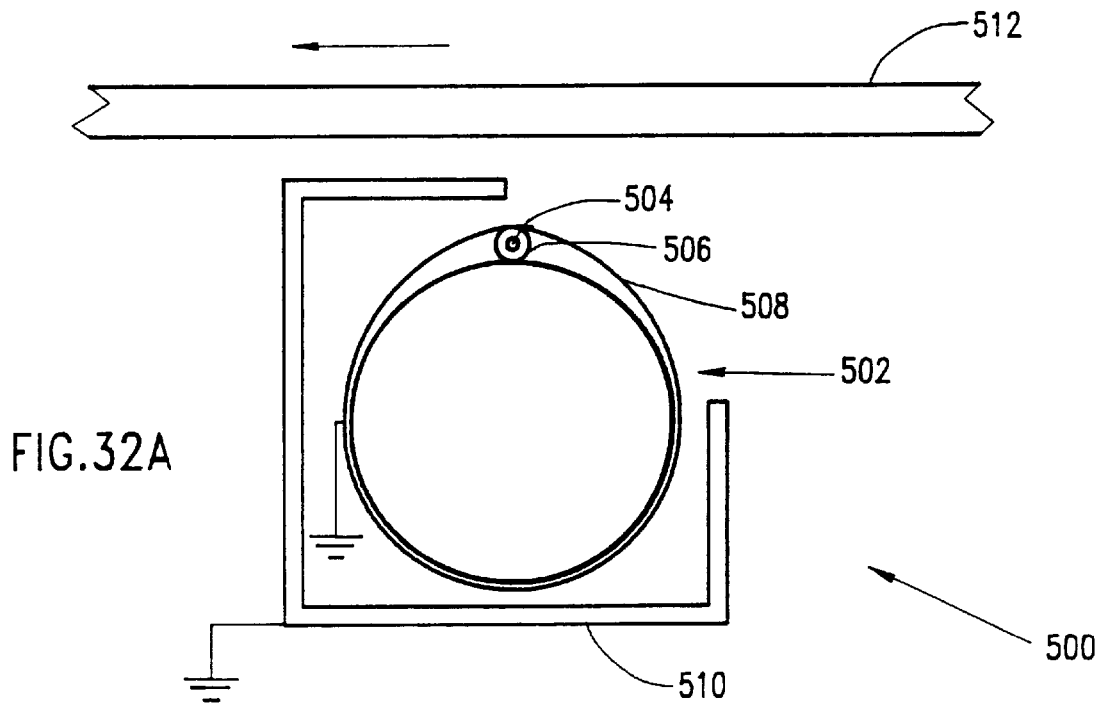
FIGS. 32A and 32B are pictorial illustrations of side and top views, respectively, of an alternative embodiment of an alternating polarity charge source providing a charge flow having at least one defined edge.
Figure 32B:
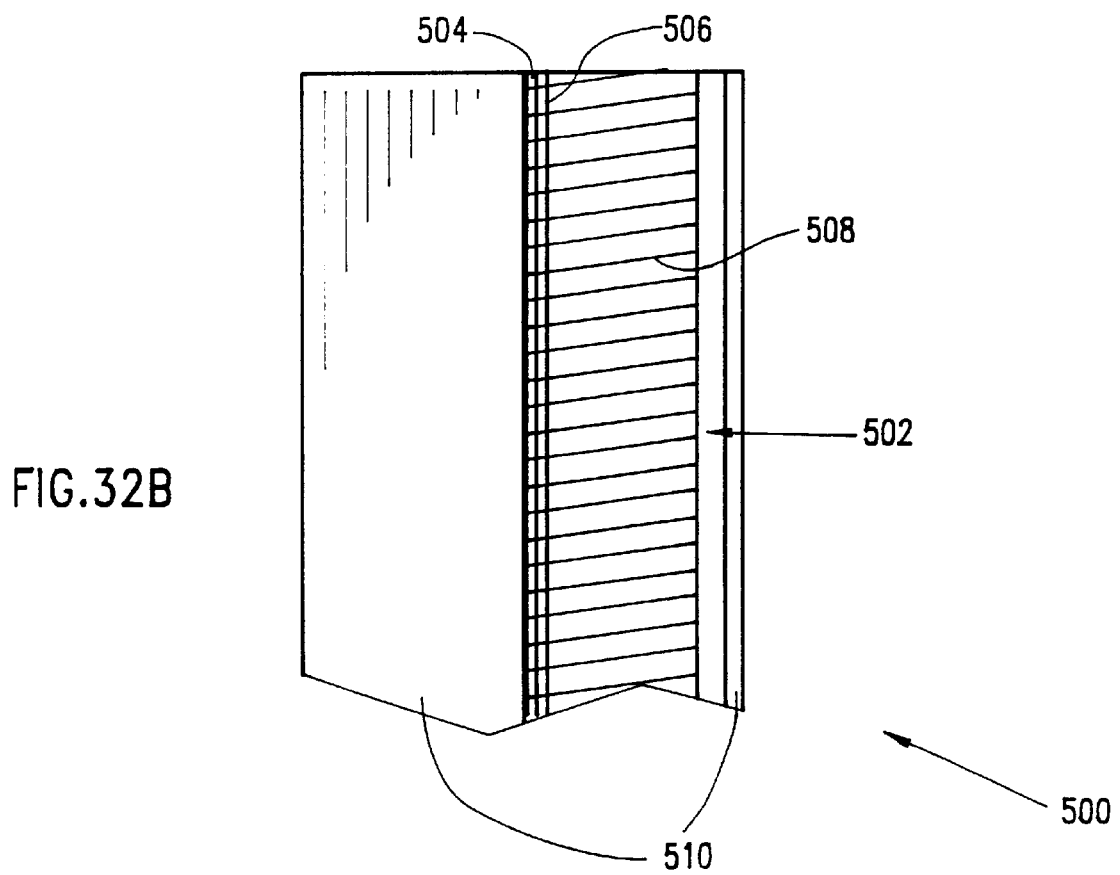

Reference is now made to FIGS. 32A–32B which are pictorial illustrations of side and top views, respectively, of an alternating polarity charge source providing a charge flow having at least one defined edge in accordance with an alternative embodiment of the present invention.

Apparatus 500 comprises an alternating polarity charge pool apparatus 502 which further comprises a non-imagewise source of ions. Apparatus 502 may also comprise an elongate conductor 504 coated with a dielectric layer 506 and a transversely oriented conductor 508 contacting or closely spaced from the dielectric-coated conductor as described in U.S. Pat. No. 4,409,604 assigned to Dennison Manufacturing Company of Framingham, Mass., USA.

In accordance with a particular configuration of apparatus 502, conductor 508 is coiled around elongate conductor 504. When apparatus 502 is operational, a pool of positive and negative ions is continuously generated in the air space immediately surrounding the dielectric-coated conductor at the regions in between the locations where the coiled conductor crosses over the dielectric-coated conductor.

Apparatus 500 further comprises an elongate electrostatic shield 510 typically comprising a conductive material. Electrostatic shield 510 may be configured as illustrated whereby charge pool apparatus 502 is partially confined by shield 510. It is appreciated that apparatus 500 is capable of providing an ion beam with at least one edge sharply defined. It is appreciated that charge pool apparatus 502 alone does not provide an elongate ion beam with a sharply defined edge.

It is further appreciated that apparatus 500 may serve as an elongate alternating polarity charge (EAPCS) source described hereinabove in accordance with write and/or read techniques described hereinabove. This configuration is presented to offer an example of possible configurations for the EAPCS and is not intended to be limiting.

It is appreciated that in accordance with the charge pool apparatus described herein, elongate electrostatic shield 510 is preferably grounded. Alternately, any suitable shield configuration can be used.

According to an alternative embodiment, an elongate grounded shield whereby charge pool apparatus is totally enclosed, except for an elongate opening, may be used to achieve an ion beam with two defined edges.

Typically, coiled conductor 508 is grounded and elongate conductor 504 continuously receives a high AC voltage typically about 2000 V pp and having a frequency in the range between several hundred kHz to several MHz.

Preferably, the gap between dielectric surface 512 and shield 510 is about 200–300 microns.

A dielectric surface 512, typically of the type described hereinabove particularly in accordance with FIGS. 4A–4B, sweeps above apparatus 500. Typically, dielectric surface 512 comprises a plurality of regions each having associated therewith an apparent surface voltage (ASV). During the sweep, these regions of the dielectric surface are brought into their maximum propinquity with the charge pool. The ASV of each region creates an electric field between dielectric substrate 512 and the charge pool.

Electrostatic shield 510 serves to tailor the electric field created. The ASV at regions on the dielectric substrate which have direct unshielded access to the charge pool will cause ions of the appropriate polarity to be extracted until the ASV at that region is neutralized. The ASV at regions on dielectric substrate 512 which are shielded from the charge pool are not involved in ion extraction. When a region on the dielectric surface is in a location which is not shielded from the charge pool, the region may accumulate charges in accordance with the techniques described hereinabove. When the region is moved to a shielded location, additional charge will not accumulate on that region.

It is appreciated that the extracted ions typically form a beam with at least one sharply defined edge. In accordance with the techniques described in accordance with this embodiment of the invention, preconditioning of the surface to be charged is not necessary. Therefore, the width of the charge beam is not significant as long as one edge is sharply defined. It is also appreciated that charges accumulating at regions of the substrate from the opposite, undefined edge of the ion beam do not affect the final amount of charge that will be accumulated at that region. When the region moves past the sharply defined edge, the appropriate amount of negative or positive charges will be deposited to balance the effect of the conductive backing potential regardless of any stray charges that may have accumulated at that region from the opposite, undefined edge.

It is further appreciated that the edge resolution achievable in the direction of the sweep may be a function of the intensity of the ion beam and the sharpness of the beam edge.

It is additionally appreciated that although the charge flow may be amplitude modulated as illustrated in FIG. 1D, such amplitude modulation is not required for the embodiments of FIGS. 32A–35B.

Figure 33:
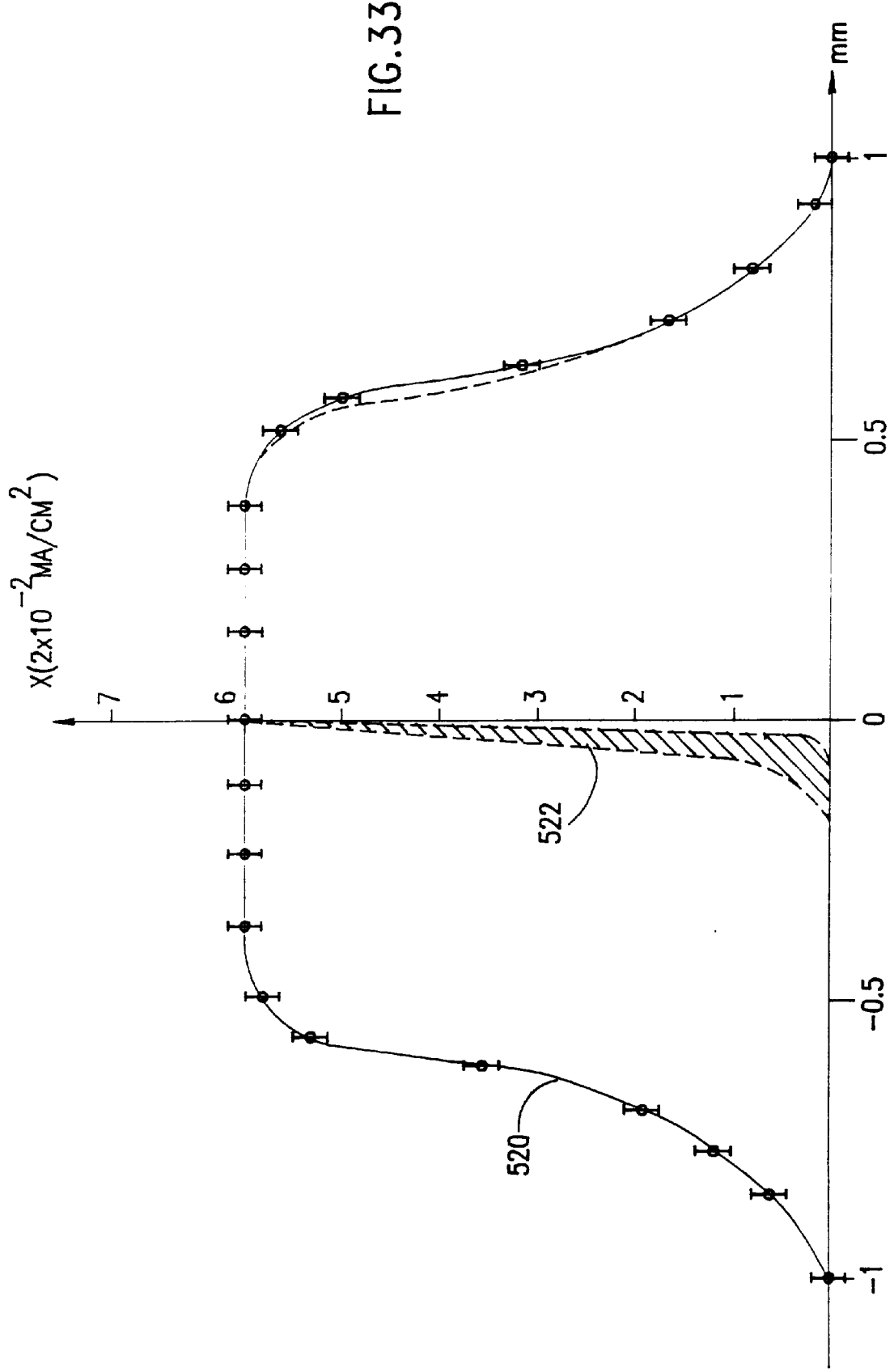
FIG. 33 is a graphical illustration of the measured intensity of an ion current as a function of the displacement in the sweep direction in accordance with a preferred embodiment of the present invention.

Reference is now made to FIG. 33 which is a graphical illustration of the measured intensity of an ion current as a function of the displacement in the sweep direction in accordance with a preferred embodiment of the present invention.

For the measurements illustrated herein, a conductive current probe with a constant bias voltage of 400 V (providing an ASV of 400 V) was used to monitor the steady-state ion beam.

Curve 520 illustrates a typical ion beam profile for the case where apparatus 502 (of FIG. 32A above) does not comprise an electrostatic shield.

Curve 522 illustrates a typical ion beam profile for the case where apparatus 502 (of FIG. 32A above) comprises an electrostatic shield, typically of the type described hereinabove and indicated by reference number 510.

The two sets of measurements were carried out under the same conditions. In particular, the distance between the probe and the charge pool remained unchanged. Curve 522 illustrates the region in which the beam has a sharp edge. The shaded area represents the uncertainty of the measurement due to the accuracy of the measuring device. The edge of the ion beam (illustrated by curve 522) using the shield apparatus is sharply defined. By contrast the edge of the ion beam (illustrated by curve 520) in the non-shielded apparatus is not sharply defined.

It is appreciated that curves 520 and 522 illustrate ion beams under static conditions where the ASV does not change. Under dynamic conditions, when the ASV changes with time, the ion beam of the unshielded apparatus may exhibit a high degree of blooming. It is appreciated that under the same dynamic conditions, the ion beam of the shielded apparatus will not exhibit such blooming.

Figure 34A:
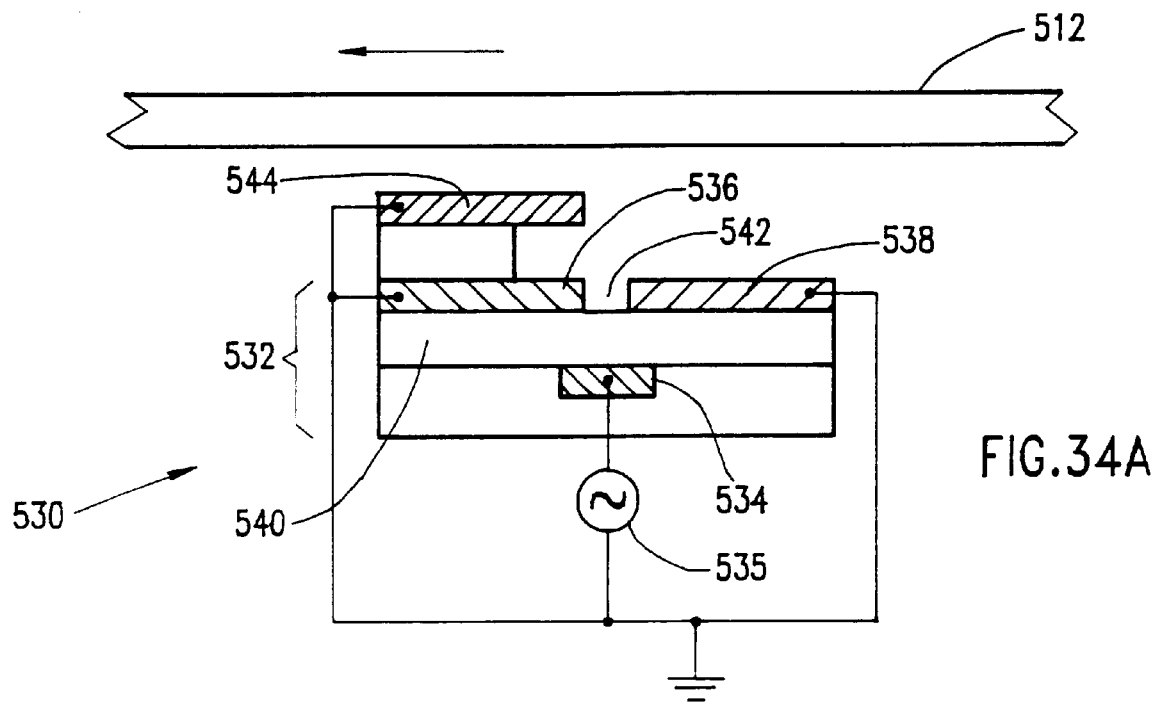
FIGS. 34A and 34B are pictorial illustrations of a side and top view, respectively, of an alternative embodiment of a further alternating polarity charge source providing a charge flow having at least one defined edge.
Figure 34B:
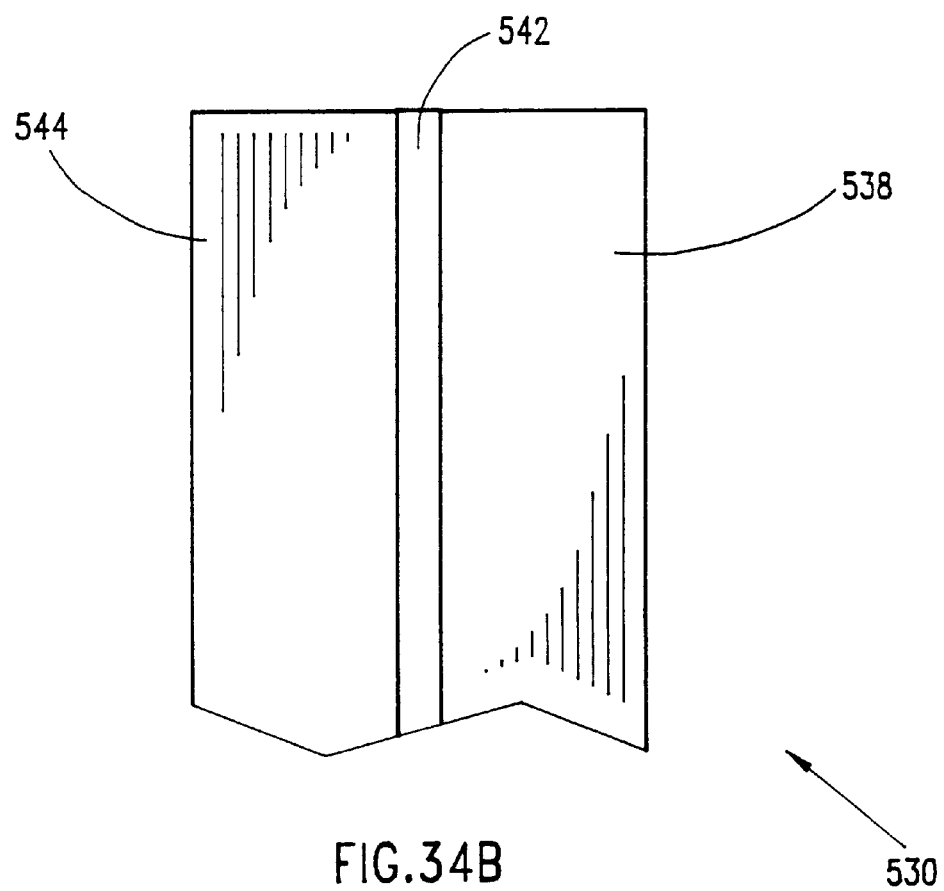

Reference is now made to FIGS. 34A–34B which are pictorial illustrations of a side and top view, respectively, of an alternative embodiment of apparatus 530 for providing an alternating polarity charge beam having at least one defined edge.

Apparatus 530 comprises alternating polarity charge pool apparatus 532 which includes a non-imagewise source of ions, comprising a high voltage electrode 534 coupled to a high voltage AC source 535 and two grounded electrodes 536 and 538. Grounded electrodes 536 and 538 are separated from high voltage electrode 534 by a dielectric layer 540. A space 542 is defined between grounded electrodes 536 and 538, providing a slot in which an ion pool may be generated.

Alternatively electrodes 536 and 538 may be replaced by a single slotted electrode. The electrode arrangement may be as described in U.S. Pat. No. 4,155,093 assigned to Dennison Manufacturing Company of Framingham, Mass., USA.

It is appreciated that ion pool apparatus 532 does not provide an elongate ion beam with a sharply defined edge.

In order to achieve an ion beam which has at least one edge defined in accordance with the steps described hereinabove particularly with respect to FIGS. 32A–32B, apparatus 530 further comprises an elongate electrostatic shield 544. Shield 544 typically comprising a conductive material is placed with some spacing relative to charge pool apparatus 532. Electrostatic shield 544 may be configured as illustrated whereby charge pool apparatus 532 is partially obscured by shield 544.

It is appreciated that apparatus 530 may serve as an elongate alternating polarity charge source described hereinabove in accordance with write and/or read techniques. It is further appreciated that the configuration presented here is presented to offer a further example of the possible configurations for the charge source and is not intended to be limiting.

It is appreciated that in accordance with the charge pool apparatus described herein, elongate electrostatic shield 544 is preferably grounded.

It is appreciated that use of an electrostatic shield as described hereinabove may possibly provide benefits in addition to providing a shielding function. One such benefit is a further shaping of the electric field generated by the conductive strips (FIGS. 4A and 4B) at the surface of the dielectric substrate directly opposite the shield. This may provide a more highly uniform charging of the dielectric substrate in regions where adjacent strips are at the same potential.

Figure 35A:
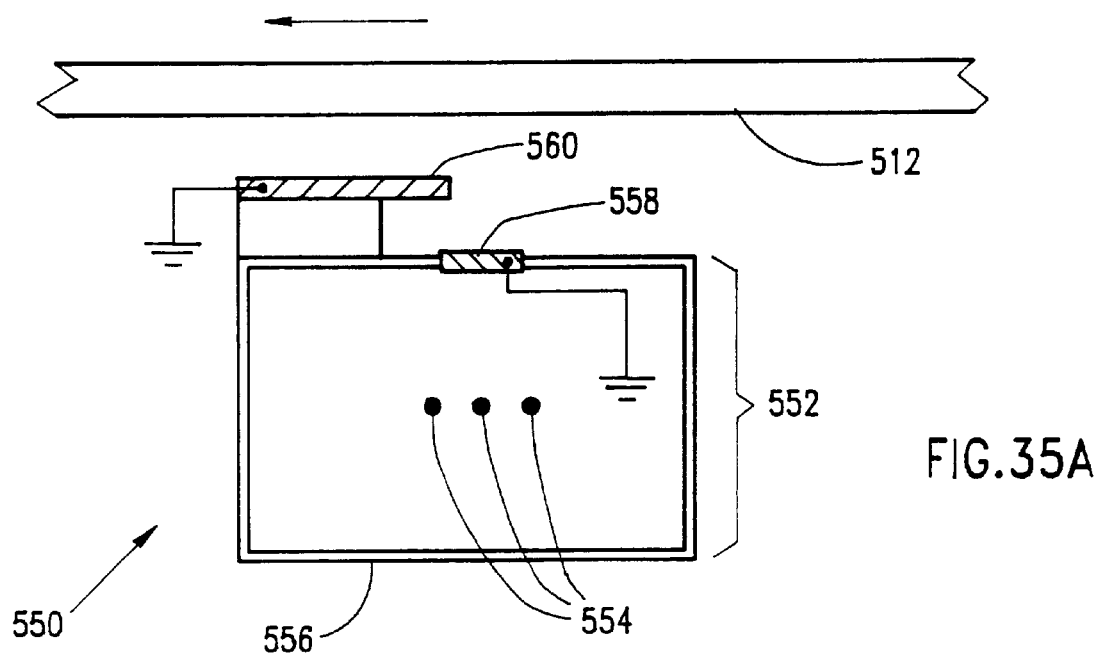
FIGS. 35A and 35B are pictorial illustrations of an alternative embodiment of an alternating polarity charge source providing a charge flow having at least one defined edge in accordance with the present invention.
Figure 35B:
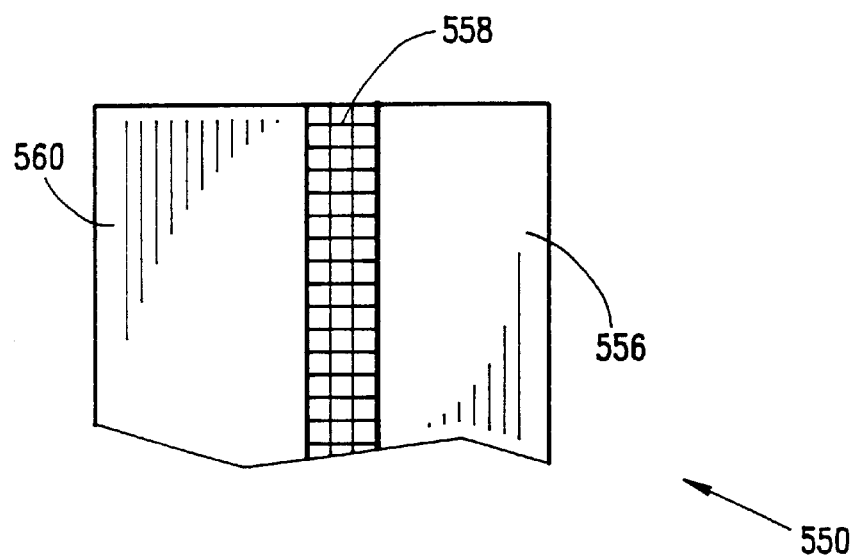

Reference is now made to FIG. 35 which is a pictorial illustrations of an alternative embodiment of an apparatus for providing an alternating polarity charge beam having at least one defined edge.

Apparatus 550 comprises alternating charge pool generating apparatus 552, a casing 556 and an elongate electrostatic shield 560. Apparatus 552 preferably comprises one or more corona wires 554 some or all of which may be dielectrically coated. Alternately, corona wires 554 may not be dielectrically coated. Each corona wire 554 is functional to receive a high AC voltage. All of the wires 554 may be biased by the same AC source (not shown). Alternately, corona wires 554 may be biased by AC sources having different amplitudes. It is appreciated that each corona wire 554 may receive a different AC voltage.

Corona wires 554 are confined by isolating casing 556. Typically casing 556 comprises a dielectric material. Casing 556 typically contains an elongate grounded section 558 which is partially open and wherein an ion pool is created. The open area of grounded section 558 may comprise a gridlike area. Alternately, the open area may comprise at least one elongate slot.

According to an alternate embodiment of apparatus 552, casing 556 may further comprise an inlet through which conditioned air may flow onto corona wires 554. In this embodiment, the intensity of the ion pool created at section 558 may be increased.

In order to achieve an ion beam which has at least one edge defined in accordance with the steps described hereinabove particularly in accordance with FIGS. 32A–B, elongate electrostatic shield 560 typically comprising a grounded conductive material is placed with some spacing relative to charge pool apparatus 552. Electrostatic shield 560 may be configured as illustrated whereby charge pool apparatus 552 is partially obscured.

It is appreciated that apparatus 550 may serve as an elongate alternating polarity charge (EAPCS) source described hereinabove in accordance with the read and/or write techniques described hereinabove. It is further appreciated that this configuration is presented to offer an example of possible configurations for the EAPCS and is not intended to be limiting.

Figure 36A:
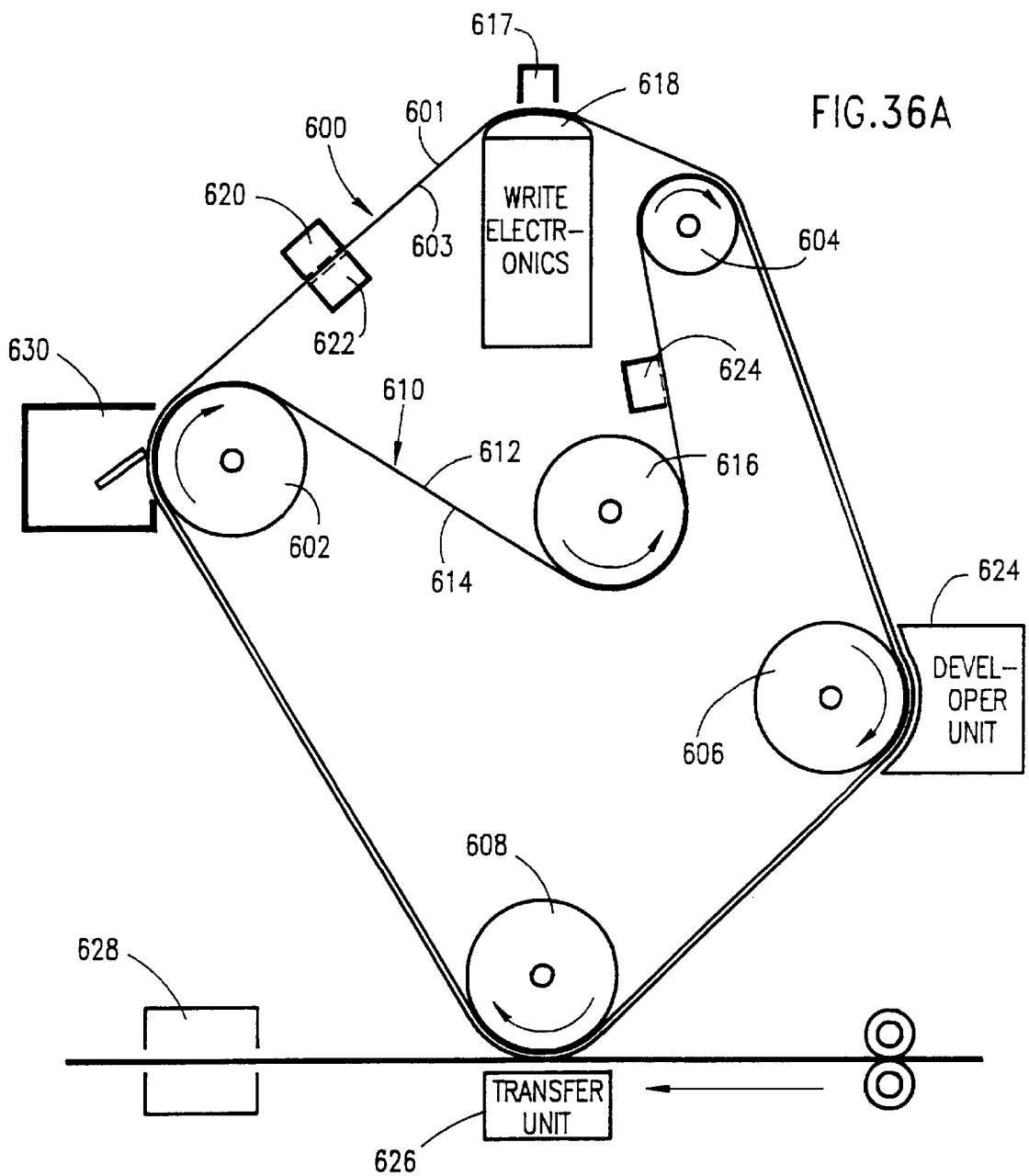
FIG. 36A is a simplified illustration of printing apparatus constructed and operative in accordance with a preferred embodiment of the present invention.
Figure 36B:
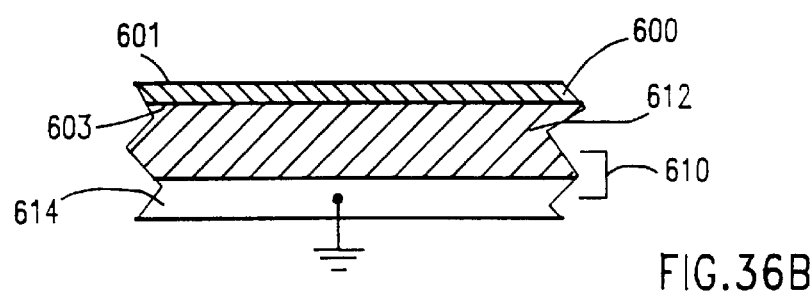
FIG. 36B is a diagrammatic illustration of part of the apparatus of FIG. 36A.

Reference is now made to FIGS. 36A and 36B which illustrate a system for writing and developing electrostatic images in accordance with an embodiment of the present invention. The illustrated embodiment employs a belt 600 with dielectric properties which is displaced by rotating drums 602, 604, 606 and 608.

A second belt 610, comprising a laminate of a dielectric layer 612 and a grounded conductive backing 614, is displaced by rotating drums 602, 616, 604, 606 and 608. When the system is operational, belts 600 and 610 rotate in the same direction. Between drums 602 and 604, belt 600 and belt 610 are not in touching contact. At drum 604, belts 600 and 610 are brought into touching contact.

Associated with belt 600 is a charge source 617. Further associated with belt 600 is a plurality of fixed conductive electrodes 618. Electrodes 618 function as a conductive backing for the portion of belt 600 which is disposed intermediate charge source 617 and electrodes 618 at any given time. Preferably electrodes 618 have a slightly curved configuration. Alternately, the electrodes may be of any suitable configuration.

In accordance with this configuration, electrodes 618, are not embedded in belt 600. The plurality of strips 618 may correspond to strips 186 of FIGS. 16A and 16B.

An image is generated in this system according to the following steps: Charge sources 620 and 622 are used to precondition both upper surface 601 and lower surface 603 of portions of dielectric belt 600 in order to neutralize and erase any charge that may be on belt 600. Typically, charge sources 620 and 622 comprise AC coronas with grounded screens, but any standard method of pre-conditioning may be used.

Simultaneously, charges, which may have accumulated on the dielectric surface 612 of belt 610 due to triboelectricity, are neutralized by charge source 624.

Electrostatic images are created on surface 601 of belt 600 in accordance with write techniques described hereinabove most particularly in conjunction with FIGS. 16A and 16B. In accordance with the principles of this embodiment, the voltages applied to the electrodes during the writing of the electrostatic image are intentionally selected to be lower by a set factor than the apparent surface voltages desired for the developing stage. This allows writing of the image with relatively low voltages and subsequently amplifying the voltages for the development stage.

The relationship between the Apparent Surface Voltage (V) on a dielectric element, the capacitance of the dielectric element (C) and the charge level on that surface (Q) may be represented by the following equation:

$$V=Q/C$$

When the capacitance of the charged element is reduced, an amplification of the voltage occurs.

At drum 604, belt 600 and belt 610 are brought into touching contact, creating a capacitive relationship between the two belts, as shown in FIG. 36B. This capacitive relationship causes the effective capacitance of the two belts to be reduced, which in turn serves to amplify the apparent surface voltage on belt 600 by a factor of A in accordance with the relationship between the capacitance and the Apparent Surface Voltage which may be expressed as follows:

$$A=1+d2*E1/d1*E2;$$

where A is the amplification factor, d1 and E1 are the thickness and the dielectric constant of the first substrate, respectively, and d2 and E2 are the thickness and the dielectric constant of the second substrate, respectively.

It is appreciated that amplification of the Apparent Surface Voltage does not change the charge density or the charge distribution on upper surface 601 of belt 600. The electrostatic image with the amplified Apparent Surface Voltage is developed by developing unit 624. The toned image is then transferred to an output substrate, typically paper, by transfer unit 626 and fixed to the output substrate by fixing unit 628 using standard toner fixing techniques. Any residual toner on upper surface 601 of belt 600 is removed by cleaning unit 630 using standard techniques.

It is appreciated that preconditioning of belt 600 is required in the embodiment of FIGS. 36A and 36B since surface 603 is not grounded during development of the charge image, but rather is spaced from ground by another dielectric. It is appreciated that the amplification feature of the embodiment of FIGS. 36A and 36B is not limited to the structure there shown, but may be implemented in any suitable structure.

Reference is now made to FIGS. 37A–37C which illustrate a system for writing and developing electrostatic images in accordance with another embodiment of the present invention. The illustrated embodiment employs a drum 700 having a dielectric layer 702 on its outer surface, which is rotated in a direction indicated by arrow 704.

A plurality of conducting electrodes (not shown) are embedded in the dielectric layer 702 and extend over the periphery of the outer surface of the drum. Electronic circuitry 706 may be mounted interiorly of the outer surface of the drum and of layer 702, whereby each electrode may be connected to a driver forming part of the circuitry 706.

Associated with drum 700 and more particularly with dielectric layer 702 is a charge source 708, preferably of the type shown in any of FIGS. 32–35.

The apparatus of FIGS. 37A–37C is particularly characterized in that charge image generation and developing may take place simultaneously at different regions of the drum. This is achieved by operating the charge source 708 discontinuously, in a series of bursts, as indicated in FIG. 37B.

During each burst of the operation of charge source 708, all of the electrodes embedded in dielectric layer 702 receive appropriate voltages representing a single raster line of an image to be printed. Immediately following operation of the charge source 708, i.e. in between the bursts shown in FIG. 37B, the drivers in circuitry 706 supply to each such electrode a voltage which is equal and opposite to the voltage applied thereto during the operation of charge source 708.

FIG. 37C shows the voltage on a given electrode both during the bursts of operation of the charge source 708 and in between the bursts, in response to operation of the drivers of circuitry 706.

The result of these operations is that in each electrode, an electrical signal is generated which is composed of high Fourier frequency components and a zero DC component. The elimination of the DC component eliminates spurious operation of a magnetic brush developer unit 710 which would otherwise by produced thereby.

It is further noted that when the developer unit 710 employs dual-component toners the high Fourier frequency components in the signal also do not result in spurious toner deposition by the developer unit 710.

In this way, the signals present on the electrodes during development by developer unit 710 do not interfere with the desired development of the latent image on the dielectric layer 702, but operate only for desired latent image generation.

The toned image produced by developer unit 710 is transferred to an output substrate, typically paper, by a transfer unit 712 and fixed to the output substrate by a fixing unit 714 using standard toner fixing techniques. Any residual toner on the outer surface of the drum 700 is removed by a cleaning unit 716 using standard techniques.

Figure 38A:
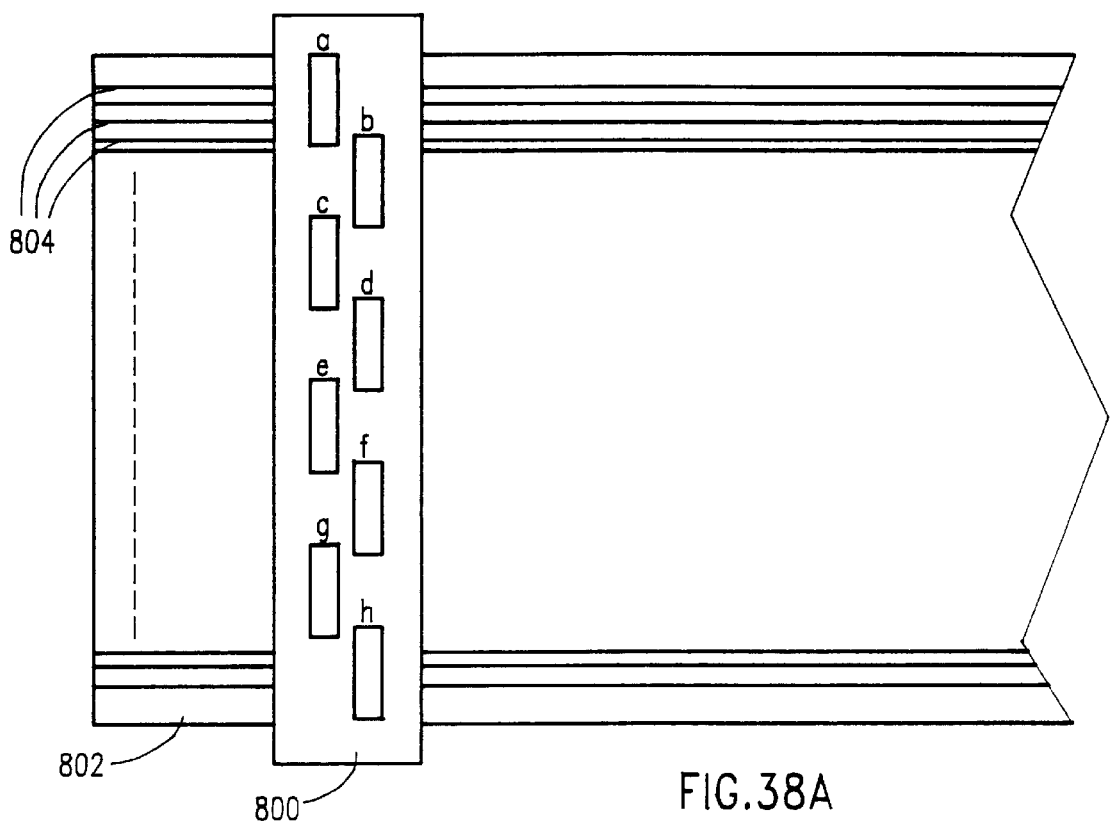
FIG. 38A is a simplified illustration of printing apparatus constructed and operative in accordance with another preferred embodiment of the present invention.
Figure 38B:
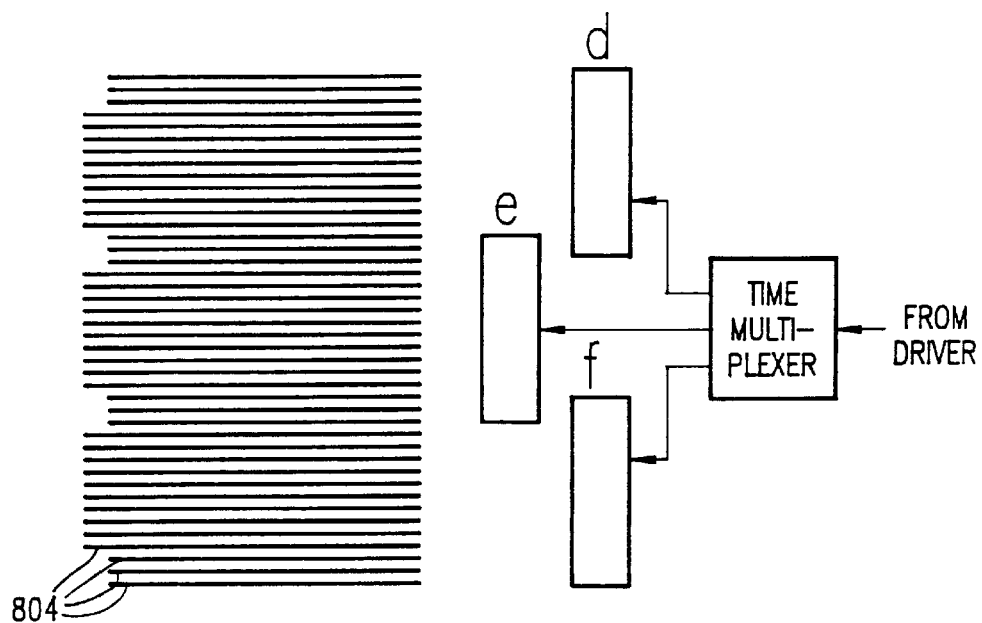
FIG. 38B is an illustration of the operation of the apparatus of FIG. 38A.

Reference is now made to FIGS. 38A and 38B which illustrate a system for writing and developing electrostatic images in accordance with yet another embodiment of the present invention. The illustrated embodiment employs time multiplexing of the output of a limited number of drivers to a plurality of different arrays of individual charge sources, such as shown in FIGS. 4A and 4B.

As seen in FIGS. 38A and 38B, a charge source array assembly 800 includes a plurality of individual charge sources, which are indicated by the letters a–h and are seen to be arranged in staggered, partially overlapping relationship with a substrate 802 bearing a plurality of electrodes 804. The individual charge sources receive signal inputs from a time multiplexer 806 which in turn receives signal inputs from drivers not shown). The individual charge sources a–h may be of the type illustrated in any of FIGS. 32–35.

It will be appreciated by persons skilled in the art that the present invention is not limited to what has been particularly shown and described hereinabove. Rather the scope of the present invention is defined only by the claims which follow:

We claim:

1. Apparatus for information transfer comprising:
    an interface for receiving from a computer information representing a voltage signal;
    a voltage signal source operative to apply voltage signals having a plurality of voltage levels to a plurality of individual elements arranged in operative association with a first surface of a dielectric element having first and second surfaces;
    a non-imagewise charge flow source having an electrostatic shield and being operative to apply a flow of alternating polarity charges to a second surface of said dielectric element, thereby to provide a charge pattern comprising a plurality of charge density levels and corresponding to said voltage signals, and wherein the spatial resolution of the charge pattern is defined in one direction by the density of said individual elements and in a second direction by an edge of said electrostatic shield;
    a receiving substrate positioning device operative to place a receiving substrate in proximity to said second surface of said dielectric element; and
    a second charge source operative to apply a flow of alternating polarity charges to said receiving substrate, thereby to cause information transfer from said dielectric element to said receiving substrate.

2. Apparatus according to claim 1 and wherein said charge source operative to apply a flow of charges to said receiving substrate is operative to provide information transfer while leaving said charge pattern on said dielectric element intact.

3. Apparatus according to claim 1 wherein said charge source operative to apply a flow of charges to said receiving substrate successively transfers information from said dielectric element to said receiving substrate without requiring re-establishment of said voltage signal on said first surface of said dielectric element.

4. Apparatus according to claim 2 and wherein said information is transferred to a plurality of receiving substrates in succession.

5. Apparatus for information transfer comprising:
    a voltage signal source operative to apply voltage signals having a plurality of voltage levels to a plurality of individual elements arranged in operative association with a first surface of a dielectric element having first and second surfaces; and
    a non-imagewise charge source, having an electrostatic shield and being capable of providing alternating polarity non-visible charges, which is operative to apply a flow of non-visible charges to said second surface, said flow of non-visible charges being operative to transfer information between said first and second surfaces creating a non-visible charge pattern containing a continuum of charge density levels on said second surface and wherein the spatial resolution of the charge pattern is defined in one direction by the density of said individual elements and in a second direction by an edge of said electrostatic shield.

6. Apparatus according to claim 5 wherein said continuum of charge density levels correspond to optical density levels of toning materials and wherein different locations on said charge pattern contain different charge densities.

7. Apparatus according to claim 6 and wherein said at least one information bearing voltage signal comprises a sequence of voltage signals each corresponding to a different basic color.

8. Apparatus according to claim 6 and wherein said charge source is operative to apply a flow of charges for sequential transfer of each of said sequence of voltage signals to said second surface.

9. Apparatus according to claim 8 and wherein each of said voltage signals has a characteristic voltage to optical density relationship corresponding to the color associated therewith.

10. Apparatus according to claim 5 wherein said dielectric element is transparent and also comprising means for projecting light through said dielectric element.

11. Apparatus according to claim 10 and also comprising a multicolor filter and wherein said means for projecting is operative to project light which has passed through said dielectric element also through said multicolor filter.

12. Apparatus for information transfer and including:
    a voltage signal source operative to apply pattern bearing voltage signals having a plurality of voltage levels to a plurality of individual elements arranged in operative association with a first surface of a dielectric element having first and second surfaces;
    a first non-imagewise charge source having an electrostatic shield and being operative to apply a first flow of Alternating polarity charges to said second surface, said first flow of alternating polarity charges being operative to transfer a first set of information at a first resolution between said first and second surfaces; and
    a second non-imagewise charge source having an electrostatic shield and being operative to apply a second flow of alternating polarity charges to said second surface, said second flow of charges being operative to transfer a second set of information at a second resolution between said first and second surfaces.

13. Apparatus according to claim 12 and wherein said second flow of charges is employed to provide correction of the first information transferred to the second surface.

14. Apparatus for information transfer and including:
a dielectric element having generally opposite first and second surfaces;
an pattern bearing voltage signal being associated with said first surface wherein said voltage signal has a predetermined two-dimensional spatial characteristic; and
a charge source operative to apply a flow of charges to said second surface, said flow of charges being operative to transfer information represented by said two-dimensional characteristic.

15. Apparatus for generating images and including:
an element having generally opposite first and second surfaces wherein said element is characterized by having an optical transmission dependent on internal electrostatic fields;
a voltage signal source operative to apply pattern bearing voltage signals to a plurality of individual elements arranged in operative association with a first surface of said element; and
a charge source having an electrostatic shield and being operative to apply a flow of charges to said second surface, wherein said charges flow from a generally non-imagewise source and wherein said flow is operative to generate a spatial optical transmission pattern corresponding to said voltage signals and wherein the spatial resolution of the optical transmission pattern is defined in one direction by the density of said individual elements and in a second direction by an edge of said electrostatic shield.

16. Apparatus for information transfer and including:
a dielectric element having generally opposite first and second surfaces;
an information bearing voltage signal being associated with said first surface wherein said voltage signal comprises half tone information; and
a charge source operative to apply a flow of charges to said second surface, said flow of charges being operative to transfer said half tone information between said first and second surfaces.

17. Apparatus for information transfer including:
a voltage signal source operative to apply pattern bearing voltage signals having a plurality of positive and negative voltage levels to a plurality of individual elements arranged in operative association with a first surface of a dielectric element having first and second surfaces; and
a non-imagewise charge source having an electrostatic shield and being operative to apply a flow of alternating polarity charges to said second surface, said flow of alternating polarity charges being operative to transfer said information between said first and second surfaces creating a dual polarity charge pattern on said second surface and wherein the spatial resolution of the dual polarity charge pattern is defined in one direction by the density of said individual elements and in a second direction by an edge of said electrostatic shield.

18. Apparatus according to claim 17 which also comprises a developing device operative to develop said dual polarity charge pattern.

19. Apparatus according to claim 18 wherein said developing device comprises a two-color developing device operative to develop said dual polarity charge pattern in a single pass.

20. Apparatus for pattern generation on a dielectric substrate having first and second surfaces and including:
a plurality of individual elements carrying time-dependent voltage signals representing a pattern, said elements being arranged in operative association with a first surface of said dielectric element;
a charge source, capable of providing alternating polarity non-visible charges, operative to apply a flow of charges to a second surface of the dielectric substrate wherein the charges flow from a generally non-imagewise source and whereby as a result of application of such charges, the second surface retains a non-visible charge pattern corresponding to the desired pattern represented by the voltage signals,
wherein the charge source includes an ion source assembly providing edge definition and comprising:
an elongate ion source;
an elongate electrostatic shield disposed about said elongate ion source and defining an elongate opening generally parallel to said elongate ion source, said opening including an elongate edge, which defines the spatial extent of ion pathways along said edge;
wherein the two dimensional spatial resolution of said non visible charge pattern is generally determined in one direction by said elongate edge and in a second dimension by the density of said individual elements, and
a developing device operative thereafter to develop the non-visible charge pattern to provide a visible image.

21. Apparatus for pattern generation according to claim 20 and wherein said electrostatic shield is a grounded conductive shield.

22. Apparatus for pattern generation according to claim 20 wherein said elongate ion source comprises:
at least one elongate conductor coupled to at least one source of AC voltage;
a grounded conductive electrode in electrically insulative relationship with said at least one elongate conductor whereby said grounded electrode is disposed opposite said elongate conductor in a gas environment.

23. Apparatus for pattern generation according to claim 22 where said grounded conductive electrode is in a gridlike shape.

24. Apparatus for pattern generation according to claim 22 where said grounded conductive electrode comprises an elongate slot.

25. Apparatus according to claim 20 and wherein said voltage signal comprises half-tone information and said flow of charges is operative to transfer said half-tone information between said first and second surfaces.

26. Apparatus according to claim 25 wherein said half tone information comprises a continuum of partially filled pixel areas.

27. Apparatus according to claim 26 wherein said continuum of partially filled pixel area comprise areas that are spatially shifted with respect to adjacent areas.

28. Apparatus for pattern generation on a dielectric substrate having first and second surfaces and including:
a voltage signal source operative to apply voltage signals to a first of the dielectric substrate whereby the voltage signals vary with time and represent a desired pattern;
a charge source operative to apply a flow of charges to a second surface of the dielectric substrate wherein the charges flow from a generally non-imagewise source and whereby as a result of application of such charges, the second surface retains a non-visible charge corresponding to the desired pattern represented by the voltage signals, wherein the charge source includes an ion source assembly providing edge definition and comprising:

an elongate ion source;

an elongate electrostatic shield disposed about said elongate ion source and defining an elongate opening parallel to said elongate ion source, said opening including an elongate edge, which defines the spatial extent of ion pathways extending through said opening; and a developing device operative thereafter to develop the non-visible charge pattern to provide a visible image.

29. Apparatus according to claim 28 and wherein the flow of charges which is applied to the second surface of the dielectric substrate contains charges of a single polarity.

30. Apparatus for information transfer comprising:

a dielectric element having generally opposite first and second surfaces, a pattern bearing voltage signal initially being associated with said first surface;

means for applying a flow of charges to said second surface, said flow of charges being operative to transfer information between said first and second surfaces and to provide latent apparent surface voltages on said second surface; and means for amplifying the latent apparent surface voltages on said second surface.

31. Apparatus for information transfer comprising:

a dielectric element having generally opposite first and second surfaces;

means for associating a pattern bearing voltage signal with said first surface;

means for applying a flow of charges to said second surface, said flow of charges being operative to transfer information between said first and second surfaces and to provide latent apparent surface voltages on said second surface; and means for developing said apparent surface voltages, characterized in that said means for associating and means for developing operate generally simultaneously.

32. Apparatus according to claim 31 and wherein said means for associating operates in a pulsed mode.

33. A method for information transfer comprising:

providing a dielectric element having generally opposite first and second surfaces, a pattern bearing voltage signal initially being associated with said first surface;

applying a flow of charges to said second surface, said flow of charges being operative to transfer information between said first and second surfaces and to provide latent apparent surface voltages on said second surface; and amplifying the latent apparent surface voltages on said second surface.

34. A method for information transfer comprising:

associating a pattern bearing voltage signal with a first surface of a dielectric element having generally opposite first and second surfaces;

applying a flow of charges to said second surface, said flow of charges being operative to transfer information between said first and second surfaces and to provide latent apparent surface voltages on said second surface; and developing said apparent surface voltages, characterized in that said steps of associating and developing operate generally simultaneously.

35. A method according to claim 34 and wherein said step of associating operates in a pulsed mode.

* * * * *